US012444842B2

(12) United States Patent
Yun et al.

(10) Patent No.: US 12,444,842 B2
(45) Date of Patent: Oct. 14, 2025

(54) ELECTRONIC DEVICE COMPRISING ANTENNA

(71) Applicant: SAMSUNG ELECTRONICS CO., LTD., Suwon-si (KR)

(72) Inventors: Himchan Yun, Suwon-si (KR); Museok Bang, Suwon-si (KR); Dongyeon Kim, Suwon-si (KR); Haeyeon Kim, Suwon-si (KR); Nakchung Choi, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/099,740

(22) Filed: Jan. 20, 2023

(65) Prior Publication Data

US 2023/0163469 A1 May 25, 2023

Related U.S. Application Data

(63) Continuation of application No. PCT/KR2021/009490, filed on Jul. 22, 2021.

(30) Foreign Application Priority Data

Jul. 22, 2020 (KR) ........................ 10-2020-0091136

(51) Int. Cl.
*H01Q 9/04* (2006.01)
*H01Q 1/24* (2006.01)
(Continued)

(52) U.S. Cl.
CPC ........... *H01Q 9/0407* (2013.01); *H01Q 1/243* (2013.01); *H01Q 9/0442* (2013.01); *H01Q 9/045* (2013.01); *H01Q 15/24* (2013.01); *H01Q 21/24* (2013.01)

(58) Field of Classification Search
CPC ...... H01Q 9/0407; H01Q 1/243; H01Q 15/24; H01Q 1/273; H01Q 5/321; H01Q 5/364;
(Continued)

(56) References Cited

U.S. PATENT DOCUMENTS

| | | | |
|---|---|---|---|
| 6,618,012 | B1 | 9/2003 | Louzir et al. |
| 10,886,623 | B2 | 1/2021 | Son et al. |

(Continued)

FOREIGN PATENT DOCUMENTS

| | | | |
|---|---|---|---|
| CN | 110600869 | A | 12/2019 |
| CN | 111244625 | A | 6/2020 |

(Continued)

OTHER PUBLICATIONS

International Search Report (PCT/ISA/210) sated Nov. 18, 2021 issued by the International Searching Authority in International Application No. PCT/KR2021/009490.

(Continued)

*Primary Examiner* — Dameon E Levi
*Assistant Examiner* — Yonchan J Kim
(74) *Attorney, Agent, or Firm* — Sughrue Mion, PLLC

(57) ABSTRACT

An electronic device includes at least one processor, a first antenna comprises a first conductive patch disposed on a first layer, a first transmission line disposed on the first layer and electrically connected to one point of the first conductive patch, a ground disposed on a second layer and a dielectric disposed on a third layer between the first layer and the second layer, the first conductive patch has a shape of a rectangle in which a first corner portion of the rectangle and a second corner portion of the rectangle are removed, and the at least one processor transmits and/or receives at least one of a first RF signal having a first polarization characteristic and a second RF signal having a second polarization characteristic.

15 Claims, 32 Drawing Sheets

(Top view)

(Side section)

(51) Int. Cl.
*H01Q 15/24* (2006.01)
*H01Q 21/24* (2006.01)

(58) Field of Classification Search
CPC ...... H01Q 9/0442; H01Q 9/045; H01Q 21/24; H01Q 1/46
See application file for complete search history.

(56) References Cited

U.S. PATENT DOCUMENTS

| | | | |
|---|---|---|---|
| 11,404,798 B2 | 8/2022 | Park | |
| 2007/0035463 A1* | 2/2007 | Hirabayashi | H01Q 21/24 343/824 |
| 2007/0216589 A1 | 9/2007 | Li et al. | |
| 2010/0007560 A1 | 1/2010 | Ryou et al. | |
| 2012/0050126 A1* | 3/2012 | Chung | H01Q 9/0464 343/834 |
| 2019/0386397 A1 | 12/2019 | Son et al. | |
| 2020/0021011 A1 | 1/2020 | Cooper et al. | |

FOREIGN PATENT DOCUMENTS

| | | | |
|---|---|---|---|
| EP | 2304844 B1 | 8/2015 | |
| JP | 5-152839 A | 6/1993 | |
| JP | H05152839 A * | 6/1993 | |
| JP | 7-120893 B2 | 12/1995 | |
| JP | 2006-340234 A | 12/2006 | |
| JP | 2007-251936 A | 9/2007 | |
| JP | 4295938 B2 | 7/2009 | |
| JP | 2018-98647 A | 6/2018 | |
| JP | 2019-208198 A | 12/2019 | |
| KR | 10-2008-0032303 A | 4/2008 | |
| KR | 10-2011-0109495 A | 10/2011 | |
| KR | 10-2012-0021037 A | 3/2012 | |
| KR | 10-2019-0050039 A | 5/2019 | |
| KR | 10-2019-0142827 A | 12/2019 | |
| WO | WO-2004066443 A1 * | 8/2004 | H01Q 21/065 |

OTHER PUBLICATIONS

Written Opinion (PCT/ISA/237) dated Nov. 18, 2021 issued by the International Searching Authority in International Application No. PCT/KR2021/009490.

Office Action dated Jul. 1, 2024, issued by Korean Patent Office in Korean Patent Application No. 10-2020-0091136.

Communication dated Mar. 4, 2025 issued by the Korean Intellectual Property Office in Korean Patent Application No. 10-2020-0091136.

Communication issued on Jun. 3, 2025 by the Korean Intellectual Property Office in Korean Patent Application No. 10-2020-0091136.

* cited by examiner

E-Field(1st Resonance Frequency)

E-Field(2nd Resonance Frequency)

| Shape of Conductive Patch |  (A) |  (B) |  (C) |
|---|---|---|---|
| W [mm] x L [mm] | 12.0 x 12.0 | 10.5 x 10.5 | 9.0 x 9.0 |
| $W_C$ [mm] x $L_C$ [mm] | 2.7 x 2.7 | 2.7 x 2.7 | 2.7 x 2.7 |
| Area [$mm^2$] | 129.4 | 95.7 | 66.4 |

E-Field(1st Resonance Frequency)

E-Field(2nd Resonance Frequency)

ELECTRONIC DEVICE COMPRISING ANTENNA

CROSS-REFERENCE TO RELATED APPLICATIONS

This application a bypass continuation application of International Application No. PCT/KR2021/009490, filed on Jul. 22, 2021, which is based on and claims priority to Korean Patent Application No. 10-2020-0091136, filed on Jul. 22, 2020, in the Korean Intellectual Property Office, the disclosures of which are incorporated by reference herein in their entireties.

BACKGROUND

1. Field

The disclosure relates to an electronic device including an antenna.

2. Description of Related Art

With the development of wireless communication technology, a connectivity technology in which an electronic device is connected to an external device and provides various functions has emerged. For example, an electronic device may detect the position of the electronic device itself or an external device (e.g., an Internet of Things (IoT) device) based on wireless communication of the electronic device with the external device. The electronic device may control various functions of the external device based on the detected location or may provide various position-based services to a user possessing the electronic device.

In order to precisely detect the position of the electronic device and/or the position of an external electronic device, an ultra-wideband (e.g., UWB) communication technology is applied.

An antenna for UWB communication may be provided on a printed circuit board (PCB) including three layers. On the first layer of the PCB, a first patch operating at a first center frequency (e.g., 6.5 GHz), or a second patch having a smaller area than the first patch and operating at a second center frequency (e.g., 8 GHz) higher than the first center frequency may be disposed. On the second layer of the PCB, a shorting wall or a feed line located between the first patch and the second patch may be disposed. The feed line may be branched from the second layer of the PCB and connected to the first patch and the second patch disposed on the first layer via a via hole. On the third layer of the PCB, a ground for the first patch, the second patch, and the power supply line may be disposed.

A plurality of antennas may be provided for positioning an external device. For example, three antennas having the above-described structure may be included in an electronic device.

Since the above-described antenna uses a feed structure via a via hole in a three-layer PCB structure for feeding a dual band patch antenna, there may be restrictions on the thickness. Further, since the antenna has a complex multi-layer structure, the manufacturing cost of the antenna is high, and a space for mounting the antenna in an electronic device may be insufficient. Further still, since the polarization of the antenna is fixed, it may be difficult to adaptively perform communication in various communication environments, for example, a communication-poor environment according to a mounting direction of the electronic device.

SUMMARY

Provided is an electronic device capable of transmitting and/or receiving RF signals having various frequency bands and/or various polarization characteristics through an antenna including at least one conductive patch.

According to an aspect of the disclosure, an electronic device includes: a first antenna; and at least one processor operatively coupled to the first antenna, wherein the first antenna includes: a first conductive patch disposed on a first layer; a first transmission line disposed on the first layer and electrically connected to the first conductive patch; a ground disposed on the second layer; and a dielectric body disposed on a third layer between the first layer and the second layer, wherein the first conductive patch has a shape of a rectangle in which a first corner portion of the rectangle and a second corner portion of the rectangle are removed, the first corner portion and the second corner portion have a same size, and the second corner portion is located in a diagonal direction relative to the first corner portion, and wherein the at least one processor is configured to transmit or receive at least one of a first radio frequency (RF) signal of a first frequency band having a first polarization characteristic and a second RF signal of a second frequency band having a second polarization characteristic that is different from the first polarization characteristic by feeding power to the first conductive patch via the first transmission line.

The first conductive patch may include: a first slot extending through a center of the first conductive patch; and a second slot extending from an edge of the first conductive patch to an inner portion of the first conductive patch in a direction perpendicular to the edge.

The electronic device may further include: a second conductive patch disposed on the first layer; a second transmission line disposed on the first layer and electrically connected to the second conductive patch; a third conductive patch disposed on the first layer; and a third transmission line disposed on the first layer and electrically connected to a point of the third conductive patch, each of the second conductive patch and the third conductive patch has a shape that is the same as the shape of the first conductive patch, and the at least one processor is further configured to transmit or receive at least one of the first RF signal and the second RF signal by feeding power to the second conductive patch via the second transmission line and feeding power to the third conductive patch via the third transmission line.

The first conductive patch, the second conductive patch, and the third conductive patch are spaced apart from each other, and the first conductive patch, the second conductive patch, and the third conductive patch are disposed such that a line segment interconnecting the center of the first conductive patch and a center the second conductive patch and a line segment interconnecting the center of the second conductive patch and a center of the third conductive patch are not parallel to each other.

The first conductive patch and the second conductive patch may face each other in areas from which a corner portion of the first conductive patch and corner portion of the second conductive patch are removed.

The first polarization characteristic and the second polarization characteristic may be substantially orthogonal to each other, and the first frequency band and the second frequency band are different from each other.

The first antenna may include: a first patch disposed in a first area corresponding to the first corner portion; a first switch disposed in an electrical path between the first conductive patch and the first patch in the first area, and configured to selectively electrically interconnect the first conductive patch and the first patch; a second patch disposed in the first area; a second switch disposed in an electrical path between the first patch and the second patch in the first area, and configured to selectively electrically interconnect the first patch and the second patch; a third patch disposed in a second area corresponding to the second corner portion; a third switch disposed in an electrical path between the first conductive patch and the third patch in the second area, and configured to selectively electrically interconnect the first conductive patch and the third patch; a fourth patch disposed in the second area; and a fourth switch disposed in an electrical path between the third patch and the fourth patch in the second area, and configured to selectively electrically interconnect the third patch and the fourth patch, and the first switch, the first patch, the second switch, the second patch, the third switch, the third patch, the fourth switch, and the fourth patch are located on a diagonal line interconnecting the first corner portion and the second corner portion.

The at least one processor may be further configured to: transmit or receive the first RF signal of the first frequency band having the first polarization characteristic and the second RF signal of the second frequency band having the second polarization characteristic substantially orthogonal to the polarization characteristic and being higher than the first frequency band, in a first state in which the first switch, the second switch, the third switch, and the fourth switch are all turned off; and transmit or receive the first RF signal and a third RF signal of a third frequency band having the second polarization characteristic and being higher than the second frequency band, in a second state in which the first switch and the third switch are turned on and the second switch and the fourth switch are turned off; and transmit or receive the first RF signal and a fourth RF signal of a fourth frequency band having the second polarization characteristic and being higher than the third frequency band, in a third state in which the first switch, the second switch, and the third switch are turned off At least one of the first switch, the second switch, the third switch, and the fourth switch may include a PIN diode.

The shape of the first conductive patch may be the rectangle in which the first corner portion, the second corner portion, a third corner portion of the rectangle, and a fourth corner portion of the rectangle are removed, the first corner portion, the second corner portion, the third corner portion, and the fourth corner portion have the same size, and the fourth corner portion is located in a diagonal direction relative to the third corner portion, the first antenna may include: a first patch disposed in a first area corresponding to the first corner portion; a first switch disposed in an electrical path between the first conductive patch and the first patch in the first area, and configured to selectively electrically interconnect the first conductive patch and the first patch; a second patch disposed in a second area corresponding to the second corner portion; a second switch disposed in an electrical path between the first conductive patch and the second patch in the second area, and configured to selectively electrically interconnect the first conductive patch and the second patch; a third patch disposed in a third area corresponding to the third corner portion; a third switch disposed in an electrical path between the first conductive patch and the third patch in the third area, and configured to selectively electrically interconnect the first conductive patch and the third patch; a fourth patch disposed in a fourth area corresponding to the fourth corner portion; and a fourth switch disposed in an electrical path between the first conductive patch and the fourth patch in the fourth area, and configured to selectively electrically interconnect the first conductive patch and the fourth patch, the third switch, the third patch, the fourth switch, and the fourth patch are located on a first diagonal line interconnecting the third corner portion and the fourth corner portion, and the first switch, the first patch, the second switch, and the second patch are located on a second diagonal line interconnecting the first corner portion and the second corner portion.

The at least one processor may be further configured to transmit or receive a third RF signal of a third frequency band having a third polarization characteristic that is different from the first polarization characteristic and the second polarization characteristic, in a first state in which the first switch, the second switch, the third switch, and the fourth switch are turned off, and the third polarization characteristic of the third RF signal is a circular polarization characteristic.

The at least one processor may be further configured to transmit or receive a fourth RF signal of a fourth frequency band having the third polarization characteristic, in a fourth state in which the first switch, the second switch, the third switch, and the fourth switch are turned on, and the fourth frequency band of the fourth RF signal is lower than the third frequency band of the third RF signal.

The at least one processor may be further configured to transmit and/or receive the first RF signal and the second RF signal in a second state in which the first switch and the second switch are turned off and the third switch and the fourth switch are turned on, the second polarization characteristic of the second RF signal is substantially orthogonal to the first polarization characteristic of the first RF signal, and the second frequency band of the second RF signal is higher than the first frequency band of the first RF signal.

The at least one processor may be further configured to transmit or receive the first RF signal and the second RF signal in a third state in which the first switch and the second switch are turned on and the third switch and the fourth switch are turned off, the second polarization characteristic of the second RF signal is substantially orthogonal to the first polarization characteristic of the first RF signal, and the second frequency band of the second RF signal is lower than the first frequency band of the first RF signal.

The shape of the first conductive patch may be the rectangle in which the first corner portion, the second corner portion, a third corner portion of the rectangle, and a fourth corner portion of the rectangle are removed, the first corner portion, the second corner portion, the third corner portion, and the fourth corner portion have the same size, and the fourth corner portion is located in a diagonal direction relative to the third corner portion, the first antenna may include: a first patch disposed in a first area corresponding to the first corner portion; a first switch disposed in an electrical path between the first conductive patch and the first patch in the first area, and configured to selectively electrically interconnect the first conductive patch and the first patch; a second patch disposed in the first area; a second switch disposed in an electrical path between the first patch and the second patch in the first area, and configured to selectively electrically interconnect the first patch and the second patch; a third patch disposed in the first area in a direction from the second patch toward the third corner portion; a third switch disposed in an electrical path between the second patch and the third patch in the first area, and configured to selectively electrically interconnect the second patch and the third patch; a fourth patch disposed in the first area in a direction from the second patch toward the fourth corner portion; a fourth switch disposed in an electrical path between the second patch and the fourth patch in the first area, and configured to selectively electrically interconnect the second patch and the fourth patch; a fifth patch disposed in a second area corresponding to the second corner portion; a fifth switch disposed in an electrical path between the first conductive patch and the fifth patch in the second area, and configured to selectively electrically interconnect the first conductive patch and the fifth patch; a sixth patch disposed in the second area; a sixth switch disposed in an electrical path between the fifth patch and the sixth patch in the second area, and configured to selectively electrically interconnect the fifth patch and the sixth patch; a seventh patch disposed in the second area in a direction from the sixth patch toward the fourth corner portion; a seventh switch disposed in an electrical path between the sixth patch and the seventh patch in the second area, and configured to selectively electrically interconnect the sixth patch and the seventh patch; an eighth patch disposed in the second area in a direction from the sixth patch toward the third corner portion; an eighth switch disposed in an electrical path between the sixth patch and the eighth patch in the second area, and configured to selectively electrically interconnect the sixth patch and the eighth patch; a ninth patch disposed in a third area corresponding to the third corner portion; a ninth switch disposed in an electrical path between the first conductive patch and the ninth patch in the third area, and configured to selectively electrically interconnect the first conductive patch and the ninth patch; a tenth patch disposed in the third area; a tenth switch disposed in an electrical path between the ninth patch and the tenth patch in the third area, and configured to selectively electrically interconnect the ninth patch and the tenth patch; an eleventh patch disposed in the third area in a direction from the tenth patch toward the first corner portion; an eleventh switch disposed in an electrical path between the tenth patch and the eleventh patch in the third area, and configured to selectively electrically interconnect the tenth patch and the eleventh patch; a twelfth patch disposed in the third area in a direction from the tenth patch toward the second corner portion; a twelfth switch disposed in an electrical path between the tenth patch and the twelfth patch in the third area, and configured to selectively electrically interconnect the tenth patch and the twelfth patch; a thirteenth patch disposed in a fourth area corresponding to the fourth corner portion; a thirteenth switch disposed in an electrical path between the first conductive patch and the thirteenth patch in the fourth area, and configured to selectively electrically interconnect the first conductive patch and the thirteenth patch; a fourteenth patch disposed in the fourth area; a fourteenth switch disposed in an electrical path between the thirteenth patch and the fourteenth patch in the fourth area, and configured to selectively electrically interconnect the thirteenth patch and the fourteenth patch; a fifteenth patch disposed in the fourth area in a direction from the fourteenth patch toward the second corner portion; a fifteenth switch disposed in an electrical path between the fourteenth patch and the fifteenth patch in the fourth area, and configured to selectively electrically connect the fourteenth patch and the fifteenth patch; a sixteenth patch disposed in the fourth area in a direction from the fourteenth patch toward the first corner portion; and a sixteenth switch disposed in an electrical path between the fourteenth patch and the sixteenth patch in the fourth area, and configured to selectively electrically interconnect the fourteenth patch and the sixteenth patch, the ninth switch, the ninth patch, the tenth switch, the tenth patch, the thirteenth switch, the thirteenth patch, the fourteenth switch, and the fourteenth patch are located on a first diagonal line interconnecting the third corner portion and the fourth corner portion, and the first switch, the first patch, the second switch, the second patch, the fifteenth switch, the fifteenth patch, the sixteenth switch, and the sixteenth patch are located on a second diagonal line interconnecting the first corner portion and the second corner portion.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
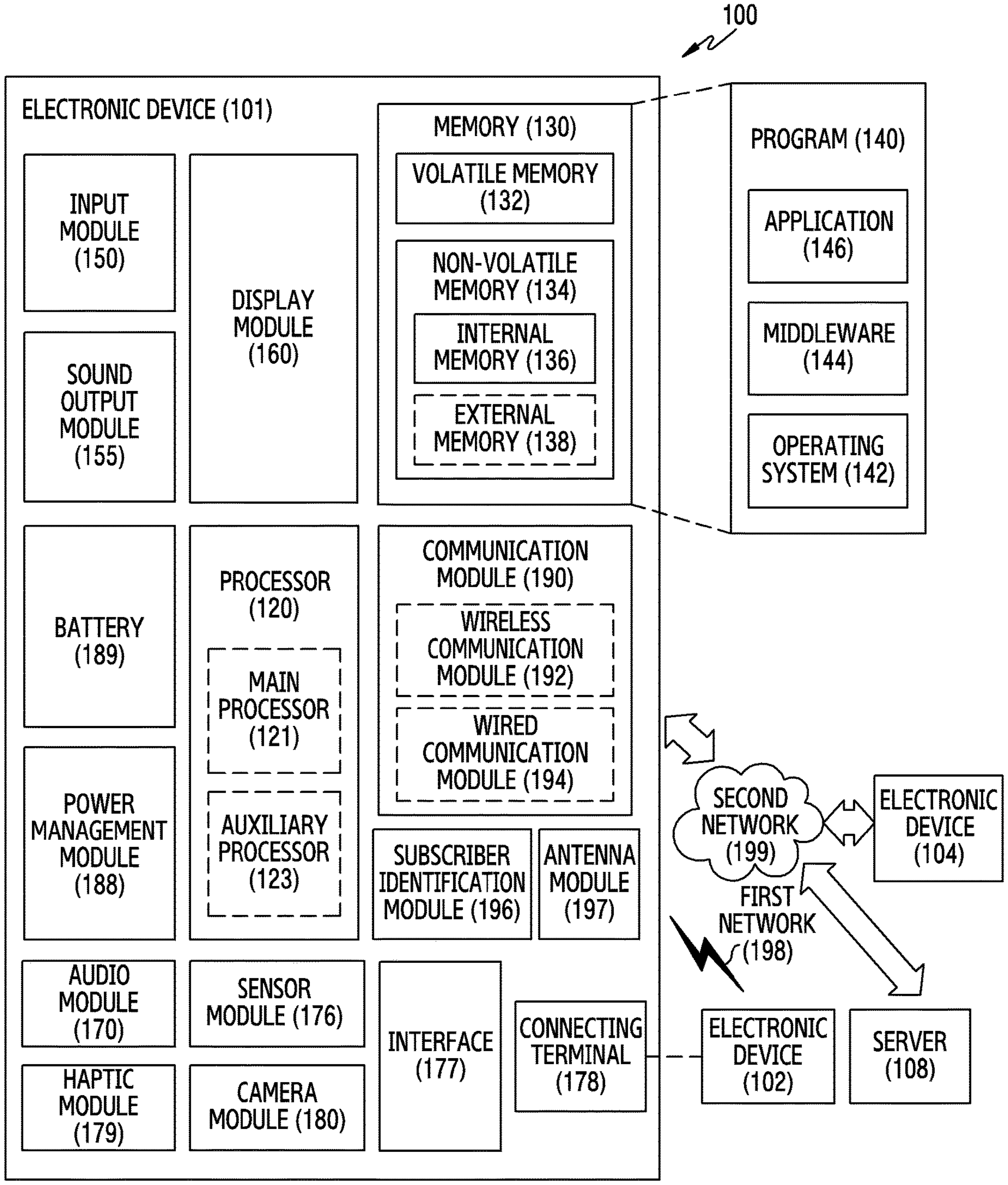
FIG. 1 is a block diagram of an electronic device according to various embodiments in a network environment.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. However, the electronic devices of embodiments of the disclosure are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
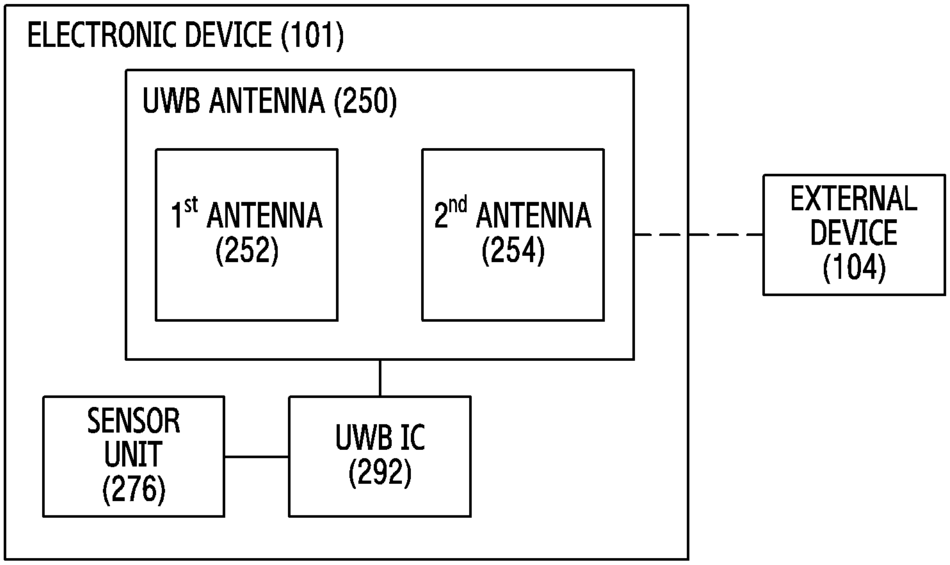
FIG. 2 is a simplified block diagram of an electronic device according to an
embodiment.

FIG. 2 is a simplified block diagram of an electronic device according to an embodiment.

The electronic device 101 according to an embodiment may include at least one of the components illustrated in FIG. 1 in addition to the components illustrated in FIG. 2.

Referring to FIG. 2, an electronic device 101 according to an embodiment may include an antenna 250 (e.g., ultra-wide band (UWB) antenna), a UWB integrated circuitry (IC) 292 (e.g.; the wireless communication module 192 in FIG. 1), and/or a sensor unit 276 (e.g., the sensor module 176 in FIG. 1).

According to an embodiment, the antenna 250 (e.g., UWB antenna) may include a first antenna 252 and/or a second antenna 254. In an embodiment, the first antenna 252 may operate as an antenna for transmitting or receiving a radio frequency (RF) signal of a predetermined band. The RF signal of the predetermined band may include, for example, a UWB signal transmitted in a UWB frequency band (e.g., a frequency band having a center frequency of 6 GHz or 8 GHz). The UWB signal may be based on an impulse radio scheme. The UWB signal may have a predetermined bandwidth, for example, a bandwidth of 499 MHz or a bandwidth of 500 MHz or more. However, embodiments of the disclosure are not limited thereto.

In an embodiment, the first antenna 252 may operate as an antenna for measuring a distance between the electronic device 101 and an external device 104. The first antenna 252 may include various types of antenna structures. For example, the first antenna 252 may include a patch antenna, a dipole antenna, a monopole antenna, a slot antenna, a loop antenna, an inverted-F antenna, a planar inverted-F antenna, and/or an antenna structure in which two or more of these antennas are combined.

In an embodiment, the second antenna 254 may operate as an antenna for transmitting or receiving an RF signal of a predetermined band. For example, the second antenna 254 may operate as an antenna for measuring an angle of arrival (AOA) of an RF signal received from the external device 104. The second antenna 254 may include at least one conductive patch.

The first antenna 252 has been described as an antenna for measuring a distance from an external device 104, and the second antenna 254 has been described as an antenna for measuring the angle of arrival of a signal received from the external device 104, but embodiments of the disclosure are not limited thereto. For example, the first antenna 252 and/or the second antenna 254 may operate as an antenna for measuring a distance and/or an antenna for measuring an angle of arrival.

In another embodiment, the first antenna 252 may be omitted. When the first antenna 252 is omitted, for example, the second antenna 254 may operate as an antenna for measuring a distance and an antenna for measuring an angle of arrival. As another example, when the first antenna 252 is omitted, another antenna that is distinguished from the first antenna 252 and the second antenna 254 (e.g., antennas for short-distance communication such as Wi-Fi and/or Bluetooth) may operate as an antenna for measuring a distance, and the second antenna 254 may operate as an antenna for measuring an angle of arrival.

In an embodiment, the sensor unit 276 may include at least one sensor. For example, the sensor unit 276 may include at least one of a gyro sensor, a magnetic field sensor (or a geomagnetic sensor), and/or a global navigation satellite system (GNSS) (e.g., a global positioning system (GPS)).

In an embodiment, the UWB IC 292 (or a communication circuit) may be electrically connected to the antenna 250 (e.g., UWB antenna) and/or the sensor unit 276. The UWB IC 292 may include a processing circuit for controlling the antenna 250 (e.g., UWB antenna). The processing circuit may include at least one processor. In an embodiment, the UWB IC 292 may be at least partially integrated into the processor 120 of FIG. 1. In this case, the processor 120 may perform at least some of the functions of the UWB IC 292.

In an embodiment, the UWB IC 292 may detect the position of the external device 104 by using the antenna 250 (e.g., UWB antenna) and/or the sensor unit 276. The external device 104 may include, for example, various devices capable of wireless communication. For example, the external device 104 may include wearable devices such as a laptop computer, a tablet computer, a mobile phone, an electronic watch, headphones, and earbuds, or a vehicle capable of wireless communication, but is not limited by the above-mentioned examples.

Hereinafter, a method for the electronic device 101 to detect the position of the external device 104 will be described.

The UWB IC 292 according to an embodiment may measure a distance between the electronic device 101 and the external device 104 based on an RF signal transmitted/received to/from the external device 104. The UWB IC 292 may transmit/receive a message including time stamp information to/from the external device 104 by using the first antenna 252. For example, the UWB IC 292 may transmit at least one distance measurement request message including information on a transmission time to the external device 104 by using the first antenna 252. The external device 104 may transmit at least one distance measurement response message to the electronic device 101 in response to receiving the at least one distance measurement request message. The UWB IC 292 may receive the at least one distance measurement response message by using the first antenna 252 and/or the second antenna 254. The at least one distance measurement request message and the at least one distance measurement response message may include time information for each transmission/reception time. The UWB IC 292 may determine a round trip time (RTT) required to receive the at least one distance measurement response message after transmitting the at least one distance measurement request message. The UWB IC 292 may determine a reply time, which is a time required for the external device 104 to transmit the at least one distance measurement response message after receiving the at least one distance measurement request message. Based on the RTT and the reply time, the UWB IC 292 may determine a time of flight (TOF), which is a time required for a radio wave to be transmitted from the electronic device 101 and to reach the external device 104 (e.g., (RTT-reply time)÷2). The UWB IC 292 may measure the distance between the electronic device 101 and the external device 104 based on the TOF (e.g., TOF× speed of light).

In an embodiment, the UWB IC 292 may measure the angle of arrival (AOA) of the RF signal received from the external device 104 by using the second antenna 254. For example, when the second antenna 254 includes the first conductive patch and the second conductive patch, the UWB IC 292 may determine a phase difference between the RF signal received by using the first conductive patch and the RF signal received by using the second conductive patch. The UWB IC 292 may determine the angle of arrival of the RF signal received from the external device 104 based on the determined phase difference of the RF signal, the wavelength of the received RF signal, and the physical distance between the first conductive patch and the second conductive patch.

In an embodiment, the UWB IC 292 may determine the position of the external device 104 based on the determined distance and the determined angle of arrival. For example, the UWB IC 292 may acquire information on the magnetic north direction by using the sensor unit 276, and may determine the direction (or azimuth) of the external device 104 based on the acquired information on the magnetic north direction and the determined angle of arrival. The UWB IC 292 may detect the position of the external device 104 based on the determined direction and the determined distance.

However, the method for the UWB IC 292 to detect the position of the external device 104 is not limited by the above-described example, and various methods available to those skilled in the art may be applied.

Figure 3:
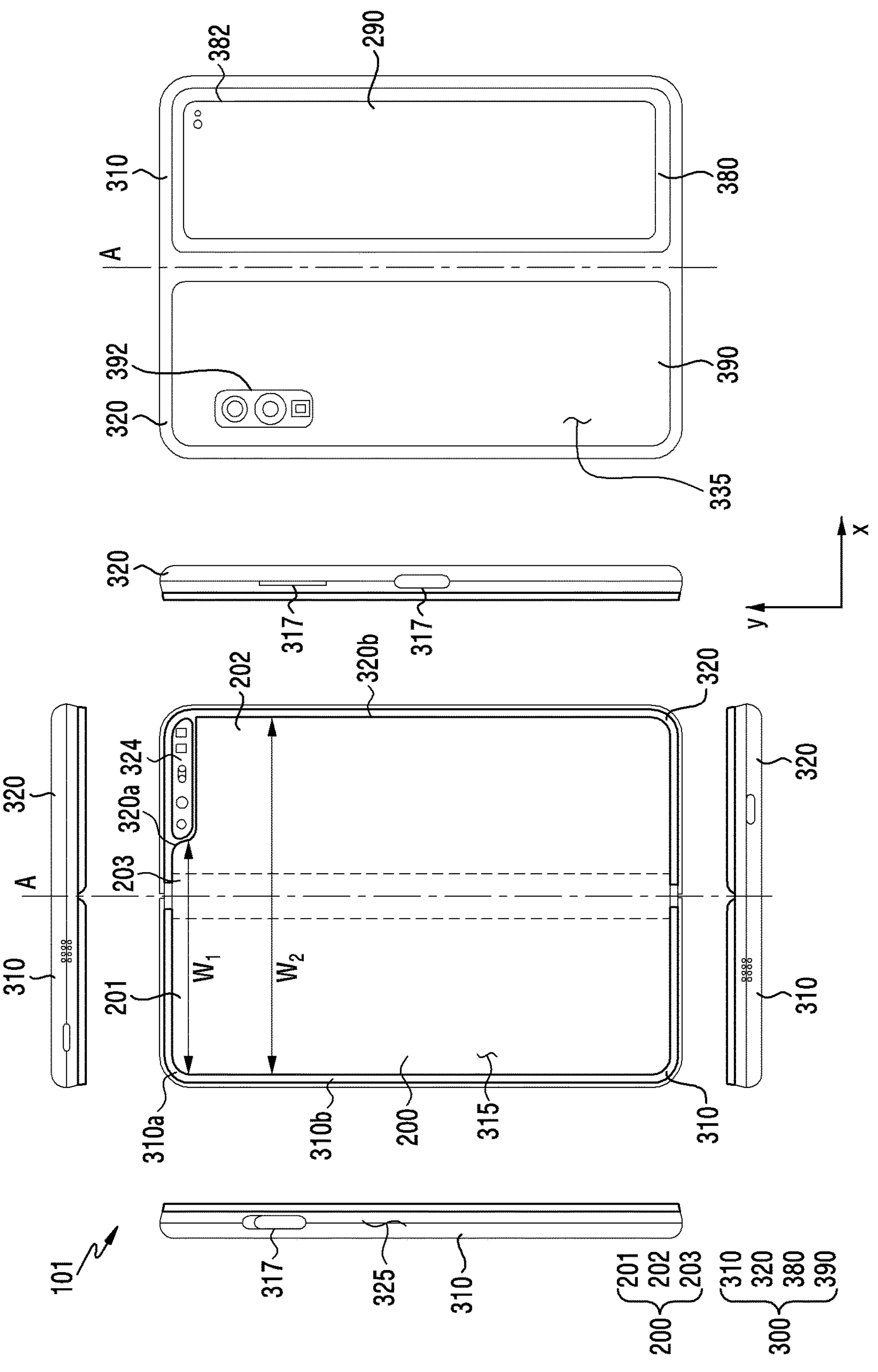
FIG. 3 is a view illustrating an electronic device according to an embodiment in an unfolded state.

FIG. 3 is a view illustrating an electronic device according to an embodiment in an unfolded state.

Figure 4:
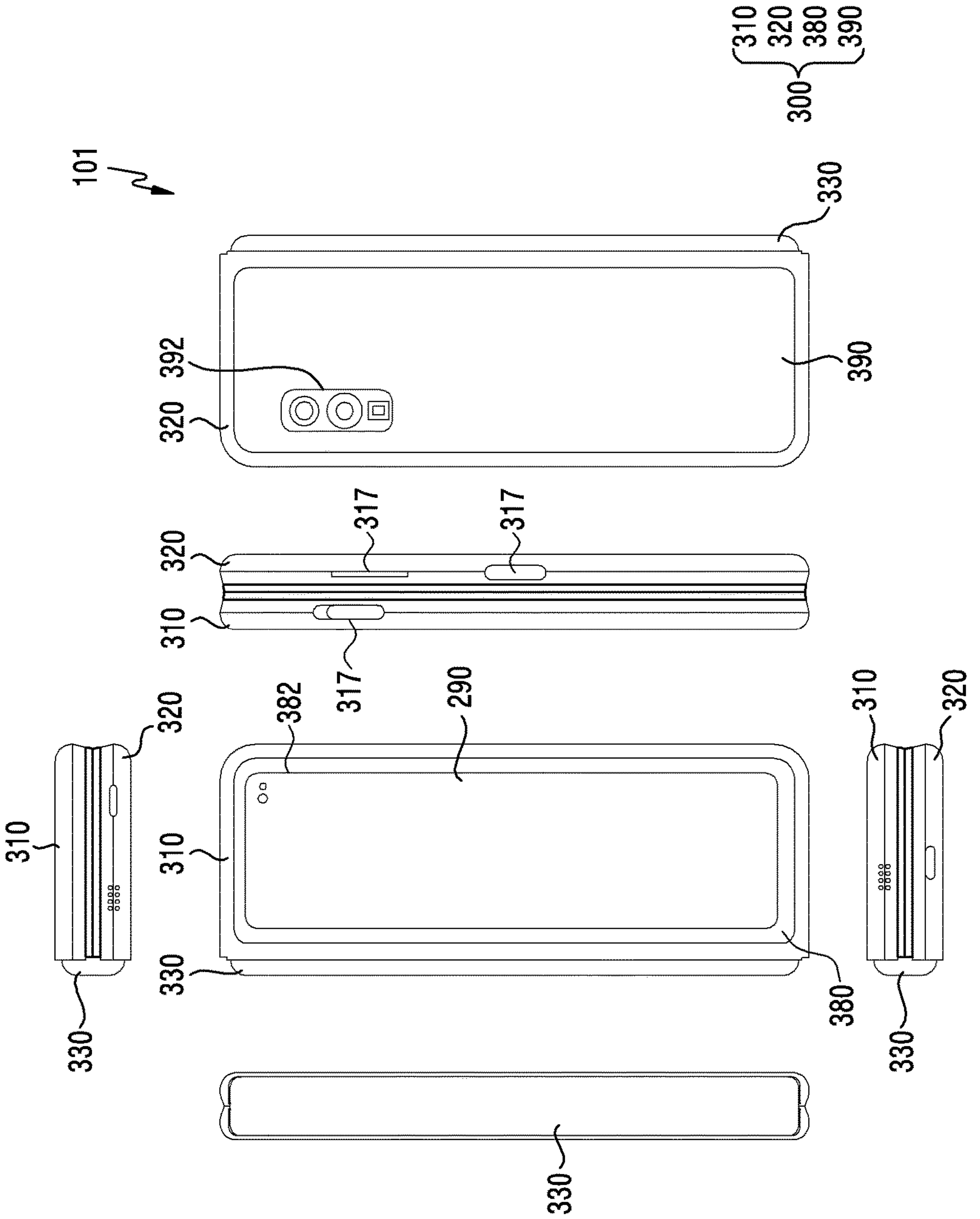
FIG. 4 is a view illustrating the electronic device according to an embodiment in a folded state.

FIG. 4 is a view illustrating the electronic device according to an embodiment in a folded state.

Referring to FIGS. 3 and 4, in an embodiment, the electronic device 101 may include a foldable housing 300, a hinge cover 330 configured to cover the foldable portion of the foldable housing, and/or a flexible or foldable display 200 (hereinafter, simply referred to as a "display" 200) (e.g., the display module 160 in FIG. 1) disposed in the space defined by the foldable housing 300. The electronic device 101 may include a front surface 315 on which the display 200 is disposed, a rear surface 335 that is opposite to the front surface 315, and a side surface 325 that surrounds the space between the front surface 315 and the rear surface 335.

In an embodiment, the foldable housing 300 may include a first housing structure 310, a second housing structure 320 including a sensor area 324, a first rear surface cover 380, and/or a second rear surface cover 390. The foldable housing 300 of the electronic device 101 is not limited to the shape and assembly illustrated in FIGS. 3 and 4, but may be implemented by combinations and/or assemblies of other shapes or components. For example, in another embodiment, the first housing structure 310 and the first rear surface cover 380 may be integrated with each other, and the second housing structure 320 and the second rear surface cover 390 may be integrated with each other.

In the illustrated embodiment, the first housing structure 310 and the second housing structure 320 may be disposed on opposite sides about a folding axis (axis A), and may have generally symmetrical shapes about the folding axis A. As will be described later, the first housing structure 310 and the second housing structure 320 may have different angles or distances therebetween depending on whether the electronic device 101 is in the unfolded state, in the folded state, or in the intermediate state. In the illustrated state, unlike the first housing structure 310, the second housing structure 320 may further include the sensor area 324 in which various sensors are disposed, but the first housing structure and the second housing structure may have mutually symmetrical shapes in other areas. In another embodiment, the sensor area 324 may be located in the first housing structure 310.

In an embodiment, as illustrated in FIG. 2, the first housing structure 310 and the second housing structure 320 may define together a recess that accommodates the display 200. In the illustrated embodiment, due to the sensor area 324, the recess may have two or more different widths in a direction perpendicular to the folding axis A.

For example, the recess has a first width $W_1$ and a second width W2. The first width $W_1$ may mean a space between a first portion 310*a* of the first housing structure 310 parallel to the folding axis A and a first portion 320*a* provided in an edge of the sensor area 324 of the second housing structure 320. The second width $W_2$ may be defined by a second portion 310*b* of the first housing structure 310 and a second portion 320*b* of the second housing structure 320 that does not correspond to the sensor area 324 and is parallel to the folding axis A. In this case, the second width $W_2$ may be longer than the first width Wi. For example, the first portion 310*a* of the first housing structure 310 and the first portion 320*a* of the second housing structure 320, which are asymmetrical to each other, may define the first width $W_1$ of the recess, and the second portion 310*b* of the first housing structure 310 and the second portion 320*b* of the second housing structure 320, which are symmetrical to each other, may define the second width $W_2$ of the recess. In an embodiment, the first portion 320*a* and the second portion 320*b* of the second housing structure 320 may have different distances from the folding axis A. The widths of the recess are not limited to the illustrated example. In various embodiments, the recess may have multiple widths due to the shape of the sensor area 324 or due to the asymmetrical portions of the first housing structure 310 and the second housing structure 320. As another example, the sensor area 324 may be omitted, and the first housing structure 310 and the second housing structure 320 may be configured to be substantially symmetrical to each other.

In an embodiment, at least a portion of the first housing structure 310 and at least a portion of the second housing structure 320 may be formed of a metal material or a non-metal material having a rigidity of a level selected in order to support the display 200.

According to an embodiment, the sensor area 324 may have a predetermined area adjacent to one corner of the second housing structure 320. However, the arrangement, shape, and size of the sensor area 324 are not limited to those in the illustrated example. For example, in another embodiment, the sensor area 324 may be provided at another corner of the second housing structure 320 or in any area between the upper and lower end corners. In an embodiment, components embedded in the electronic device 101 to execute various functions may be exposed to the front surface 315 of the electronic device 101 through the sensor area 324 or one or more openings provided in the sensor area 324. In various embodiments, the components may include various types of sensors. The sensors may include at least one of, for example, a front camera, a receiver, or a proximity sensor. As another example, the sensor area 324 illustrated in the drawing may be omitted, and a display may be located. For example, at least one sensor included in the sensor area 324 may be disposed between the display and the second rear surface cover 390.

The first rear surface cover 380 may be disposed on one side of the folding axis in the rear surface 335 of the electronic device, and may have, for example, a substantially rectangular periphery, which may be enclosed by the first housing structure 310. As another example, the second rear surface cover 390 may be disposed on the other side of the folding axis of the rear surface 335 of the electronic device, and the periphery of the second rear surface cover 390 may be enclosed by the second housing structure 320.

In an embodiment, the first rear surface cover 380 and the second rear surface cover 390 may have substantially symmetrical shapes about the folding axis (the axis A). However, the first rear surface cover 380 and the second rear surface cover 390 do not necessarily have mutually symmetrical shapes. In another embodiment, the electronic device 101 may include the first rear surface cover 380 and the second rear surface cover 390 having various shapes. In still another embodiment, the first rear surface cover 380 may be configured integrally with the first housing structure 310, and the second rear surface cover 390 may be configured integrally with the second housing structure 320.

In an embodiment, the first rear surface cover 380, the second rear surface cover 390, the first housing structure 310, and the second housing structure 320 may define a space in which various components (e.g., a printed circuit board or a battery) of the electronic device 101 may be disposed. In an embodiment, one or more components may be disposed or visually exposed on the rear surface 335 of the electronic device 101. For example, at least a portion of a sub-display 290 may be visually exposed through a first rear surface area 382 of the first rear surface cover 380. In another embodiment, one or more components or sensors may be visually exposed through a second rear surface area 392 of the second rear surface cover 390. In various embodiments, the sensors may include a proximity sensor and/or a rear camera.

In an embodiment, the electronic device 101 may include a key input device 317. The key input device 317 may include, for example, a function button such as a volume control button or a power button. According to various embodiments, the key input device 317 may be disposed on the side surface 325 of the electronic device 101. In another embodiment, the electronic device 101 may not include some of the above-mentioned key input devices 317, and a key input device, which is not included in the above-mentioned key input devices, may be implemented in another type, such as a soft key, on the display 200. According to various embodiments, the key input device 317 may include various types of sensor modules. For example, the key input device 317 may include a fingerprint recognition sensor module. The fingerprint recognition sensor module may be mounted on the key input device 317 so that the key input device 317 may be used as a button combined with a fingerprint sensor.

Referring to FIG. 4, the hinge cover 330 may be disposed between the first housing structure 310 and the second housing structure 320 to cover internal components (e.g., the hinge structure 340). In an embodiment, at least a portion of the hinge cover 330 may be covered by a portion of the first housing structure 310 and a portion of the second housing structure 320, or may be exposed to the outside depending on whether the electronic device 101 is in the unfolded state (flat state) or in the folded state.

For example, as illustrated in FIG. 3, when the electronic device 101 is in the unfolded state, the hinge cover 330 may not be exposed by being covered by the first housing structure 310 and the second housing structure 320. As an example, as illustrated in FIG. 4, when the electronic device 101 is in the folded state (e.g., the fully folded state), the hinge cover 330 may be exposed to the outside between the first housing structure 310 and the second housing structure 320. As an example, when the first housing structure 310 and the second housing structure 320 are in the intermediate state of being folded with a certain angle therebetween, the hinge cover 330 may be partially exposed to the outside between the first housing structure 310 and the second housing structure 320. However, the area exposed in this case may be smaller than that in the fully folded state. In an embodiment, the hinge cover 330 may include a curved surface.

The display 200 may be disposed in a space defined by the foldable housing 300. For example, the display 200 may be located in the recess defined by the foldable housing 300, and may provide most of the front surface 315 of the electronic device 101.

In an embodiment, the front surface 315 of the electronic device 101 may include the display 200, and a partial area of the first housing structure 310 and a partial area of the second housing structure 320, which are adjacent to the display 200. In an embodiment, the rear surface 335 of the electronic device 101 may include the first rear surface cover 380, a partial area of the first housing structure 310 adjacent to the first rear surface cover 380, the second rear surface cover 390, and a partial area of the second housing structure 320 adjacent to the second rear surface cover 390.

The display 200 may be a display in which at least a partial area is deformable into a planar surface or a curved surface. In an embodiment, the display 200 may include a folding area 203, a first area 201 disposed on one side of the folding area 203 (e.g., the left side of the folding area 203 illustrated in FIG. 2) and a second area 202 disposed on the other side of the folding area 203 (e.g., the right side of the folding area 203 illustrated in FIG. 2).

The area division of the display 200 illustrated in FIG. 3 is exemplary, and the display 200 may be divided into multiple areas (e.g., four or more areas, or two areas) depending on the structure or functions thereof. For example, in the embodiment illustrated in FIG. 3, the areas of the display 200 may be divided by the folding area 203 or the folding axis (the axis A) extending parallel to the y axis. However, in another embodiment, the areas of the display 200 may be divided based on another folding area (e.g., a folding area parallel to the x axis) or another folding axis (e.g., a folding axis parallel to the x axis).

The first area 201 and the second area 202 may have generally symmetrical shapes about the folding area 203. In an embodiment, unlike the first area 201, the second area 202 may include a notch cut due to the presence of the sensor area 324, but may have a shape symmetrical to the first area 201 in areas other than the sensor area. For example, the first area 201 and the second area 202 may include portions having mutually symmetrical shapes and portions having mutually asymmetrical shapes.

Hereinafter, the operations of the first housing structure 310 and the second housing structure 320 and respective areas of the display 200 according to the states of the electronic device 101 (e.g., the unfolded state (flat state) and the folded state) will be described.

In an embodiment, when the electronic device 101 is in the unfolded state (flat state) (e.g., FIG. 3), the first housing structure 310 and the second housing structure 320 may be disposed to form an angle of about 180 degrees therebetween and to face substantially the same direction. The surface of the first area 201 and the surface of the second area 202 of the display 200 may form about 180 degrees relative to each other and may face substantially the same direction (e.g., the front surface 315 direction of the electronic device). The folding area 203 may define a single plane with the first area 201 and the second area 202.

In an embodiment, when the electronic device 101 is in the fully folded state (e.g., FIG. 4), the first housing structure 310 and the second housing structure 320 may be disposed to face each other. For example, the surface of the first area 201 and the surface of the second area 202 of the display 200 may face each other while forming a narrow angle with each other. In an embodiment, at least a portion of the folding area 203 may be configured as a curved surface having a predetermined curvature. According to various embodiments, when the electronic device 101 is in the fully folded state, the display 200 may be substantially covered from a user's view.

In an embodiment, when the electronic device 101 is in the intermediate state (a folded state), the first housing structure 310 and the second housing structure 320 may be arranged with a certain angle therebetween. The surface of the first area 201 and the surface of the second area 202 of the display 200 may form an angle greater than that in the folded state and smaller than that in the unfolded state. At least a portion of the folding area 203 may have a curved surface having a predetermined curvature, and the curvature at this time may be smaller than that in the folded state.

Figure 5:
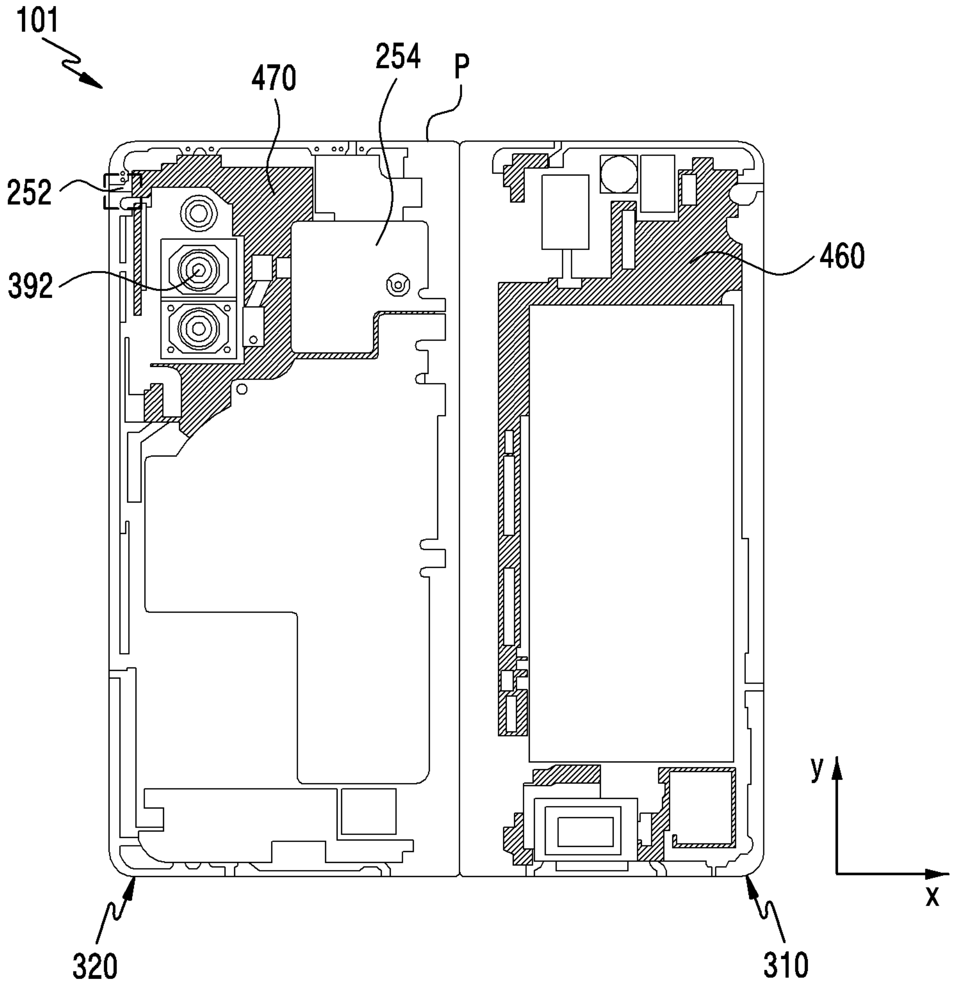
FIG. 5 is a view illustrating the inside of an electronic device according to an embodiment.

FIG. 5 is a view illustrating the inside of an electronic device according to an embodiment.

Hereinafter, a description of components denoted with the same reference numerals as the above-mentioned reference numerals will be omitted.

Referring to FIG. 5, the electronic device 101 according to an embodiment may include a first substrate 460 and/or a second substrate 470.

In an embodiment, the first substrate 460 may be disposed in a space defined by the first housing structure 310. The first substrate 460 may be disposed between the first housing structure 310 (or the first rear surface cover 380 of FIG. 3) and the display 200 of FIG. 3.

In an embodiment, the second substrate 470 may be disposed in a space defined by the second housing structure 320. The second substrate 470 may be disposed between the second housing structure 320 (or the second rear surface cover 390 of FIG. 3) and the display 200 of FIG. 3.

A connecting member (e.g., a flexible printed circuit board) for electrically interconnecting the first substrate 460 and the second substrate 470 may be disposed between the first housing structure 310 and the second housing structure 320.

In an embodiments, components for implementing various functions of the electronic device 101 may be mounted on the first substrate 460 and the second substrate 470. For example, at least one of the components illustrated in FIGS. 1 and 2 may be disposed on the first substrate 460 and/or the second substrate 470.

In an embodiment, the first antenna 252 may be disposed on the second housing structure 320. For example, at least a portion of the second housing structure 320 may include a conductive portion, which may act as a radiating element of the first antenna 252. As another example, the first antenna 252 may include an antenna radiator manufactured through laser direct structuring (LDS). In this case, the first antenna 252 is directly configured on the second substrate 470 within the second housing structure 320, or may be manufactured in a separate module form and located on the second substrate 470 or the second housing structure 320. When the first antenna 252 is able to include an antenna radiator manufactured in an antenna carrier through LDS, the antenna carrier may be located in the second housing structure 320.

In an embodiment, the second antenna 254 may be disposed on one surface of the second substrate 470. The second antenna 254 and the first antenna 252 may be electrically connected to a UWB IC (e.g., the UWB IC 292 in FIG. 2) via an electrical path provided by the second substrate 470.

In another embodiment, the first antenna 252 and the second antenna 254 may be disposed on the first housing structure 310.

Figure 6A:
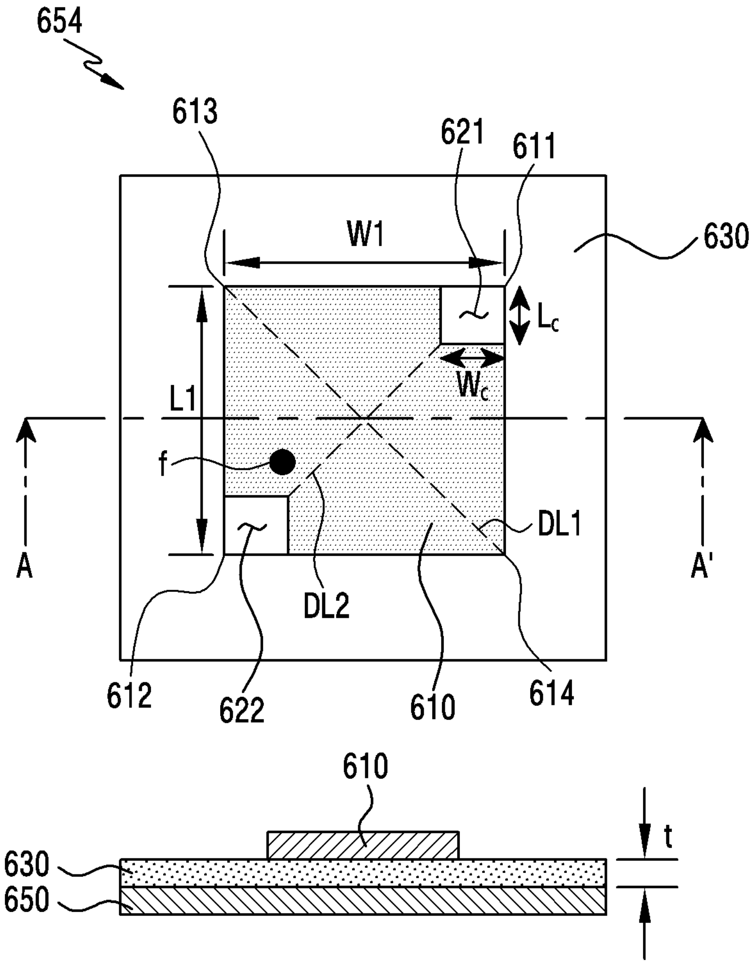
FIG. 6A illustrates an antenna according to an embodiment.

FIG. 6A illustrates an antenna according to an embodiment.

Figure 6B:
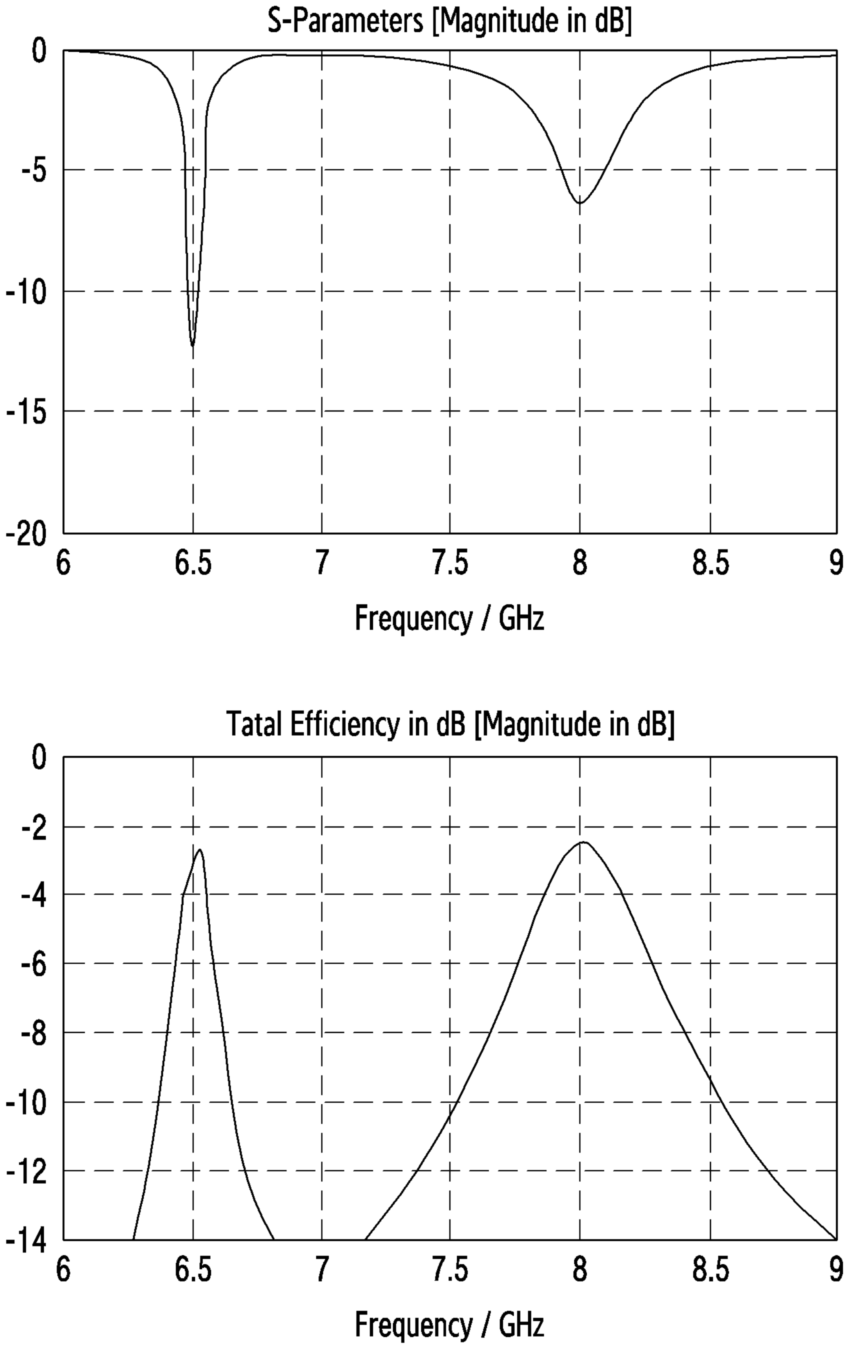
FIG. 6B illustrates graphs showing radiation characteristics of an antenna according to an embodiment.

FIG. 6B is a graph illustrating radiation characteristics of an antenna according to an embodiment.

Figure 6C:
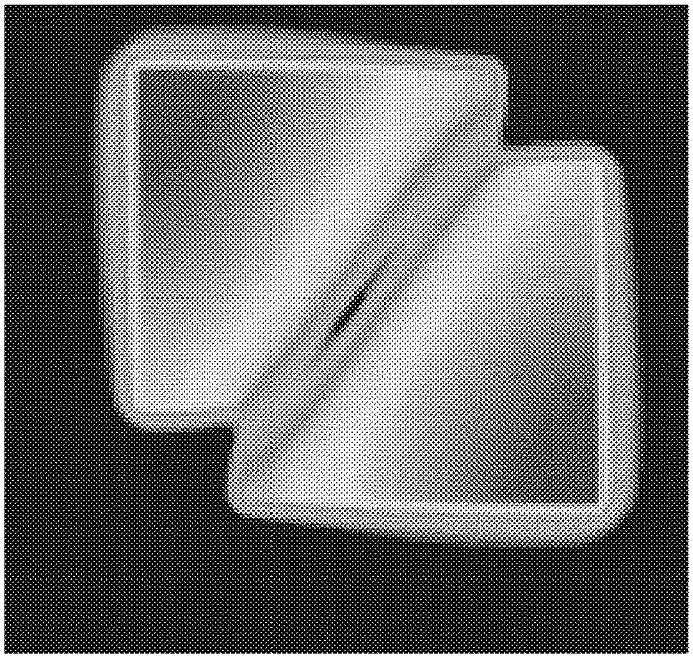
FIG. 6C is a view illustrating polarization characteristics of an antenna according to an embodiment.
Figure 6C:
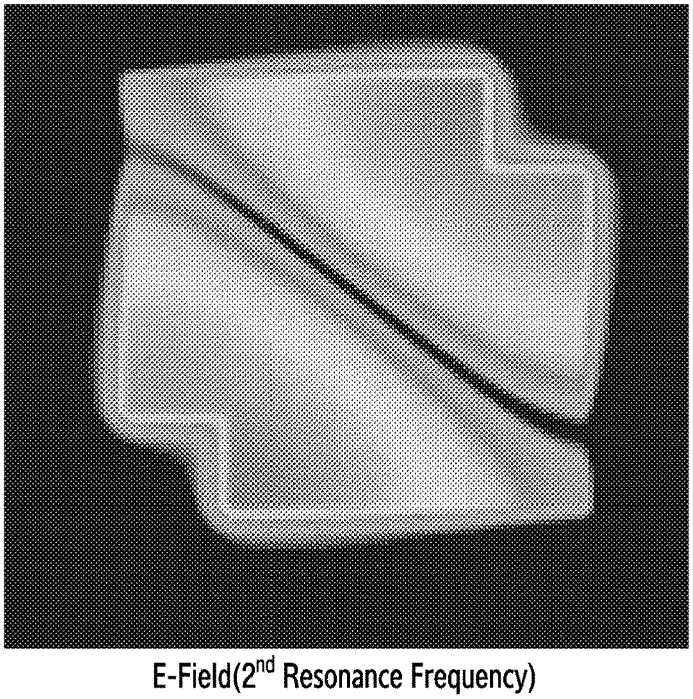

FIG. 6C is a view illustrating polarization characteristics of an antenna according to an embodiment.

Figure 6D:
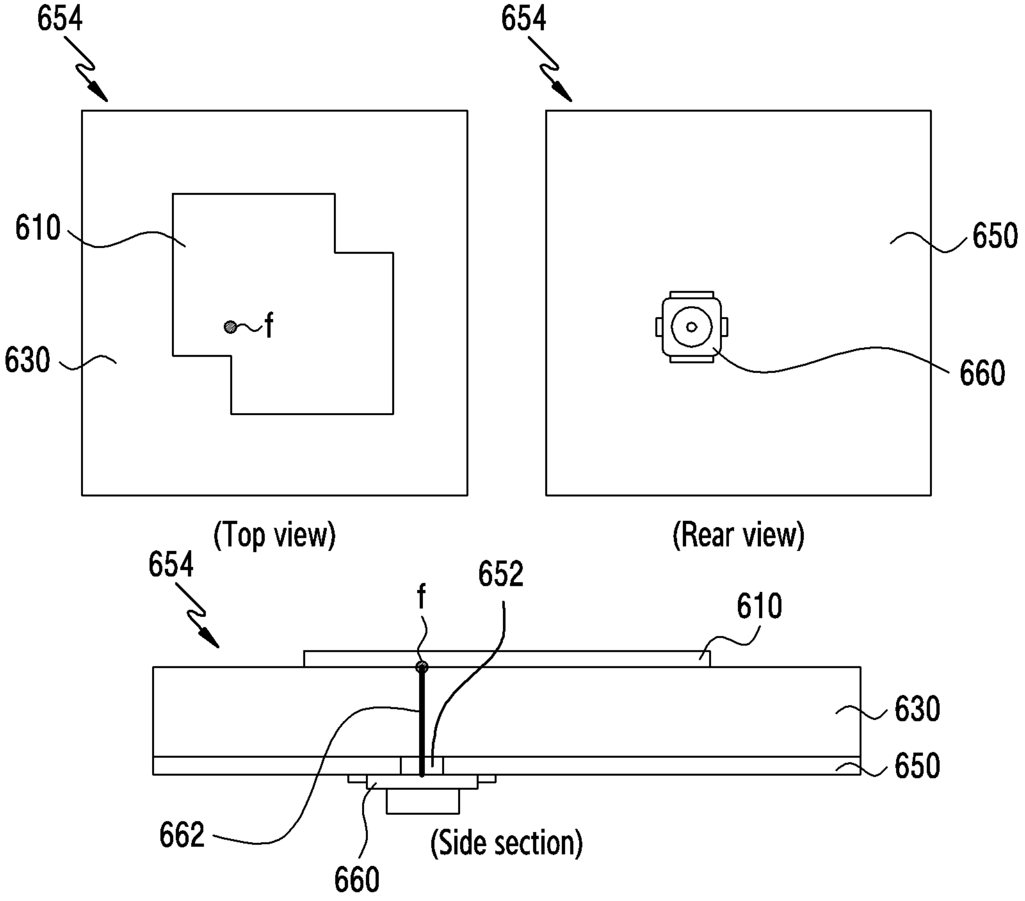
FIG. 6D is a view illustrating a feed scheme of an antenna according to an embodiment.

FIG. 6D is a view illustrating a feed scheme of an antenna according to an embodiment.

Figure 6E:
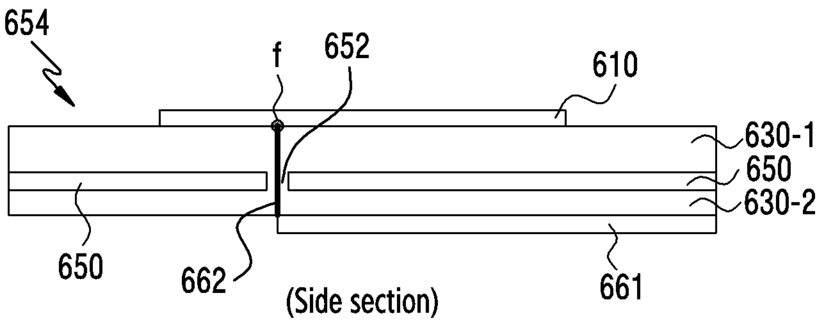
FIG. 6E is a view illustrating a feed scheme of an antenna according to an embodiment.

FIG. 6E is a view illustrating a feed scheme of an antenna according to an embodiment.

Figure 6F:
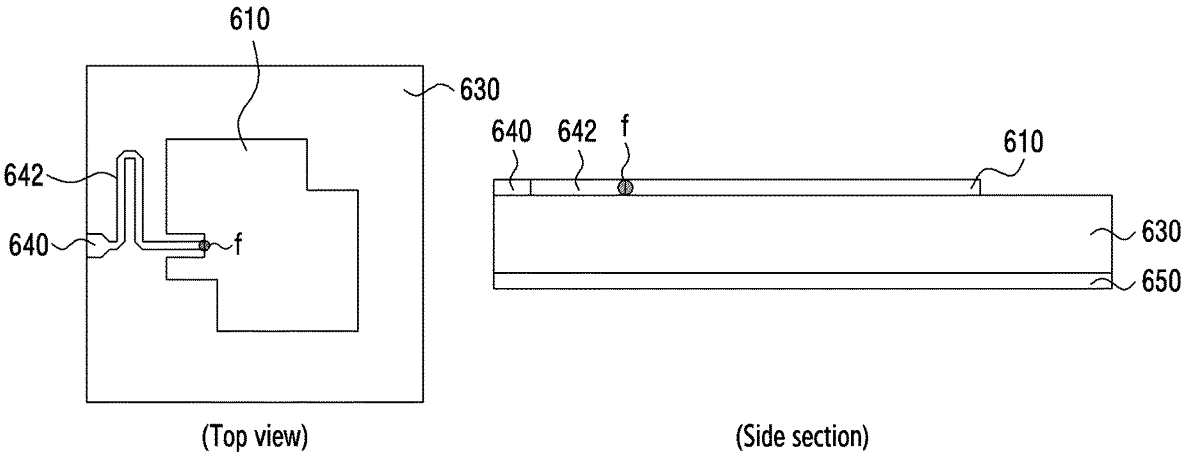
FIG. 6F is a view illustrating a feed scheme of an antenna according to an embodiment.

FIG. 6F is a view illustrating a feed scheme of an antenna according to an embodiment.

Referring to FIG. 6A, an antenna 654 (e.g., the second antenna 254 of FIG. 5) according to an embodiment may include a conductive patch 610 and/or a ground 650. In an embodiment, the conductive patch 610 may be disposed on a dielectric body 630.

In an embodiment, the ground 650 may be disposed below the dielectric body 630. The ground 650 may include a conductive material such as metal. For example, the ground 650 may be a conductive plate. The ground 650 may be spaced apart from the conductive patch 610. The ground 650 may be substantially parallel to the conductive patch 610. In an embodiment, the ground 650 may be a first conductive layer of a printed circuit board.

In an embodiment, the dielectric body 630 may be disposed between the conductive patch 610 and the ground 650. In an embodiment, the dielectric constant and thickness of the dielectric body 630 may be set according to the required radiation characteristics (e.g., radiation efficiency and bandwidth) of the antenna 654. For example, the dielectric body 630 may have a predetermined dielectric constant and a predetermined thickness t. For example, the predetermined dielectric constant of the dielectric body 630 may be about 3.3, and the predetermined thickness t of the dielectric body 630 may be about 0.25 mm. In an embodiment, the dielectric body 630 may be a non-conductive layer of a printed circuit board.

In an embodiment, the conductive patch 610 may be disposed on the dielectric body 630. In an embodiment, the conductive patch 610 may have a shape obtained by removing the first area 621 and the second area 622 from a rectangle having a width W1 and a length L1. The first area 621 may include a first corner 611 of the rectangle, in which the rectangle may have a predetermined width $W_c$ and a predetermined length $L_c$. The second area 622 may include a second corner 612 of the rectangle located in a diagonal direction relative to the first corner 611, and may have substantially the same width W and length $L_c$ as the first area 621. The rectangle having the width W1 and the length L1 may have a first size, and the first area 621 or the second area 622 may have a second size smaller than the first size. In an embodiment, the conductive patch 610 may be a second conductive layer of the printed circuit board.

In an embodiment, the shape and area of the conductive patch 610 may be set depending on a required resonance characteristic (e.g., a resonance frequency). For example, the width W1 may be 12.4 mm, and the length L1 may be 11.5 mm. For example, the predetermined width $W_c$ of the first area 621 may be 2.8 mm, and the predetermined length $L_c$ may be 2.6 mm. In an embodiment, the conductive patch 610 may include a conductive material such as a metal foil.

In an embodiment, the conductive patch 610 may include a virtual first diagonal line DL1 interconnecting a third corner 613 and a fourth corner 614 located in the diagonal direction relative to the third corner 613 and a second virtual diagonal line DL2 interconnecting the first area 621 and the second area 622. The length of the first diagonal line DL1 may be greater than that of the second diagonal line DL2. The first diagonal line DL1 and the second diagonal line DL2 may form a predetermined angle (e.g., about 75° to about 90°.

In an embodiment, the conductive patch 610 may be fed with power at a predetermined point f In an embodiment, various schemes may be applied to feed power to the predetermined point f of the conductive patch 610.

For example, referring to FIG. 6D, the conductive patch 610 may be fed with power by using a feed connector 660 and a conductive member 662 disposed on the rear surface of the antenna 654 (or one surface of the ground 650). The feed connector 660 may be electrically connected to a UWB IC (e.g., the UWB IC 292 of FIG. 2). The conductive member 662 may include a conductive via. The conductive member 662 may penetrate an opening 652 provided in the ground 650 and the dielectric body 630, and may be electrically connected to the conductive patch 610 at the predetermined point f The UWB IC may feed power to the conductive patch 610 via the feed connector 660 and the conductive member 662.

As another example, referring to FIG. 6E, the conductive patch 610 may be fed with power by using a conductive wire 661 and the conductive member 662. In an embodiment, the conductive patch 610 may be disposed on a first dielectric body 630-1 (e.g., the dielectric body 630 of FIG. 6A). The ground 650 may be disposed between the first dielectric body 630-1 and a second dielectric 630-2. The conductive wire 661 may be provided in the second dielectric 630-2. The conductive wire 661 may be electrically connected to the conductive member 662 and the UWB IC. The conductive member 662 may penetrate the second dielectric body 630-2, the opening 652 provided in the ground 650, and the first dielectric body 630-1, and may be electrically connected to the conductive patch 610 at the predetermined point f The UWB IC may feed power to the conductive patch 610 via the conductive wire 661 and the conductive member 662.

As another example, referring to FIG. 6F, the conductive patch 610 may be fed with power via a transmission line 640. In an embodiment, the transmission line 640 may be formed of a conductive material. The transmission line 640 may be disposed on the dielectric body 630, which is the same layer as the conductive patch 610. The transmission line 640 may include a quarter wavelength (λ/4) impedance transformer 642 for impedance matching. The transmission line 640 may extend to the predetermined point f of the conductive patch 610 and may be electrically connected to the UWB IC and the conductive patch 610. The UWB IC may feed power to the conductive patch 610 via the transmission line 640. The conductive patch 610 may have a slit extending to the predetermined point f At least a portion of the transmission line 640 may be located in the slit.

In addition to the description provided with reference to FIGS. 6D, 6E, and 6F, various methods applicable by a person skilled in the art may be applied in order to feed power to the conductive patch 610.

Figure 8A:
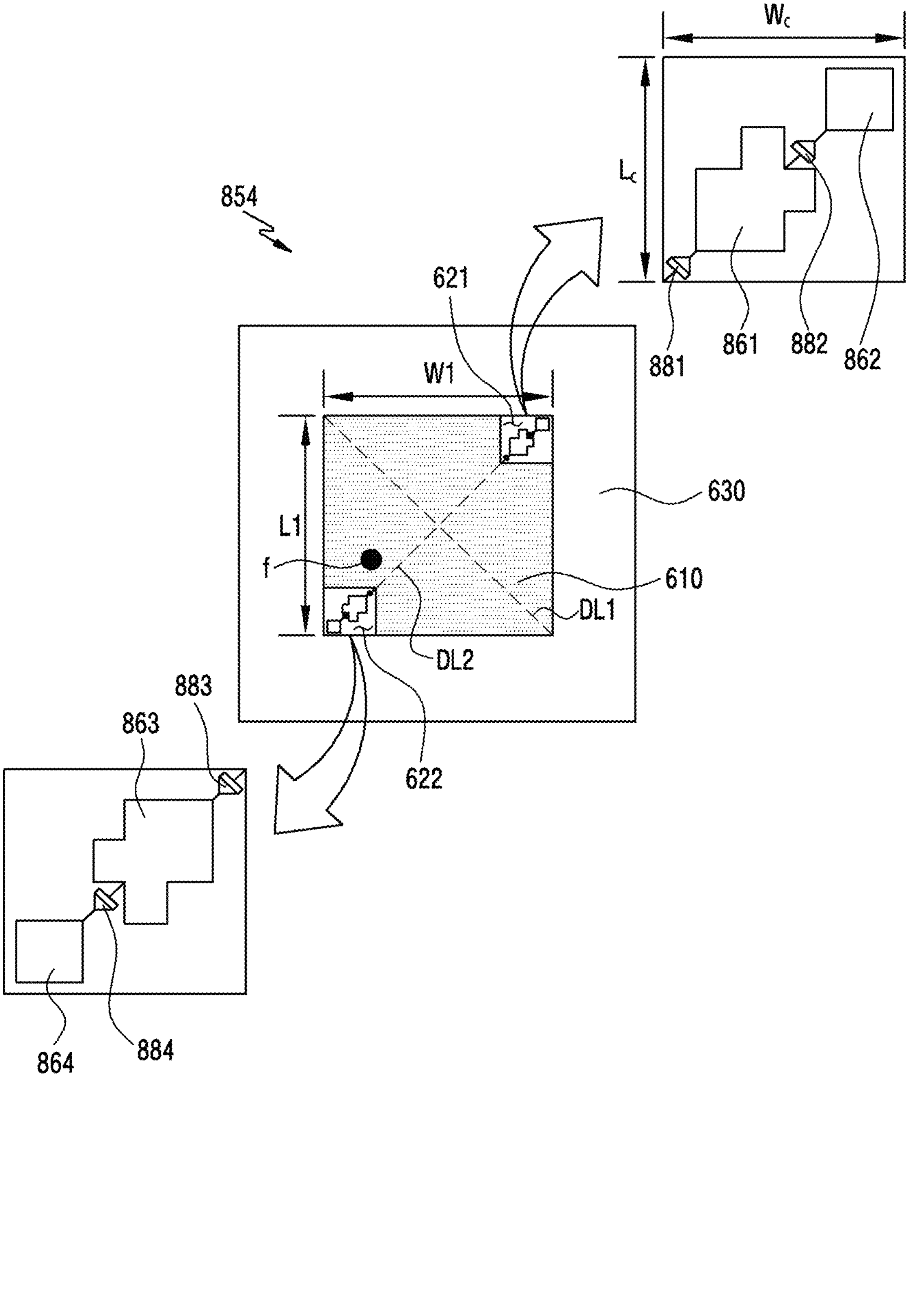
FIG. 8A illustrates an antenna according to an embodiment.
Figure 9A:
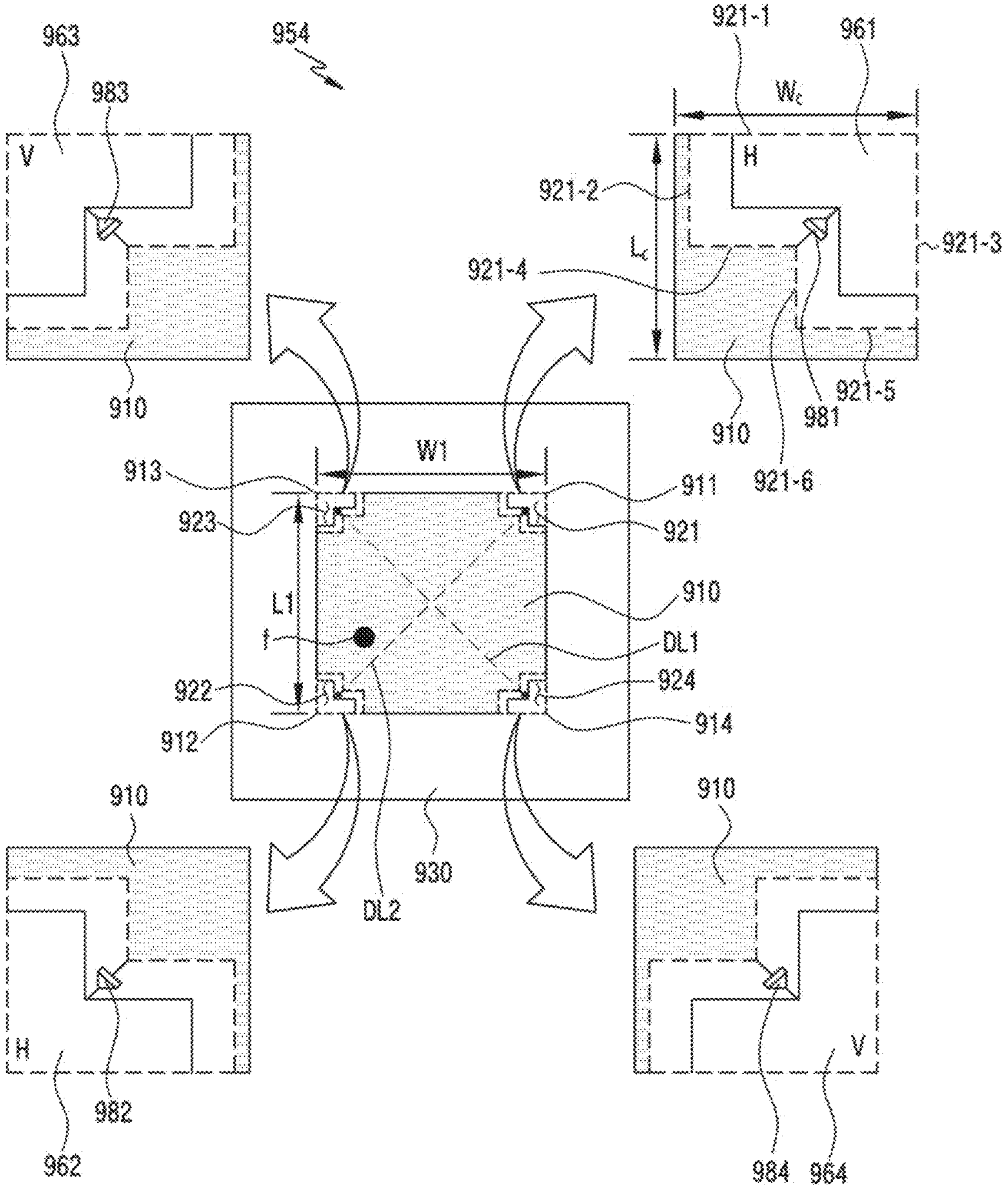
FIG. 9A illustrates an antenna according to an embodiment.
Figure 10A:
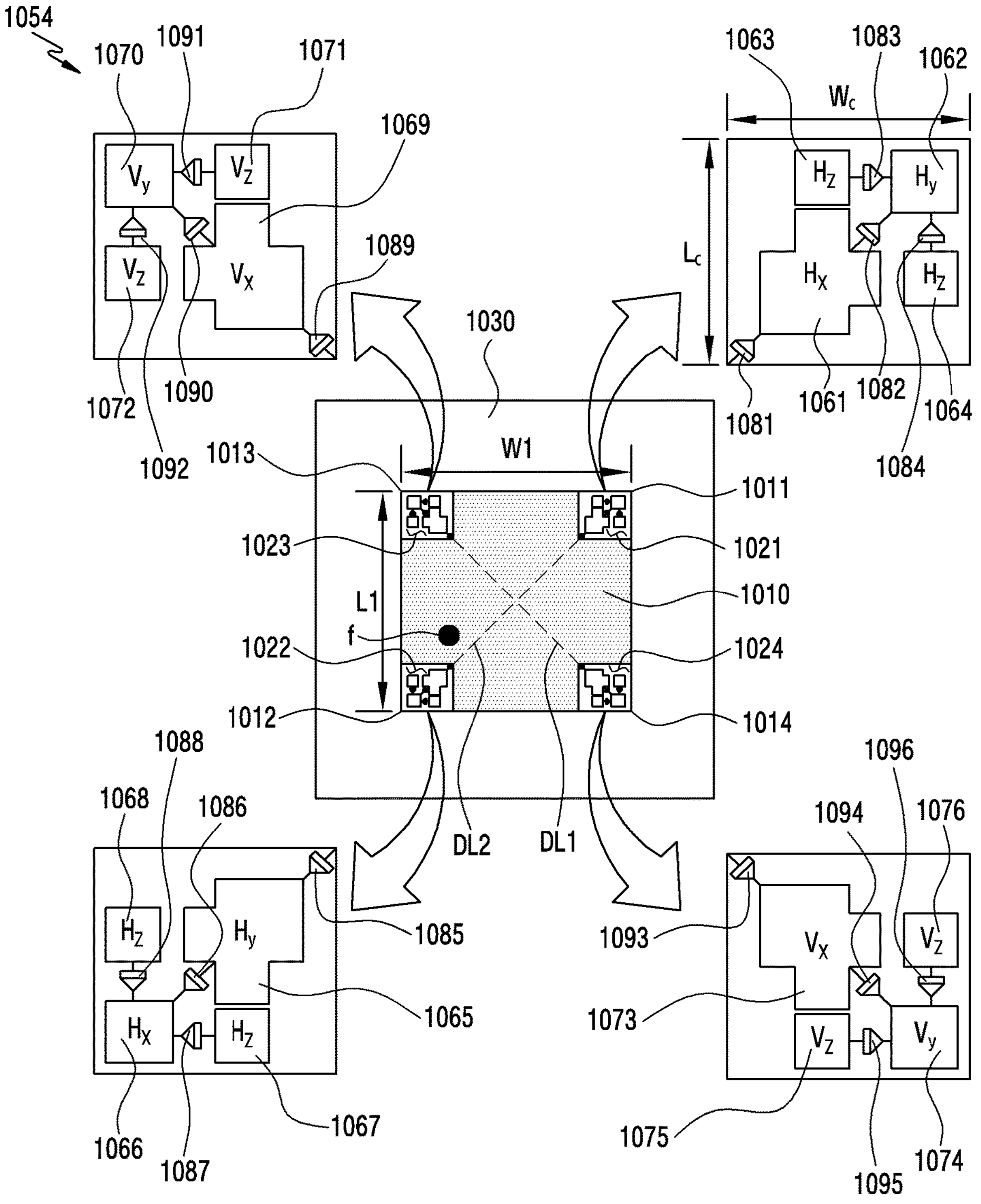
FIG. 10A illustrates an antenna according to an embodiment.

The description provided with reference to FIGS. 6D, 6E, and 6F may be equally applied to the antenna 854 of FIG. 8A, the antenna 954 of FIG. 9A, and/or the antenna 1054 of FIG. 10A.

In an embodiment, the predetermined point f may be set depending on the impedance of the resonance frequency generated by the conductive patch 610. For example, the predetermined point f may be set to a point at which the impedance of the resonance frequency is about 50Ω.

In an embodiment, the antenna 654 may form a first resonance frequency corresponding to the first diagonal line DL1 of the conductive patch 610 and a second resonance frequency corresponding to the second diagonal line DL2 shorter than the first diagonal line DL1. The second resonance frequency may be higher than the first resonance frequency. For example, referring to FIG. 6B, the antenna 654 may form the first resonance frequency and the second resonance frequency. For example, the first resonance frequency may be about 6.5 GHz, and the second resonance frequency may be about 8 GHz.

In various embodiments of the disclosure, the first resonance frequency and the second resonance frequency do not mean a specific frequency band of a resonance frequency formed by the conductive patch 610. The frequency bands of the first resonance frequency and the second resonance frequency may be the same or different from each other. In various embodiments of the disclosure, it may mean that the first resonance frequency corresponds to the first diagonal line DL1 and the second resonance frequency corresponds to the second diagonal line DL2.

The first and second RF signals having the first and second resonance frequencies, respectively, which are formed by the antenna 654 according to an embodiment, may have first and second polarization characteristics, respectively. For example, referring to FIG. 6C, the electric field distribution (E-field) of the first RF signal having the first resonance frequency of the antenna 654 may be formed along the first diagonal line DL1 of FIG. 6A, and the electric field distribution of the second RF signal having the second resonance frequency may be formed along the second diagonal line DL2 of FIG. 6A. The first RF signal and the second RF signal may have linear polarization characteristics, and the first polarization of the first RF signal and the second polarization of the second RF signal may be substantially orthogonal to each other. For example, when the first polarization of the first RF signal is a vertical polarization, the second polarization of the second RF signal may be a horizontal polarization.

According to an embodiment, by feeding power to the conductive patch 610, the UWB IC (e.g., the UWB IC 292 in FIG. 2) may transmit and/or receive at least one of the first radio frequency (RF) signal of the first frequency band (e.g., an RF signal corresponding to the first resonance frequency) having the first polarization characteristic and the second RF signal of the second frequency band (e.g., an RF signal corresponding to the second resonance frequency) having the second polarization characteristic distinct from the first polarization characteristic.

According to an embodiment, the antenna 654 may be provided on a printed circuit board. In an embodiment, the printed circuit board may include a first layer, a second layer, and a third layer interposed between the first layer and the second layer. For example, the first layer and the second layer may be conductive layers, and the third layer may be a non-conductive layer. The printed circuit board may include a conductive patch 610 provided on the first layer, a ground 650 disposed on the second layer, and a dielectric body 630, a first dielectric body 630-1, or a dielectric body 630-2 disposed on the third layer.

Figure 7A:
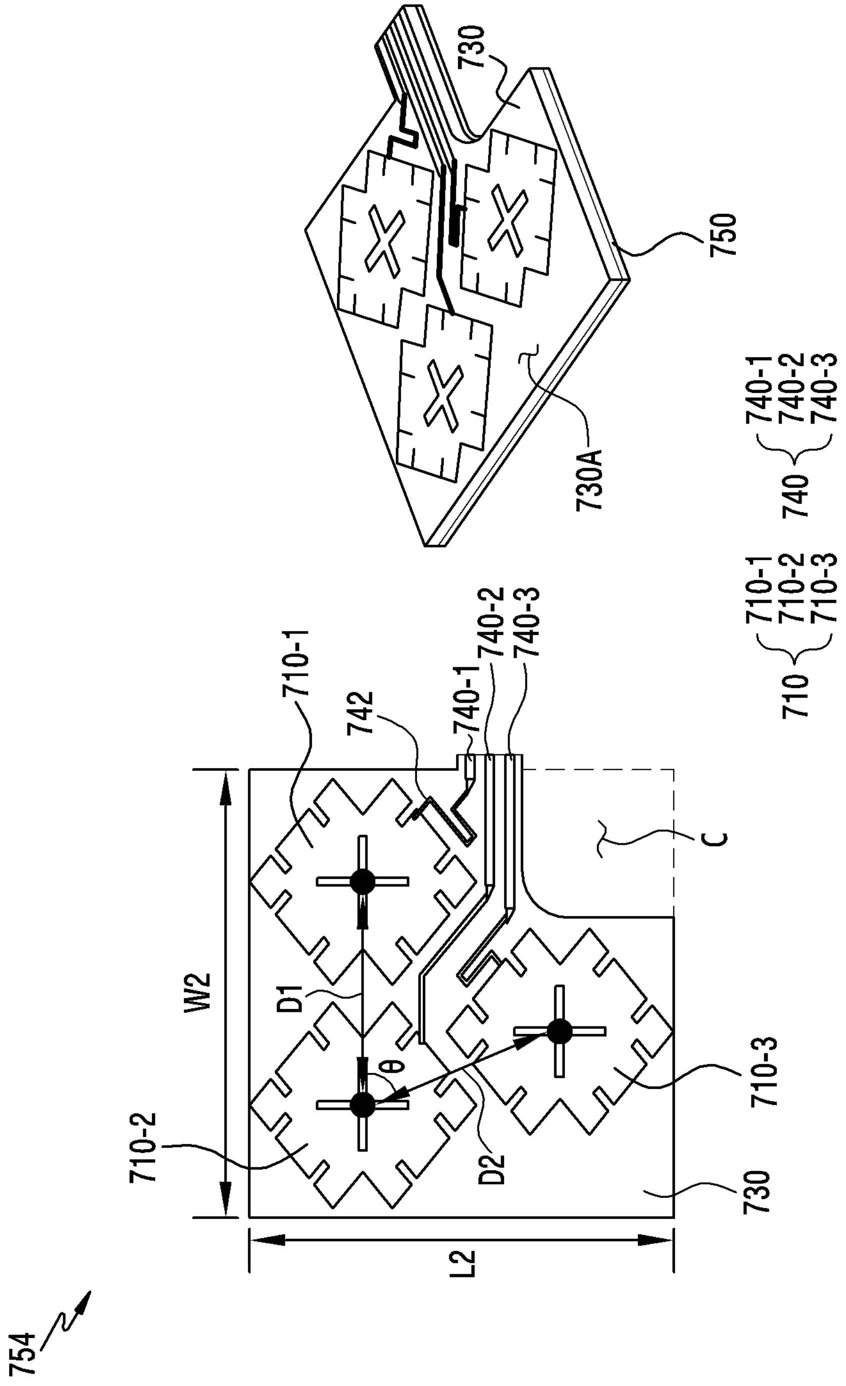
FIG. 7A illustrates an antenna structure according to an embodiment.

FIG. 7A illustrates an antenna structure according to an embodiment.

Figure 7B:
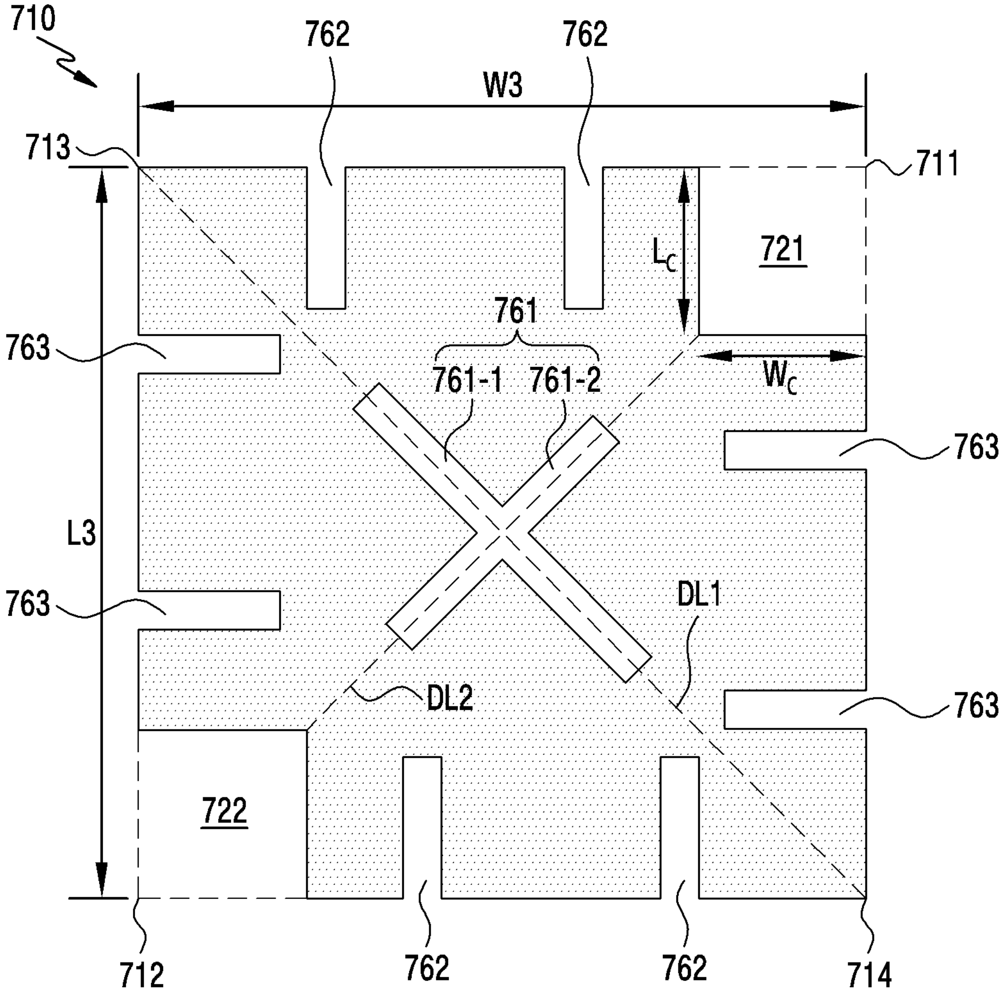
FIG. 7B illustrates the conductive patch of FIG. 7A.

FIG. 7B illustrates the conductive patch of FIG. 7A.

Figure 7C:
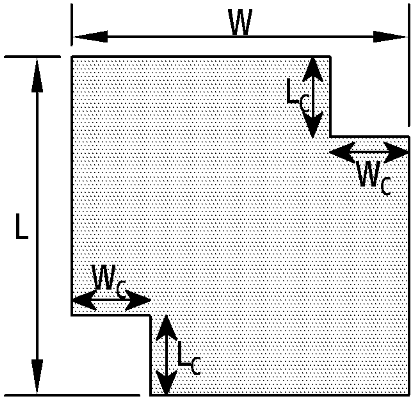
FIG. 7C illustrates areas according to the shapes of conductive patches according to an embodiment.
Figure 7C:
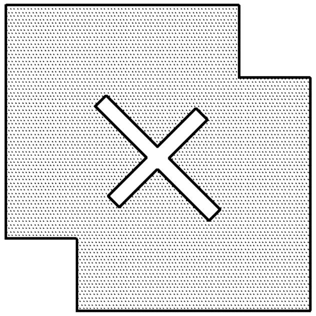
Figure 7C:
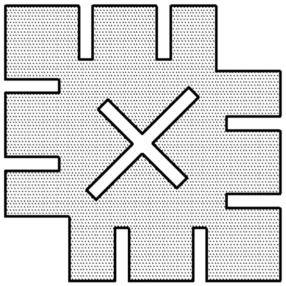

FIG. 7C illustrates areas according to the shapes of conductive patches according to an embodiment.

Figure 7D:
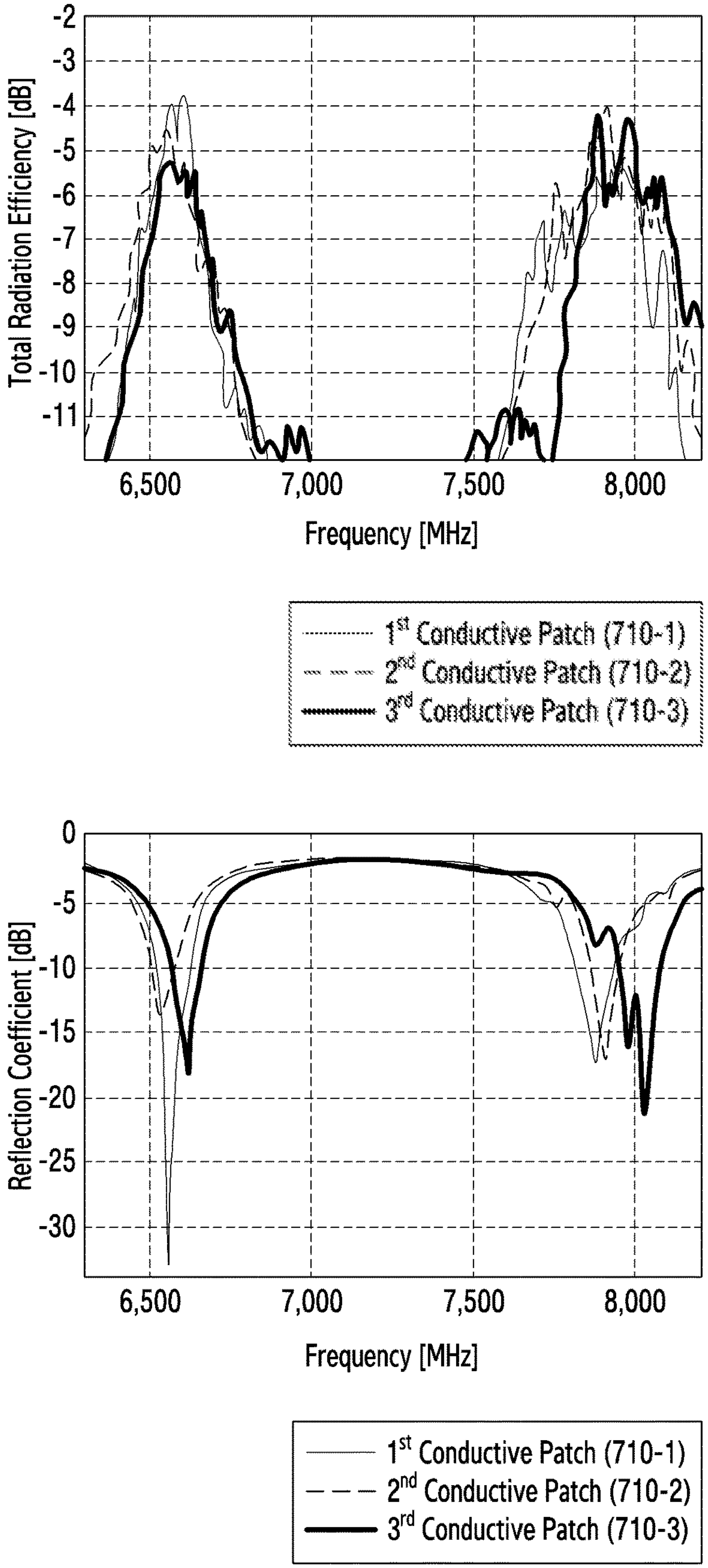
FIG. 7D illustrates graphs showing radiation characteristics of an antenna according to an embodiment.

FIG. 7D illustrates graphs showing radiation characteristics of an antenna according to an embodiment.

Figure 7E:
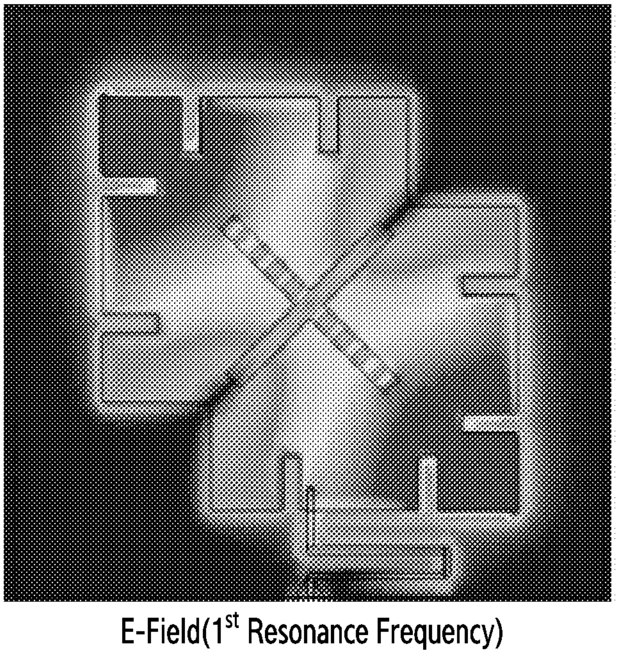
FIG. 7E is a view illustrating polarization characteristics of an antenna according to an embodiment.
Figure 7E:
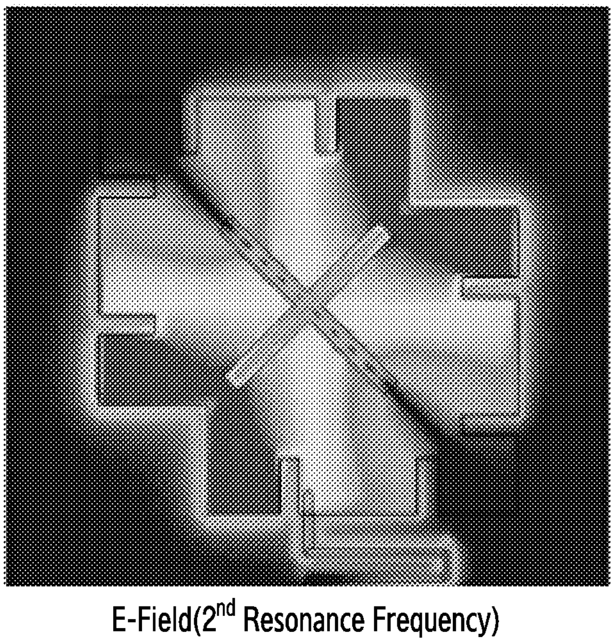

FIG. 7E is a view illustrating polarization characteristics of an antenna according to an embodiment.

Referring to FIG. 7A, an antenna structure 754 (e.g., the second antenna 254 of FIG. 5 or the antenna 654 of FIG. 6A) according to an embodiment may include a dielectric body 730, a ground 750, at least one conductive patch 710 (e.g., the conductive patch 610 of FIG. 6A), and at least one transmission line 740.

In an embodiment, the description of the dielectric body 630 of FIG. 6A may be substantially equally or correspondingly applied to the dielectric body 730.

In an embodiment, the description of the ground 650 of FIG. 6A may substantially equally or correspondingly be applied to the ground 750.

In an embodiment, the dielectric body 730 and the ground 750 of the antenna structure 754 may have a shape obtained by removing a predetermined area C from a rectangle having a width W2 and a length L2. For example, the width W2 of the antenna structure 754 may be about 24 mm and the length L2 may be about 28 mm. However, embodiments of the disclosure are not limited thereto.

In an embodiment, the at least one conductive patch 710 may be disposed on the dielectric body 730. For example, the at least one conductive patch 710 may be disposed on a first surface 730A of the dielectric body 730. In an embodiment, the at least one conductive patch 710 may include a conductive material such as a metal foil.

In an embodiment, the at least one conductive patch 710 may include a first conductive patch 710-1, a second conductive patch 710-2, and/or a third conductive patch 710-3. In an embodiment, the first conductive patch 710-1, the second conductive patch 710-2, and/or the third conductive patch 710-3 may be spaced apart from each other on the first surface 730A of the dielectric body 730.

Referring to FIGS. 7A and 7B, the first conductive patch 710-1, the second conductive patch 710-2, and/or the third conductive patch 710-3 according to an embodiment may be disposed such that a first diagonal line DL1 thereof is parallel to the length direction L2 of the dielectric body 730. The first conductive patch 710-1, the second conductive patch 710-2, and/or the third conductive patch 710-3 may be disposed such that a second diagonal line DL2 thereof is parallel to the width W2 of the dielectric body 730. In this case, the areas (e.g., a first area 721 or a second area 722) from which the corners of the first conductive patch 710-1 and the second conductive patch 710-2 are removed may face each other.

In an embodiment, the first conductive patch 710-1 and the second conductive patch 710-2 may be disposed to be spaced apart from each other along the width W2 direction of the dielectric body 730. In an embodiment, a line segment D1 interconnecting the center of the first conductive patch 710-1 and the center of the second conductive patch 710-2 may be parallel to one edge of an electronic device (e.g., the electronic device 101 of FIG. 5). For example, the line segment D1 may be parallel to a predetermined edge P of the second housing structure 320 of FIG. 5. As another example, the line segment D1 may be parallel to the x-axis of FIG. 5. In an embodiment, the line segment D2 interconnecting the center of the second conductive patch 710-2 and the center of the third conductive patch 710-3 may form a predetermined angle θ with the line segment D1. For example, the predetermined angle θ may not include 0° and 180° (e.g., the line segment D1 may not be parallel to the line segment D2). In an embodiment, the predetermined angle θ may be 90° or less. In an embodiment, the first conductive patch 710-1, the second conductive patch 710-2, and/or the third conductive patch 710-3 may be arranged to form an inverted L shape on the first surface 730A of the dielectric body 730.

In an embodiment, the first conductive patch 710-1, the second conductive patch 710-2, and the third conductive patch 710-3 may be spaced apart from each other by a predetermined distance. The length of the line segment D1 indicating the distance between the first conductive patch 710-1 and the second conductive patch 710-2 and the length of the second line segment D2 indicating the distance between the second conductive patch 710-2 and the third conductive patch 710-3 may be set depending on the wavelength of an RF signal to be transmitted or received via the antenna structure 754. In an embodiment, the lengths of the line segment D1 and the line segment D2 may be substantially equal to each other. For example, the lengths of the line segment D1 and the line segment D2 may be about 13 mm, but are not limited thereto. In another embodiment, the lengths of the line segment D1 and the line segment D2 may be different from each other.

Referring to FIG. 7B, the description of the conductive patch 610 of FIG. 6A may be equally or correspondingly applied to the shape of the at least one conductive patch 710. For example, the first conductive patch 710-1 may have a shape obtained by removing the first area 721 and the second area 722 from a rectangle having a width W3 and a length L3. The first area 721 may include a first corner 711 of the rectangle, in which the rectangle may have a predetermined width $W_c$ and a predetermined length $L_c$. The second area 722 may include a second corner 712 of the rectangle located in a diagonal direction relative to the first corner 711, and may have substantially the same width W and length $L_c$ as the first area 721. The rectangle having the width W3 and the length L3 may have a first size, and the first area 721 or the second area 722 may have a second size smaller than the first size. In an embodiment, the at least one conductive patch 710 may include a virtual first diagonal line DL1 interconnecting a third corner 713 and a fourth corner 714 facing the third corner 713 and a second virtual diagonal line DL2 interconnecting the first area 721 and the second area 722. The length of the first diagonal line DL1 may be greater than that of the second diagonal line DL2. The first diagonal line DL1 and the second diagonal line DL2 may form a predetermined angle (e.g., about 75° to about 90°).

In an embodiment, the first conductive patch 710-1 may include a first slot 761, a second slot 762, and/or a third slot 763.

In an embodiment, the first slot 761 may be provided in an area including the center of the first conductive patch 710-1. The first slot 761 is a cross (+) shape formed of a first portion 761-1 extending in the direction of the first diagonal direction DL1 and a second portion 761-2 extending in the direction of the second diagonal line DL2. In an embodiment, the lengths of the first portion 761-1 and the second portion 761-2 may be different from each other, but are not limited thereto. For example, unlike the illustration, the lengths of the first portion 761-1 and the second portion 761-2 may be substantially equal to each other.

In an embodiment, the second slot 762 and/or the third slot 763 may extend from an edge of the at least one conductive patch 710 to the inner side of the at least one conductive patch 710. For example, second slots 762 may extend in the length L3 direction that is substantially perpendicular to the width W3 direction from edges of the at least one conductive patch 710 extending in the width W3 direction. For example, second slots 762 may extend in the width W3 direction that is substantially perpendicular to the length L3 direction from edges of the at least one conductive patch 710 extending in the length L3 direction.

In an embodiment, by forming at least one of the first slot 761, the second slot 762, and/or the third slot 763 in the first conductive patch 710-1, the length of the path of current flowing through the first conductive patch 710-1 may be increased. By increasing the length of the path of current, the area (e.g., the width W3 and/or the length L3) of the patch required for the same performance or signal reception of the same frequency band may be decreased compared to the case where no slots are provided in the conductive patch (e.g., the conductive patch 610 of FIG. 6A). For example, referring to FIG. 7C, each of the conductive patches in the shapes of (A), (B), and (C) may have a shape obtained by removing, from each of two corners facing each other in a rectangle having a width W and a length L, an area having a predetermined width $W_c$ and a predetermined length $L_c$. The conductive patch of the shape of (A) may not be slotted, the conductive patch of the shape of (B) may have a slot (e.g., the first slot 761 in FIG. 7B) provided in the area including the center thereof, and the conductive patch of the shape of (C) may have slots (e.g., the first slot 761, the second slots 762, and the third slots 763 in FIG. 7B) provided in the central portion and the edges thereof. As the number of slots provided in a conductive patch increases, the area of the conductive patch required to form the same resonance frequency may decrease. The numerical values provided in FIG. 7C are merely examples to indicate that as the number of slots provided in the conductive patch increases, the required area of the conductive patch may be reduced, and embodiments of the disclosure are not limited by the examples illustrated in FIG. 7C.

According to an embodiment, the second conductive patch 710-2 or the third conductive patch 710-3 may be configured to have substantially the same shape as the first conductive patch 710-1.

Referring to FIG. 7A, at least one transmission line 740 according to an embodiment may be provided on the first surface 730A of the dielectric body 730. The at least one transmission line 740 may be electrically connected to the at least one conductive patch 710 in order to feed power to the at least one conductive patch 710. In an embodiment, the at least one transmission line 740 may include a first transmission line 740-1, a second transmission line 740-2, or a third transmission line 740-3.

In an embodiment, the first transmission line 740-1 may be connected to a point of the first conductive patch 710-1. The first conductive patch 710-1 may be electrically connected to a UWB IC (e.g., the UWB IC 292 of FIG. 2) via a first transmission line 740-1.

In an embodiment, the second transmission line 740-2 may be connected to a point of the second conductive patch 710-2. The second conductive patch 710-2 may be electrically connected to the UWB IC via the second transmission line 740-2.

In an embodiment, the third transmission line 740-3 may be connected to a point of the third conductive patch 710-3. The third conductive patch 710-3 may be electrically connected to the UWB IC via the third transmission line 740-3.

In an embodiment, the first transmission line 740-1, the second transmission line 740-2, and/or the third transmission line 740-3 may include a microstrip line such as a conductive trace. In an embodiment, the first transmission line 740-1, the second transmission line 740-2, and/or the third transmission line 740-3 may include a quarter wavelength impedance transformer 742 for impedance matching between a conductive patch and a transmission line. In an embodiment, the quarter wavelength impedance transformer 742 may include a meandering shape bent in at least one portion in order to satisfy a length characteristic for impedance matching. However, a feed scheme applied for impedance matching is not limited to the illustrated example. For example, the antenna structure 754 may include an inset type feed structure for impedance matching.

Referring to FIG. 7B, the antenna structure 754 according to an embodiment may form a first resonance frequency corresponding to the first diagonal line DL1 of the at least one conductive patch 710 and a second resonance frequency corresponding to the second diagonal line DL2 shorter than the first diagonal line D1. The second resonance frequency may be higher than the first resonance frequency. For example, referring to FIG. 7D, each of the first conductive patch 710-1, the second conductive patch 710-2, and the third conductive patch 710-3 may form a first resonance frequency of about 6.5 GHz and a second resonance frequency of about 8 GHz.

The first and second RF signals having the first resonance and second frequencies, respectively, which are formed by the antenna structure 754 according to an embodiment, may have first and second polarization characteristics, respectively. For example, referring to FIG. 7E, the electric field distribution of the first RF signal corresponding to the first resonance frequency of the at least one conductive patch 710 may be formed along the first diagonal line DL1 of FIG. 7B, and the electric field distribution of the second RF signal corresponding to the second resonance frequency may be formed along the second diagonal line DL2 of FIG. 7B. The first and second RF signals may have linear polarization characteristics, in which the first polarization of the first RF signal corresponding to the first resonance frequency and the second polarization of the second RF signal corresponding to the second resonance frequency may be substantially orthogonal to each other. For example, when the first polarization of the first RF signal corresponding to the first resonance frequency is a vertical polarization, the second polarization of the second RF signal corresponding to the second resonance frequency may be a horizontal polarization.

In an embodiment, the UWB IC electrically connected to the antenna structure 754 (e.g., the UWB IC 292 in FIG. 2) may feed power to at least one conductive patch 710 via at least one transmission line 740. The first conductive patch 710-1, the second conductive patch 710-2, and the third conductive patch 710-3 may each operate as an antenna element for receiving an RF signal of a predetermined band.

According to an embodiment, by feeding power to the at least one conductive patch 710, the UWB IC may transmit and/or receive at least one of the first radio frequency (RF) signal of the first frequency band (e.g., an RF signal corresponding to the first resonance frequency) having the first polarization characteristic and the second RF signal of the second frequency band (e.g., an RF signal corresponding to the second resonance frequency) having the second polarization characteristic distinct from the first polarization characteristic.

In an embodiment, at least two of the first conductive patch 710-1, the second conductive patch 710-2, and the third conductive patch 710-3 of the antenna structure 754 may operate as array antennas. For example, the UWB IC may transmit and/or receive RF signals having the same polarization characteristic (e.g., the first polarization) by using the first conductive patch 710-1 and the second conductive patch 710-2. As another example, the UWB IC may transmit and/or receive RF signals having the same polarization characteristic (e.g., the second polarization) by using the second conductive patch 710-2 and the third conductive patch 710-3.

According to an embodiment, the antenna structure 754 may be provided on a printed circuit board. In an embodiment, the printed circuit board may include a first layer, a second layer, and a third layer interposed between the first layer and the second layer. For example, the first layer and the second layer may be conductive layers, and the third layer may be a non-conductive layer. The printed circuit board may include at least one conductive patch 710 provided on the first layer, a ground 750 disposed on a second layer, and a dielectric body 730 disposed on the third layer.

FIG. 8A illustrates an antenna according to an embodiment.

Figure 8B:
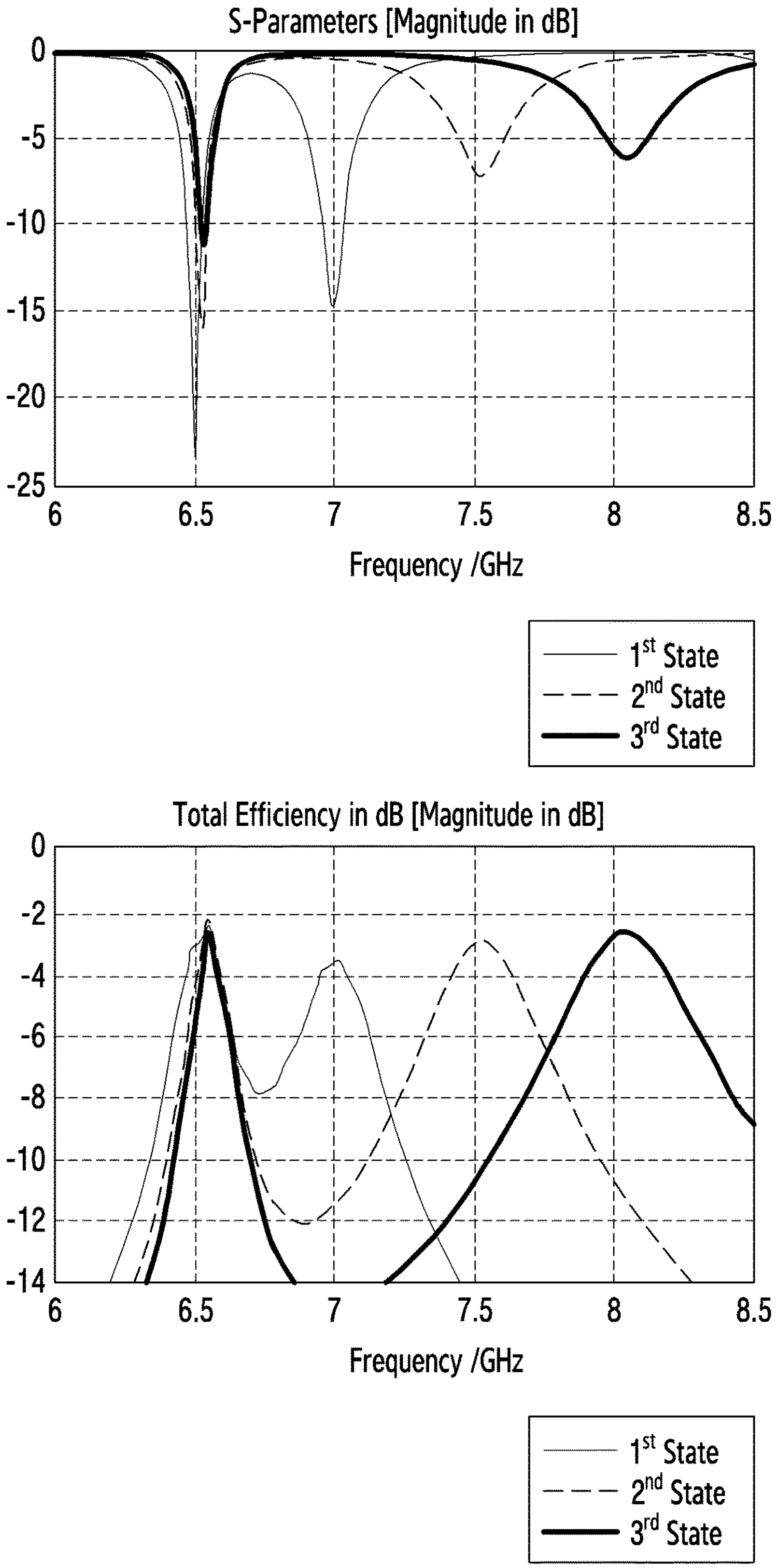
FIG. 8B shows radiation characteristics of an antenna according to the connection states of switches according to an embodiment.

FIG. 8B shows radiation characteristics of an antenna according to the connection states of switches according to an embodiment.

Regarding FIG. 8A, a description of components overlapping those of FIG. 6A will be omitted. A description provided with reference to FIG. 6A may be equally or correspondingly applied to components denoted by the same reference numerals.

The conductive patch 610 of FIG. 8A may correspond to the at least one conductive patch 710 of FIG. 7B. For example, the conductive patch 610 illustrated in FIG. 8A may be replaced with the at least one conductive patch 710 illustrated in FIG. 7B.

Referring to FIG. 8A, an antenna 854 according to an embodiment may include a first patch 861, a second patch 862, a third patch 863, a fourth patch 864, a first switch 881, a second switch 882, a third switch 883, or a fourth switch 884.

In an embodiment, the first patch 861, the second patch 862, the first switch 881, and/or the second switch 882 may be disposed in the first area 621. The first patch 861, the second patch 862, the first switch 881, and/or the second switch 882 may be disposed on the dielectric body 630. The first patch 861 may be spaced apart from the conductive patch 610 and the second patch 862. The second patch 862 may be spaced apart from the conductive patch 610. The first switch 881 may be disposed in an electrical path between the conductive patch 610 and the first patch 861. The second switch 882 may be disposed in an electrical path between the first patch 861 and the second patch 862. In an embodiment, the first switch 881, the first patch 861, the second switch 882, and the second patch 862 may be located on a line along which the second diagonal line DL2 of the conductive patch 610 extends. For example, a line interconnecting the first switch 881, the first patch 861, the second switch 882, and/or the second patch 862 may be an extension of the second diagonal line DL2 of the conductive patch 610. The first switch 881, the first patch 861, the second switch 882, and/or the second patch 862 may be arranged in order away from the center of the conductive patch 610 along the direction of the second diagonal line DL2. In an embodiment, the first patch 861 may be electrically connected to the conductive patch 610 via the first switch 881. The second patch 862 may be electrically connected to the first patch 861 via the second switch 882.

In an embodiment, the third patch 863, the fourth patch 864, the third switch 883, and/or the fourth switch 884 may be disposed in the second area 622. The third patch 863, the fourth patch 864, the third switch 883, and/or the fourth switch 884 may be disposed on the dielectric body 630. The third patch 863 may be spaced apart from the conductive patch 610 and the fourth patch 864. The fourth patch 864 may be spaced apart from the conductive patch 610. The third switch 883 may be disposed in an electrical path between the conductive patch 610 and the third patch 863. The fourth switch 884 may be disposed in an electrical path between the third patch 863 and the fourth patch 864. In an embodiment, the third switch 883, the third patch 863, the fourth switch 884, and the fourth patch 864 may be located on a line along which the second diagonal line DL2 of the conductive patch 610 extends. For example, a line interconnecting the third switch 883, the third patch 863, the fourth switch 884, and/or the fourth patch 864 may be an extension of the second diagonal line DL2 of the conductive patch 610. The third switch 883, the third patch 863, the fourth switch 884, and/or the fourth patch 864 may be arranged in order away from the conductive patch 610 along the direction of the second diagonal line DL2. In an embodiment, the third patch 863 may be electrically connected to the conductive patch 610 via the third switch 883. The fourth patch 864 may be electrically connected to the third patch 863 via the fourth switch 884.

In an embodiment, the first switch 881, the second switch 882, the third switch 883, and/or the fourth switch 884 may include various components that are capable of changing electrical connection states among the patches of the antenna 854. For example, the first switch 881, the second switch 882, the third switch 883, and/or the fourth switch 884 may include a PIN diode.

In an embodiment, a UWB IC (e.g., the UWB IC 292 in FIG. 2) may control the first switch 881, the second switch 882, the third switch 883, and/or the fourth switch 884. For example, the UWB IC may control the electrical connection states of the conductive patch 610, the first patch 861, the second patch 862, the third patch 863, and/or the fourth patch 864 by applying a DC voltage to at least one of the first switch 881, the second switch 882, the third switch 883, and/or the fourth switch 884. In an embodiment, the length of the electrical path corresponding to the second diagonal line DL2 of the conductive patch 610 may vary according to the electrical connection state of at least one of the first switch 881, the second switch 882, the third switch 883, and/or the fourth switch 884.

In an embodiment, the resonance frequency formed by the antenna 854 may vary according to the electrical connection state of the conductive patch 610, the first patch 861, the second patch 862, the third patch 863, and/or the fourth patch 864. Resonance frequencies formed by the antenna 854 according to the electrical connection states are shown in Table 1 below.

TABLE 1

| | $1^{st}$ resonance frequency | $2^{nd}$ resonance frequency |
|---|---|---|
| $1^{st}$ state | Ch. 5 | Ch. 6 |
| $2^{st}$ state | Ch. 5 | Ch. 8 |
| $3^{rd}$ state | Ch. 5 | Ch. 9 |

The channels (Chs.) of Table 1 are based on the IEEE 802.15.4a UWB communication protocol, but are not limited thereto.

In Table 1, the first state may be the state in which the first switch 881, the second switch 882, the third switch 883, and the fourth switch 884 are all turned on. For example, the first state may be the state in which the conductive patch 610, the first patch 861, the second patch 862, the third patch 863, and the fourth patch 864 are all electrically connected to each other. In the first state, the antenna 854 may form a first resonance frequency corresponding to Ch. 5 and a second resonance frequency corresponding to Ch. 6. For example, referring to FIG. 8B, in the first state, the antenna 854 may form a first resonance frequency of about 6.5 GHz and a second resonance frequency of about 7 GHz.

In Table 1, the second state may be the state in which the first switch 881 and the third switch 883 are turned on, and the second switch 882 and the fourth switch 884 are turned off. For example, the second state may be the state in which the first patch 861 and the third patch 863 are electrically connected to the conductive patch 610, and the second patch 862 and the fourth patch 864 are electrically disconnected from the conductive patch 610. In the second state, the antenna 854 may form a first resonance frequency corresponding to Ch. 5 and a second resonance frequency corresponding to Ch. 8. For example, referring to FIG. 8B, in the second state, the antenna 854 may form a first resonance frequency of about 6.5 GHz and a second resonance frequency of about 7.5 GHz.

In Table 1, the third state may be the state in which the first switch 881, the second switch 882, the third switch 883, and the fourth switch 884 are all turned off. For example, the third state may be the state in which all of the first patch 861, the second patch 862, the third patch 863, and the fourth patch 864 are not electrically connected to the conductive patch 610. In the third state, the antenna 854 may form a first resonance frequency corresponding to Ch. 5 and a second resonance frequency corresponding to Ch. 9. For example, referring to FIG. 8B, in the third state, the antenna 854 may form a first resonance frequency of about 6.5 GHz and a second resonance frequency of about 8 GHz.

In an embodiment, the RF signal corresponding to the first resonance frequency of the antenna 854 may have the first polarization characteristic, and the RF signal corresponding to the second resonance frequency may have the second polarization characteristic. For example, the polarizations of the RF signals corresponding to the first and second resonance frequencies of the antenna 854 may be substantially orthogonal to each other. For example, when the RF signal corresponding to the first resonance frequency of the antenna 854 has a vertical polarization, the RF signal corresponding to the second resonance frequency may have a horizontal polarization. The fact that the RF signals corresponding to the first and second resonance frequencies of the antenna 854 have different polarization characteristics may be understood through the description provided above with reference to FIGS. 6C and 7E.

In an embodiment, by controlling the switches 881, 882, 883, and 884, the UWB IC may variably control the channels and/or polarization characteristics of the RF signals transmitted and received from the antenna 854 according to various communication environments.

In an embodiment, in the first state in which the first switch 881, the second switch 882, the third switch 883, and the fourth switch 884 are all turned off, the UWB IC may transmit and/or receive a first RF signal of the first frequency band having the first polarization characteristic (e.g., the RF signal corresponding to the first resonance frequency in the first state of Table 1) and a second RF signal of the second polarization characteristic having the second polarization characteristic orthogonal to the first polarization characteristic and being higher than the second frequency band (e.g., the RF signal corresponding to the second resonance frequency in the first state of Table 1).

In an embodiment, in the second state in which the first switch 881 and the third switch 883 are turned on and the second switch 882 and the fourth switch 884 are turned off, the UWB IC may transmit and/or receive a first RF signal of the first frequency band having the first polarization characteristic (e.g., the RF signal corresponding to the first resonance frequency in the second state of Table 1) and a third RF signal of a third frequency band higher than the second frequency band (e.g., the RF signal corresponding to the second resonance frequency in the second state of Table 1).

In an embodiment, in the third state in which the first switch 881, the second switch 882, the third switch 883, and the fourth switch 884 are turned off, the UWB IC may transmit and/or receive a first RF signal of the first frequency band having the first polarization characteristic (e.g., the RF signal corresponding to the first resonance frequency in the third state of Table 1) and a fourth RF signal of a four frequency band having the second polarization characteristic and being higher than the third frequency band (e.g., the RF signal corresponding to the second resonance frequency in the third state of Table 1).

A plurality of antennas 854 according to an embodiment may be included in an antenna structure (e.g., the antenna structure 754 in FIG. 7A). In this case, the plurality of antennas 854 may be arranged substantially the same as those illustrated in FIG. 7A.

FIG. 9A illustrates an antenna according to an embodiment.

Figure 9B:
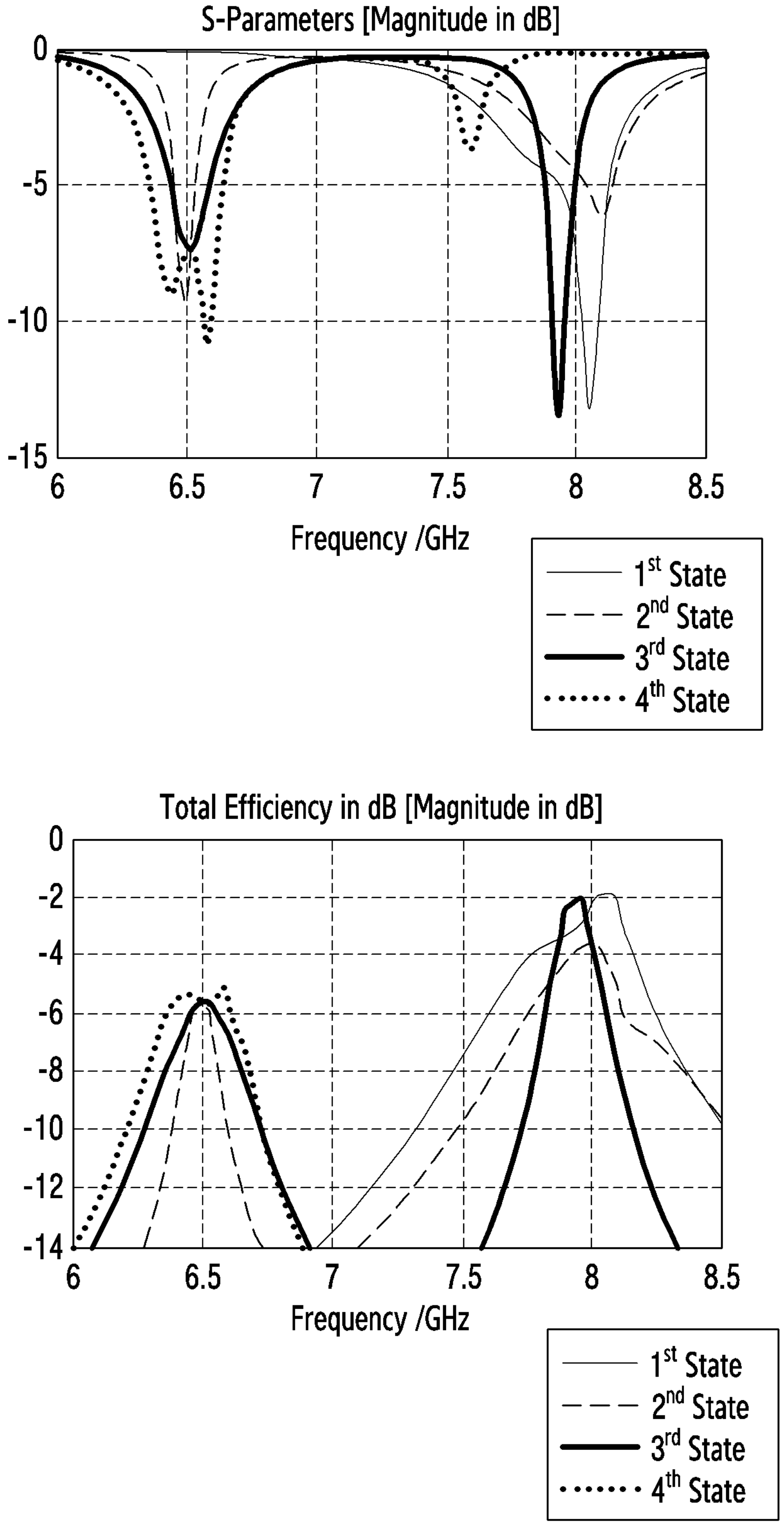
FIG. 9B shows radiation characteristics of an antenna according to the connection states of switches according to an embodiment.

FIG. 9B shows radiation characteristics of an antenna according to the connection states of switches according to an embodiment.

Figure 9C:
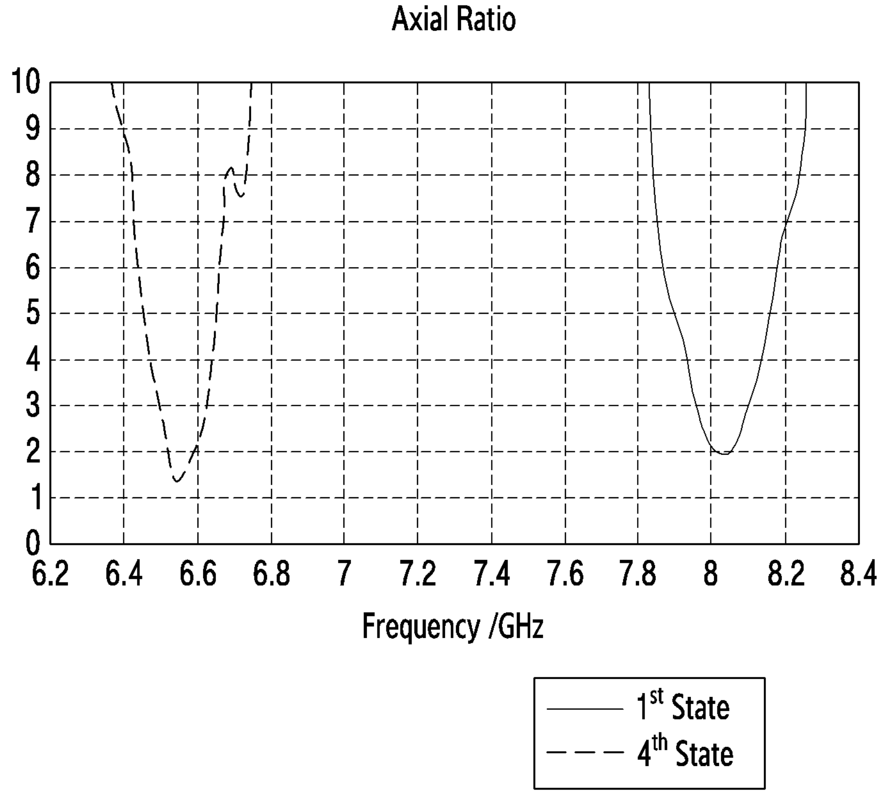
FIG. 9C is a graph illustrating axial ratios of an antenna according to an embodiment in a first state and a fourth state.

FIG. 9C is a graph showing axial ratios of an antenna according to an embodiment in a first state and a fourth state.

In FIG. 9A, the outer peripheries of the first area 921, the second area 922, the third area 923, and the fourth area 924 are indicated by dotted lines.

The antenna 954 of FIG. 9A may correspond to the second antenna 254 of FIG. 5.

The antenna 954 of FIG. 9A may correspond to the antenna 654 of FIG. 6A. For example, the description provided with reference to FIGS. 6A to 6C may be equally or correspondingly applied to a description of the antenna 954 of FIG. 9A. For example, the antenna 954 according to an embodiment may include a dielectric body 930 and a ground. The dielectric body 930 and the ground of the antenna 954 may correspond to the dielectric body 630 and the ground 650 of the antenna 654 of FIG. 6A, respectively.

Referring to FIG. 9A, the antenna 954 according to an embodiment may include a conductive patch 910, patches 961, 962, 963, and 964, and/or switches 981, 982, 983, and 984.

In an embodiment, the conductive patch 910 may be disposed on the dielectric body 930. In an embodiment, the conductive patch 910 may have a shape obtained by removing four corners from a rectangle. For example, the conductive patch 910 may have a shape obtained by removing, from a rectangle having a width W1 and a length L1, a first area 921, a second area 922, a third area 923, and/or a fourth area 924. The first area 921 may include a first corner 911 of the rectangle. The second area 922 may include a second corner 912 of the rectangle. The third area 923 may include a third corner 913 of the rectangle. The fourth area 924 may include a fourth corner 914 of the rectangle. The first corner 911 and the second corner 912 may be located in a diagonal direction relative to each other, and the third corner 913 and the fourth corner 914 may be located in a diagonal direction relative to each other. The rectangle having the width W1 and the length L1 may have a first size, and each of the first area 921, the second area 922, the third area 923, and/or the fourth area 924 may have a second size smaller than the first size.

In an embodiment, the first area 921 includes a first edge 921-1, a second edge 921-2, a third edge 921-3, and a fourth edge 921-4, a fifth edge 921-5, and/or a sixth edge 921-6. The first edge 921-1 may have a predetermined width $W_c$. The first edge 921-1 may extend along the width direction W1 of the conductive patch 910. The second edge 921-2 may extend along the length direction L1 of the conductive patch 910 from one end of the first edge 921-1. For example, the second edge 921-2 may be substantially perpendicular to the first edge 921-1. The third edge 921-3 may extend along the length direction L1 of the conductive patch 910 from the other end of the first edge 921-1. The second edge 921-2 and the third edge 921-3 may extend in substantially the same direction from the first edge 921-1. For example, the third edge 921-3 may be substantially perpendicular to the first edge 921-1. The third edge 921-3 may be longer than the second edge 921-2. In an embodiment, the third edge 921-3 may be longer than the first edge 921-1. The third edge 921-3 may have a predetermined length $L_c$. The fourth edge 921-4 may extend from one end of the second edge 921-2 toward the third edge 921-3. As another example, the fourth edge 921-4 may extend along the width direction W1 from one end of the second edge 921-2. For example, the fourth edge 921-4 may be substantially parallel to the first edge 921-1, and may be substantially perpendicular to the second edge 921-2. The fourth edge 921-4 may be shorter than the first edge 921-1. The fifth edge 921-5 may extend from one end of the third edge 921-3 toward the second edge 921-2. As another example, the fifth edge 921-5 may extend along the length direction L1 of the conductive patch 910 from one end of the third edge 921-3. For example, the fifth edge 921-5 may be substantially parallel to the first edge 921-1, and may be substantially perpendicular to the third edge 921-3. The fifth edge 921-5 may be shorter than the first edge 921-1. The sixth edge 921-6 may extend from one end of the fourth edge 921-4 to one end of the fifth edge 921-5. For example, the sixth edge 921-6 may be substantially perpendicular to the fourth edge 921-4 and the fifth edge 921-5, and may be substantially parallel to the second edge 921-2 and the third edge 921-3. The sixth edge 921-6 may be shorter than the third edge 921-3. The shapes of the second area 922, the third area 923, and the fourth area 924 may correspond to the shape of the first area 921. For example, the second area 922, the third area 923, and the fourth area 924 may have substantially the same area and substantially the same shape as the first area 921.

In an embodiment, the conductive patch 910 may have a first virtual diagonal line DL1 interconnecting the third area 923 and the fourth area 924 and a second virtual diagonal line DL2 interconnecting the first area 921 and the second area 922. The first diagonal line DL1 may correspond to a line segment interconnecting the third corner 913 and the fourth corner 914. The second diagonal line DL2 may correspond to a line segment interconnecting the first corner 911 and the second corner 912.

In an embodiment, the patches 961, 962, 963, and 964 include a first patch 961, a second patch 962, a third patch 963, and/or a fourth patch 964.

In an embodiment, the first patch 961 may be spaced apart from the conductive patch 910, and may be disposed in the first area 921. The shape of the first patch 961 may correspond to the shape of the first area 921. For example, the first patch 961 may have substantially the same shape as the first area 921, and may have a smaller area than the first area 921. A slit may be provided between the first patch 961 and the conductive patch 910. The slit may have a meandering shape.

In an embodiment, the second patch 962 may be spaced apart from the conductive patch 910, and may be disposed in the second area 922. The shape of the second patch 962 may correspond to the shape of the second area 922. For example, the second patch 962 may have substantially the same shape as the second area 922, and may have a smaller area than the second area 922. A slit may be provided between the second patch 962 and the conductive patch 910. The slit may have a meandering shape.

In an embodiment, the third patch 963 may be spaced apart from the conductive patch 910, and may be disposed in the third area 923. The shape of the third patch 963 may correspond to the shape of the third area 923. For example, the third patch 963 may have substantially the same shape as the third area 923, and may have a smaller area than the third area 923. A slit may be provided between the third patch 963 and the conductive patch 910. The slit may have a meandering shape.

In an embodiment, the fourth patch 964 may be spaced apart from the conductive patch 910, and may be disposed in the fourth area 924. The shape of the fourth patch 964 may correspond to the shape of the fourth area 924. For example, the fourth patch 964 may have substantially the same shape as the fourth area 924, and may have a smaller area than the fourth area 924. A slit may be provided between the fourth patch 964 and the conductive patch 910. The slit may have a meandering shape.

In an embodiment, the switches 981, 982, 983, and 984 include a first switch 981, a second switch 982, a third switch 983, and/or a fourth switch 984.

In an embodiment, the first switch 981 may be disposed in the first area 921. The first switch 981 may be disposed in an electrical path between the first patch 961 and the conductive patch 910. The first patch 961 may be electrically connected to the conductive patch 910 via the first switch 981. The line interconnecting the first patch 961 and the first switch 981 may be an extension of the second diagonal line DL2. For example, the first patch 961 and the first switch 981 may be aligned along the second diagonal line DL2.

In an embodiment, the second switch 982 may be disposed in the second area 922. The second switch 982 may be disposed in an electrical path between the second patch 962 and the conductive patch 910. The second patch 962 may be electrically connected to the conductive patch 910 via the second switch 982. The line interconnecting the second patch 962 and the second switch 982 may be an extension of the second diagonal line DL2. For example, the second patch 962 and the second switch 982 may be aligned along the second diagonal line DL2.

In an embodiment, the third switch 983 may be disposed in the third area 923. The third switch 983 may be disposed in an electrical path between the third patch 963 and the conductive patch 910. The third patch 963 may be electrically connected to the conductive patch 910 via the third switch 983. The line interconnecting the third patch 963 and the third switch 983 may be an extension of the first diagonal line DL1. For example, the third patch 963 and the third switch 983 may be aligned along the first diagonal line DL1.

In an embodiment, the fourth switch 984 may be disposed in the fourth area 924. The fourth switch 984 may be disposed in an electrical path between the fourth patch 964 and the conductive patch 910. The fourth patch 964 may be electrically connected to the conductive patch 910 via the fourth switch 984. The line interconnecting the fourth patch 964 and the fourth switch 984 may be an extension of the first diagonal line DL1. For example, the fourth patch 964 and the fourth switch 984 may be aligned along the first diagonal line DL1.

In an embodiment, the switches 981, 982, 983, and 984 may include various components that may change the electrical connection states among the patches of the antenna 954. For example, switches 981, 982, 983, and 984 may each include a PIN diode.

In an embodiment, a UWB IC (e.g., the UWB IC 292 in FIG. 2) may control the first switch 981, the second switch 982, the third switch 983, and/or the fourth switch 984. For example, the UWB IC may control electrical connection states between the conductive patch 910 and the patches 961, 962, 963, and 964 by applying a DC voltage to at least one of the first switch 981, the second switch 982, the third switch 983, and the fourth switch 984.

In an embodiment, the electrical connection states of the conductive patch 910, the first patch 961, and the second patch 962 vary depending on the operating states of the first switch 981 and the second switch 982. The length of the electrical path corresponding to the second diagonal line DL2 of the conductive patch 910 may vary depending on the electrical connection states of the conductive patch 910, the first patch 961, and the second patch 962.

In an embodiment, the electrical connection states of the conductive patch 910, the third patch 963, and the fourth patch 964 vary depending on the operating states of the third switch 983 and the fourth switch 984. The length of the electrical path corresponding to the first diagonal line DL1 of the conductive patch 910 may vary depending on the electrical connection states of the conductive patch 910, the third patch 963, and the fourth patch 964.

In an embodiment, the antenna 954 may form a first resonance frequency corresponding to the first diagonal line DL1 and a second resonance frequency corresponding to the second diagonal line DL2. In an embodiment, the UWB IC (e.g., the UWB IC 292 in FIG. 2) may transmit or receive an RF signal corresponding to the first resonance frequency and/or the second resonance frequency.

In an embodiment, the resonance frequency formed by the antenna 954 may vary depending on the electrically connected states of the conductive patch 910 and the patches 961, 962, 963, and 964. Resonance frequencies formed by the antenna 954 according to the electrical connection states are shown in Table 2 below.

TABLE 2

| Connection state | | 1st resonance frequency | 2nd resonance frequency |
|---|---|---|---|
| 1st state | — | Ch. 9 | Ch. 9 |
| 2nd state | V | Ch. 5 | Ch. 9 |
| 3rd state | H | Ch. 9 | Ch. 5 |
| 4th state | H, V | Ch. 5 | Ch. 5 |

The channels (Chs.) of Table 2 are based on the IEEE 802.15.4a UWB communication protocol, but are not limited thereto.

In Table 2, H may indicate the state in which the first patch 961 and the second patch 962 are electrically connected to the conductive patch 910, and V may indicate the state in which the third patch 963 and the fourth patch 964 are electrically connected to the conductive patch 910.

In Table 2, the first state may be the state in which the first switch 981, the second switch 982, the third switch 983, and the fourth switch 984 are all turned off. For example, the first state may be the state in which all of the first patch 961, the second patch 962, the third patch 963, and the fourth patch 964 are not electrically connected to the conductive patch 910. In the first state, the first resonance frequency and the second resonance frequency formed by the antenna 954 may be substantially equal to each other. For example, the antenna 954 may form a first resonance frequency and a second resonance frequency corresponding to Ch. 9. For example, referring to FIG. 9B, in the first state, the antenna 954 may form a first resonance frequency and a second resonance frequency of about 8 GHz.

In an embodiment, the RF signal corresponding to the first resonance frequency of the antenna 954 may have the first polarization characteristic, and the RF signal corresponding to the second resonance frequency may have the second polarization characteristic substantially orthogonal to the first polarization characteristic. Referring to FIG. 9C, in the first state, the antenna 954 may form a circularly polarized wave by using two linear polarizations orthogonal to each other. Referring to FIG. 9B, the antenna 954 in the first state having a circular polarization characteristic may have an increased bandwidth and radiation efficiency compared to those in the second state and the third state. The circular polarization characteristic may be referred to as a third polarization characteristic in view of the fact that it is distinct from the first polarization characteristic and the second polarization characteristic, which are linear polarization characteristics.

In Table 2, the second state may be the state in which the first switch 981 and the second switch 982 are turned off, and the third switch 983 and the fourth switch 984 are turned on. For example, the second state may be the state in which the first patch 961 and the second patch 962 are not electrically connected to the conductive patch 910, and the third patch 963 and the fourth patch 964 are electrically connected to the conductive patch 910. In the second state, the antenna 954 may form a first resonance frequency corresponding to Ch. 5 and a second resonance frequency corresponding to Ch. 9. For example, referring to FIG. 9B, in the second state, the antenna 954 may form a first resonance frequency of about 6.5 GHz and a second resonance frequency of about 8 GHz. In an embodiment, the RF signal corresponding to the first resonance frequency of the antenna 954 may have the first polarization characteristic, and the RF signal corresponding to the second resonance frequency may have the second polarization characteristic. The first polarization characteristic of the first resonance frequency and the second polarization characteristic of the second resonance frequency of the antenna 954 may be substantially orthogonal to each other. For example, when the RF signal corresponding to the first resonance frequency of the antenna 954 has a vertical polarization, the RF signal corresponding to the second resonance frequency may have a horizontal polarization.

In Table 2, the third state may be the state in which the first switch 981 and the second switch 982 are turned on, and the third switch 983 and the fourth switch 984 are turned off. For example, the third state may be the state in which the first patch 961 and the second patch 962 are electrically connected to the conductive patch 910, and the third patch 963 and the fourth patch 964 are not electrically connected to the conductive patch 910. In the third state, the antenna 954 may form a first resonance frequency corresponding to Ch. 9 and a second resonance frequency corresponding to Ch. 5. For example, referring to FIG. 9B, in the third state, the antenna 954 may form a first resonance frequency of about 8 GHz and a second resonance frequency of about 6.5 GHz. In an embodiment, the RF signal corresponding to the first resonance frequency of the antenna 954 may have the first polarization characteristic, and the RF signal corresponding to the second resonance frequency may have the second polarization characteristic. The first polarization characteristic of the first resonance frequency and the second polarization characteristic of the second resonance frequency of the antenna 954 may be substantially orthogonal to each other. For example, when the RF signal corresponding to the first resonance frequency of the antenna 954 has a vertical polarization, the RF signal corresponding to the second resonance frequency may have a horizontal polarization.

In Table 2, the fourth state may be the state in which the first switch 981, the second switch 982, the third switch 983, and the fourth switch 984 are all turned on. The fourth state may be the state in which the first patch 961, the second patch 962, the third patch 963, and the fourth patch 964 are electrically connected to the conductive patch 910. In the fourth state, the first resonance frequency and the second resonance frequency formed by the antenna 954 may be substantially equal to each other. For example, the antenna 954 may form a first resonance frequency and a second resonance frequency corresponding to Ch. 5. For example, referring to FIG. 9B, in the first state, the antenna 954 may form a first resonance frequency and a second resonance frequency of about 6.5 GHz. In an embodiment, the RF signal corresponding to the first resonance frequency of the antenna 954 may have the first polarization characteristic, and the RF signal corresponding to the second resonance frequency may have the second polarization characteristic orthogonal to the first polarization characteristic. Referring to FIG. 9C, in the fourth state, the antenna 954 may form a circularly polarized wave by using two linear polarizations substantially orthogonal to each other. Referring to FIG. 9B, the antenna 954 in the fourth state having a circular polarization characteristic may have an increased bandwidth and radiation efficiency compared to those in the second state and the third state. The circular polarization characteristic may be referred to as a third polarization characteristic in view of the fact that it is distinct from the first polarization characteristic and the second polarization characteristic, which are linear polarization characteristics.

The fact that the RF signals corresponding to the first and second resonance frequencies of the antenna 954 have different polarization characteristics may be understood through the description provided above with reference to FIGS. 6C and 7E.

In an embodiment, by controlling the switches 981, 982, 983, and 984, the UWB IC may variably control the channels and/or polarization characteristics of the RF signals transmitted and received from the antenna 954 according to various communication environments.

In an embodiment, in the first state in which the first switch 981, the second switch 982, the third switch 983, and the fourth switch 984 are turned off, the UWB IC may transmit and/or receive a third RF signal of a third frequency band having a third polarization characteristic distinct from the first polarization and the second polarization characteristic (e.g., an RF signal corresponding to the first and second resonance frequencies in the first state of Table 2).

In an embodiment, in the fourth state in which the first switch 981, the second switch 982, the third switch 983, and the fourth switch 984 are turned on, the UWB IC may transmit and/or receive a fourth RF signal of a fourth frequency band having the third polarization characteristic (e.g., an RF signal corresponding to the first and second resonance frequencies in the fourth state of Table 2). In an embodiment, the fourth frequency band of the fourth RF signal (e.g., the frequency band corresponding to Ch. 5 of Table 2) may be lower than the third frequency band of the third RF signal (e.g., the frequency band corresponding to Ch. 9 of Table 2).

In an embodiment, in the second state in which the first switch 981 and the second switch 982 are turned off and the third switch 983 and the fourth switch 984 are turned on, the UWB IC may transmit and/or receive a first RF signal of the first frequency band having the first polarization characteristic (e.g., the RF signal corresponding to the first resonance frequency in the second state of Table 2) and a second RF signal of the second frequency band having the second polarization characteristic distinct from the first polarization characteristic (e.g., the RF signal corresponding to the second resonance frequency in the second state of Table 2). In an embodiment, the second frequency band of the second RF signal (e.g., the frequency band corresponding to Ch. 9 of Table 2) may be higher than the first frequency band of the first RF signal (e.g., the frequency band corresponding to Ch. 5 of Table 2).

In an embodiment, in the third state in which the first switch 981 and the second switch 982 are turned on and the third switch 983 and the fourth switch 984 are turned off, the UWB IC may transmit and/or receive a first RF signal of the first frequency band having the first polarization characteristic (e.g., the RF signal corresponding to the first resonance frequency in the third state of Table 2) and a second RF signal of the second frequency band having the second polarization characteristic distinct from the first polarization characteristic (e.g., the RF signal corresponding to the second resonance frequency in the third state of Table 2). In an embodiment, the second frequency band of the second RF signal (e.g., the frequency band corresponding to Ch. 5 of Table 2) may be lower than the first frequency band of the first RF signal (e.g., the frequency band corresponding to Ch. 9 of Table 2).

A plurality of antennas 954 according to an embodiment may be included in an antenna structure (e.g., the antenna structure 754 in FIG. 7A). In this case, the plurality of antennas 954 may be arranged substantially the same as those illustrated in FIG. 7A.

FIG. 10A illustrates an antenna according to an embodiment.

Figure 10B:
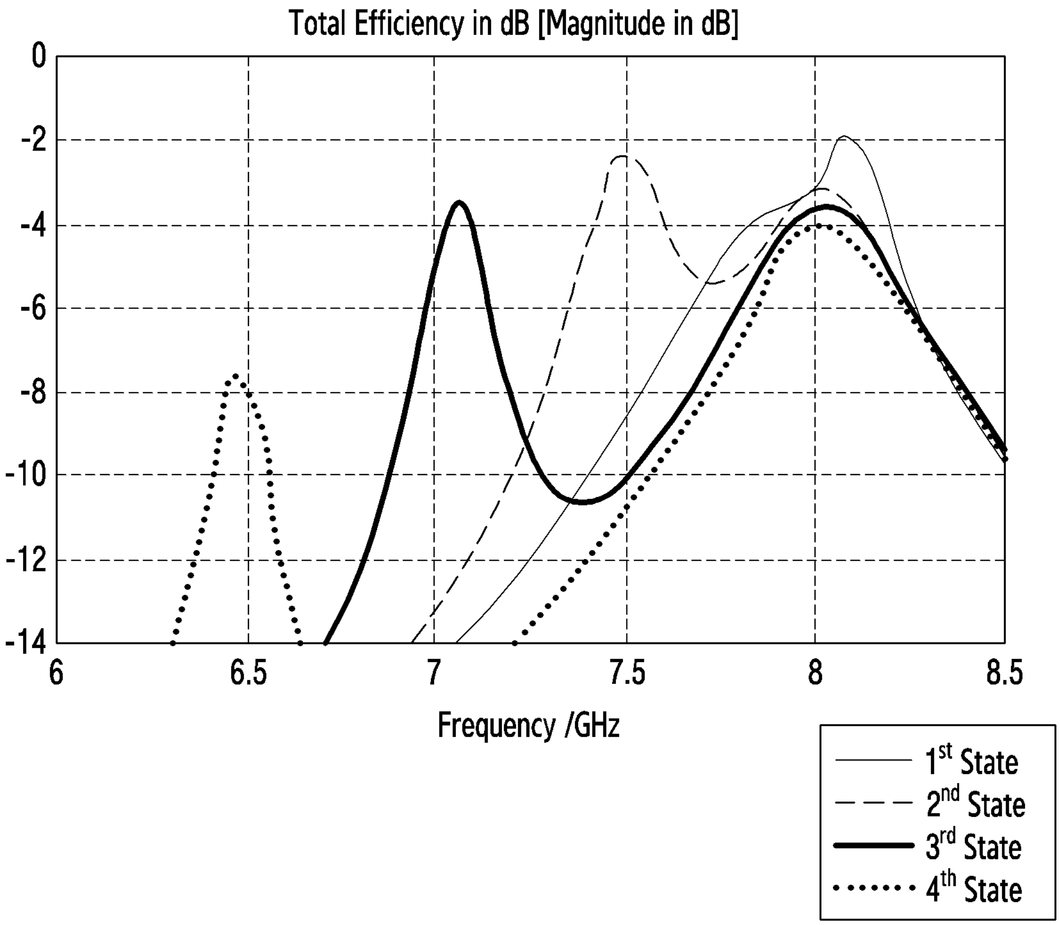
FIG. 10B illustrates radiation characteristics of an antenna according to an embodiment in first, second, third, and fourth states.

FIG. 10B illustrates radiation characteristics of an antenna according to an embodiment in first, second, third, and fourth states.

Figure 10C:
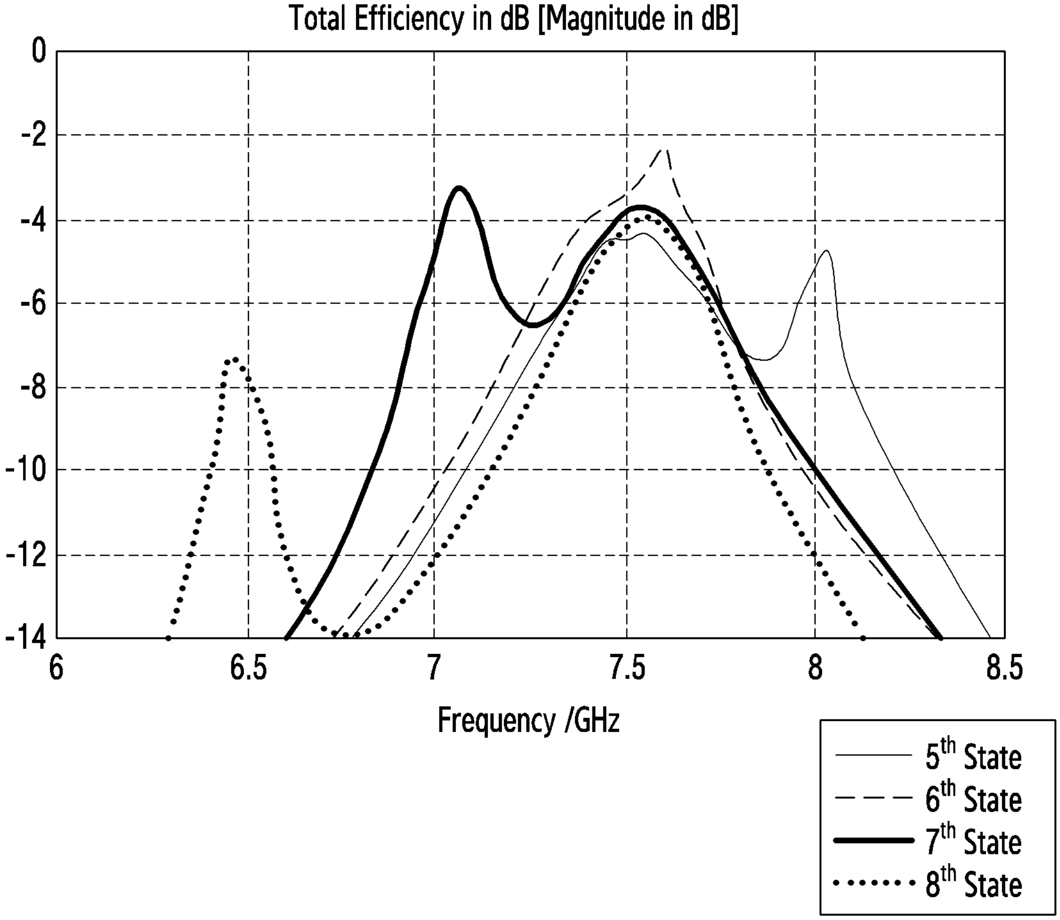
FIG. 10C illustrates radiation characteristics of an antenna according to an embodiment in fifth, sixth, seventh, and eighth states.

FIG. 10C illustrates radiation characteristics of an antenna according to an embodiment in fifth, sixth, seventh, and eighth states.

Figure 10D:
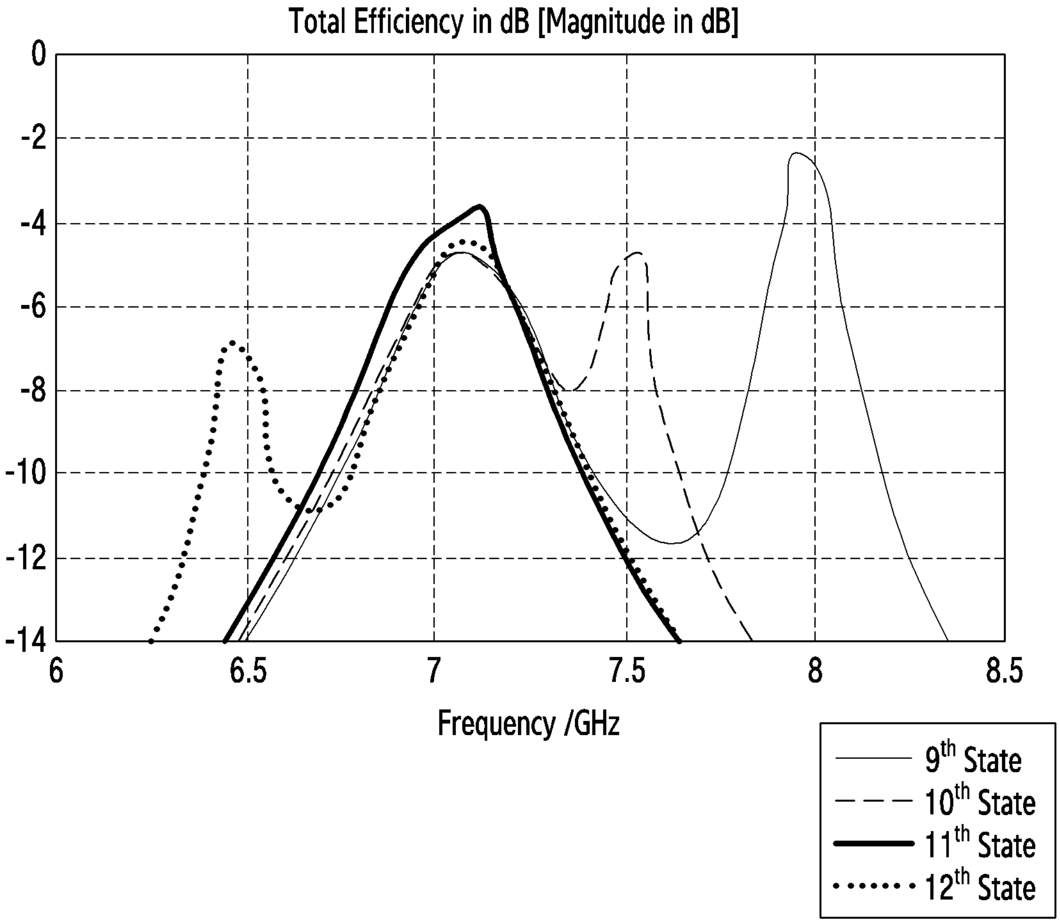
FIG. 10D illustrates radiation characteristics of an antenna according to an embodiment in ninth, tenth, eleventh, and twelfth states.

FIG. 10D illustrates radiation characteristics of an antenna according to an embodiment in ninth, tenth, eleventh, and twelfth states.

Figure 10E:
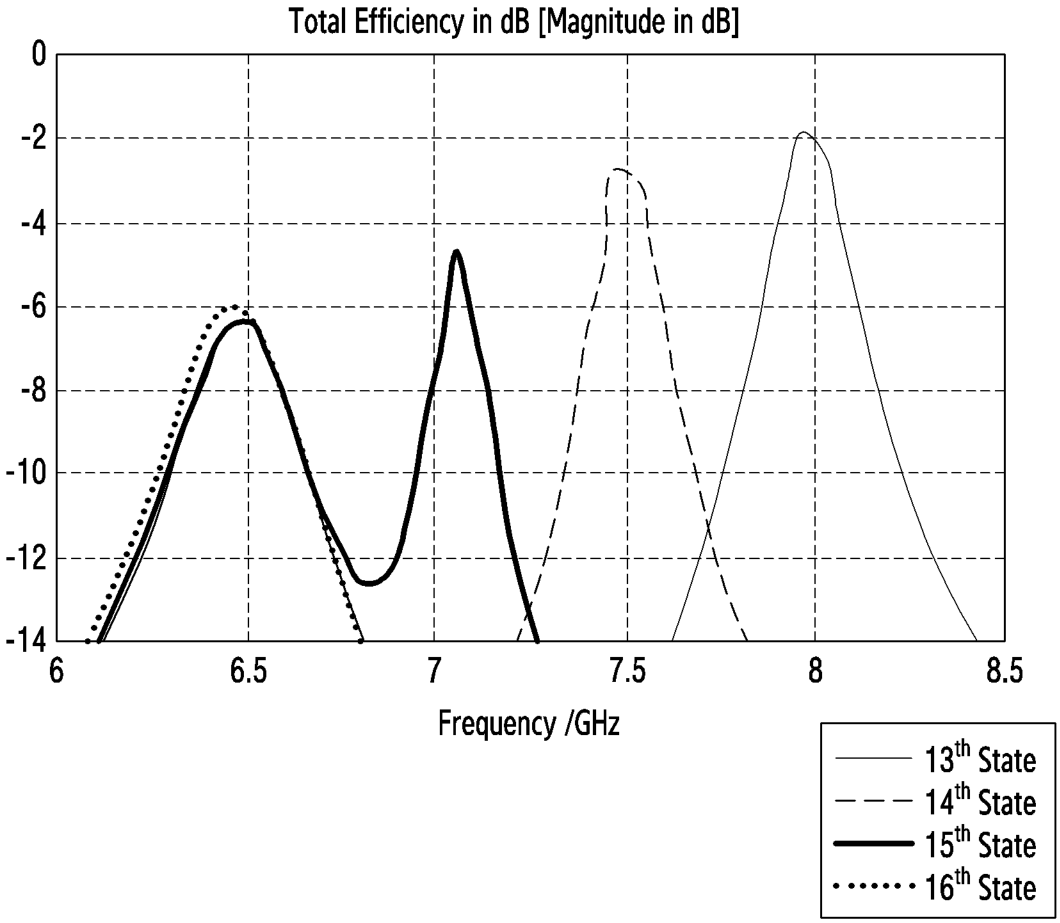
FIG. 10E illustrates radiation characteristics of an antenna according to an embodiment in thirteenth, fourteenth, fifteenth, and sixteenth states.

FIG. 10E illustrates radiation characteristics of an antenna according to an embodiment in thirteenth, fourteenth, fifteenth, and sixteenth states.

Figure 10F:
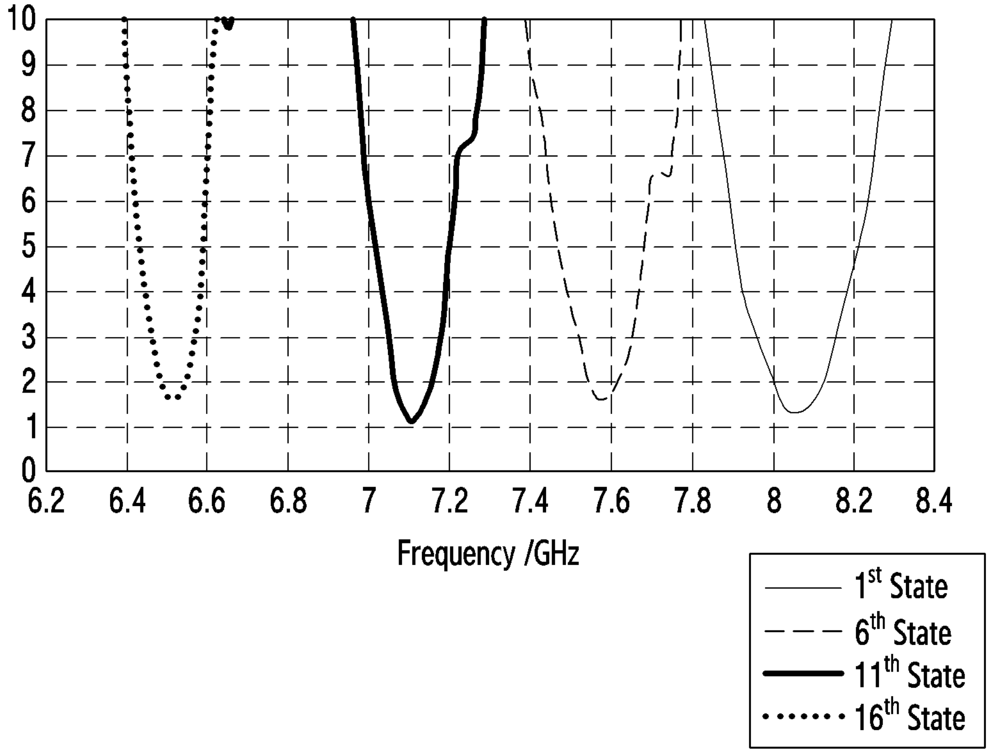
FIG. 10F is a graph illustrating axial ratios of an antenna according to an embodiment in the first, sixth, eleventh, and sixteenth states.

FIG. 10F is a graph illustrating axial ratios of an antenna according to an embodiment in the first, sixth, eleventh, and sixteenth states.

An antenna 1054 of FIG. 10A may correspond to the antenna 654 of FIG. 6A. For example, the description provided with reference to FIGS. 6A to 6C may be equally or correspondingly applied to a description of the antenna 1054 of FIG. 10A. For example, the antenna 1054 according to an embodiment may include a dielectric body 1030 and a ground. The dielectric body 1030 and the ground of the antenna 1054 may correspond to the dielectric body 630 and the ground 650 of the antenna 654 of FIG. 6A, respectively.

Referring to FIG. 10A, the antenna 1054 (e.g., the second antenna 254 in FIG. 5) according to an embodiment may include a conductive patch 1010, switches 1081 to 1096, and/or patches 1061 to 1076.

In an embodiment, the conductive patch 1010 may be disposed on the dielectric body 1030. The conductive patch 1010 may have a shape obtained by removing, from a rectangle having a width W1 and a length L1, a first area 1021, a second area 1022, a third area 1023, and a fourth area 1024. The first area 1021 may include a first corner 1011 of the rectangle, and the second area 1022 may include a second corner 1012 located in a diagonal direction relative to the first corner 1011 of the rectangle. The third area 1023 may include a third corner 1013 of the rectangle, and the fourth area 1024 may include a fourth corner 1014 located in a diagonal direction relative to the third corner 1013 of the rectangle. The first area 1021 may be a rectangle having a predetermined width $W_c$ and a predetermined length $L_c$ The rectangle having the width W1 and the length L1 may have a first size, and the first area 1021, the second area 1022, the third area 1023, and the fourth area 1024 may have a second size smaller than the first size.

In an embodiment, the conductive patch 1010 may include a first virtual diagonal line DL1 interconnecting the third corner 1013 and the fourth corner 1014 and a second virtual diagonal line DL2 interconnecting the first corner 1011 and the second corner 1012. In an embodiment, the length of the first diagonal line DL1 may be substantially equal to that of the second diagonal line DL2. The first diagonal line DL1 and the second diagonal line DL2 may form a predetermined angle (e.g., about 90°).

In an embodiment, the antenna 1054 may form a first resonance frequency corresponding to the first diagonal line DL1 of the conductive patch 1010 and a second resonance frequency corresponding to the second diagonal line DL2.

The first and second RF signals having the first and second resonance frequencies, respectively, which are formed by the antenna 1054 according to an embodiment, may have first and second polarization characteristics, respectively. For example, the first RF signal having the first resonance frequency and the second RF signal having the second resonance frequency may have linear polarization characteristics. The first polarization of the first RF signal and the second polarization of the second RF signal may be orthogonal to each other.

In an embodiment, the patches 1061 to 1076 may include a first patch 1061, a second patch 1062, a third patch 1063, a fourth patch 1064, a fifth patch 1065, a sixth patch 1066, a seventh patch 1067, an eighth patch 1068, a ninth patch 1069, a tenth patch 1070, an eleventh patch 1071, a twelfth patch 1072, a thirteenth patch 1073, a fourteenth patch 1074, a fifteenth patch 1075, and/or a sixteenth patch 1076. In an embodiment, the patches 1061 to 1076 may include a conductive material, such as a metal foil.

In an embodiment, the switches 1081 to 1096 may include a first switch 1081, a second switch 1082, a third switch 1083, a fourth switch 1084, a fifth switch 1085, a sixth switch 1086, a seventh switch 1087, an eighth switch 1088, a ninth switch 1089, a tenth switch 1090, an eleventh switch 1091, a twelfth switch 1092, a thirteenth switch 1093, a fourteenth switch 1094, a fifteenth switch 1095, and/or a sixteenth switch 1096.

In an embodiment, the patches 1061 to 1076 or switches 1081 to 1096 may act as a matching circuit of the antenna 1054.

In an embodiment, the first patch 1061, the second patch 1062, the third patch 1063, the fourth patch 1064, or the conductive patch 1010 may be spaced apart from each other. In an embodiment, the first patch 1061, the second patch 1062, the third patch 1063, and/or the fourth patch 1064 may be spaced apart from the conductive patch 1010, and may be disposed in the first area 1021. In an embodiment, the first switch 1081, the second switch 1082, the third switch 1083, and/or the fourth switch 1084 may be spaced apart from the conductive patch 1010, and may be disposed in the first area 1021. The first switch 1081 may be disposed in an electrical path between the conductive patch 1010 and the first patch 1061. The first patch 1061 may be disposed between the first switch 1081 and the second switch 1082. The second switch 1082 may be disposed in an electrical path between the first patch 1061 and the second patch 1062. In an embodiment, the first switch 1081, the first patch 1061, the second switch 1082, and the second patch 1062 may be located on a line along which the second diagonal line DL2 extends. For example, the first switch 1081, the first patch 1061, the second switch 1082, and the second patch 1062 may be aligned along the second diagonal line DL2. The first switch 1081, the first patch 1061, the second switch 1082, and the second patch 1062 may be disposed in order in a direction away from the conductive patch 1010.

In an embodiment, the third patch 1063 may be spaced apart from the second patch 1062, and the third switch 1083 may be disposed in an electrical path between the third patch 1063 and the second patch 1062. The third patch 1063 may be disposed in the first area 1021 in a direction from the second patch 1062 toward the third corner 1013. The third patch 1063, the third switch 1083, and the second switch 1062 may be disposed along the width direction W1 of the conductive patch 1010.

In an embodiment, the fourth patch 1064 may be spaced apart from the second patch 1062, and the fourth switch 1084 may be disposed in an electrical path between the second patch 1062 and the fourth patch 1064. The fourth patch 1064 may be disposed in the first area 1021 in a direction from the second patch 1062 toward the fourth corner 1014. The second patch 1062, the fourth switch 1084, and the fourth patch 1064 may be disposed along the length direction L1 of the conductive patch 1010. In an embodiment, the sizes and/or shapes of the first patch 1061, the second patch 1062, the third patch 1063, and/or the fourth patch 1064 may be various. For example, the first patch 1061 may have a larger area than the second, third, and fourth patches 1062, 1063, and 1064. As another example, the sizes and/or shapes of the first patch 1061, the second patch 1062, the third patch 1063, and/or the fourth patch 1064 may be different from each other. As another example, the sizes and/or shapes of the first patch 1061, the second patch 1062, the third patch 1063, and/or the fourth patch 1064 may be substantially equal to each other.

In an embodiment, depending on the operating states of the first switch 1081, the second switch 1082, the third switch 1083, and the fourth switch 1084, the electrical connection states of the conductive patch 1010, the first patch 1061, the second patch 1062, the third patch 1063, and the fourth patch 1064 may be different from each other. Depending on the electrical connection states of the conductive patch 1010, the first patch 1061, the second patch 1062, the third patch 1063, and the fourth patch 1064, the length of the electrical path corresponding the second diagonal line DL2 of the conductive patch 1010 may vary.

In an embodiment, the fifth patch 1065, the sixth patch 1066, the seventh patch 1067, the eighth patch 1068, or the conductive patch 1010 may be spaced apart from each other. In an embodiment, the fifth patch 1065, the sixth patch 1066, the seventh patch 1067, and/or the eighth patch 1068 may be spaced apart from the conductive patch 1010, and may be disposed in the second area 1022. In an embodiment, the fifth switch 1085, the sixth switch 1086, the seventh switch 1087, and/or the eighth switch 1088 may be spaced apart from the conductive patch 1010, and may be disposed in the second area 1022. The fifth switch 1085 may be disposed in an electrical path between the conductive patch 1010 and the fifth patch 1065. The fifth patch 1065 may be disposed between the fifth switch 1085 and the sixth switch 1086. The sixth switch 1086 may be disposed in an electrical path between the fifth patch 1065 and the sixth patch 1066. In an embodiment, the fifth switch 1085, the fifth patch 1065, the sixth switch 1086, and the sixth patch 1066 may be located on a line along which the second diagonal line DL2 extends. For example, in an embodiment, the fifth switch 1085, the fifth patch 1065, the sixth switch 1086, and the sixth patch 1066 may be aligned along the second diagonal line DL2. The fifth switch 1085, the fifth patch 1065, the sixth switch 1086, and the sixth patch 1066 may be disposed in order in a direction away from the conductive patch 1010.

In an embodiment, the seventh patch 1067 may be spaced apart from the sixth patch 1066, and the seventh switch 1087 may be disposed in an electrical path between the seventh patch 1067 and the sixth patch 1066. The seventh patch 1067 may be disposed in the second area 1022 in a direction from the sixth patch 1066 toward the fourth corner 1014. The seventh patch 1067, the seventh switch 1087, and the sixth switch 1066 may be disposed along the width direction W1 of the conductive patch 1010.

In an embodiment, the eighth patch 1068 may be spaced apart from the sixth patch 1066, and the eighth switch 1088 may be disposed in an electrical path between the sixth patch 1066 and the eighth patch 1068. The eighth patch 1068 may be disposed in the second area 1022 in a direction from the sixth patch 1066 toward the third corner 1013. The sixth patch 1066, the eighth switch 1088, and the eighth patch 1068 may be disposed along the length direction L1 of the conductive patch 1010. In an embodiment, the sizes and/or shapes of the fifth patch 1065, the sixth patch 1066, the seventh patch 1067, and/or the eighth patch 1068 may be various. For example, the fifth patch 1065 may have a larger area than the sixth, seventh, and eighth patches 1066, 1067, and 1068. As another example, the sizes and/or shapes of the fifth patch 1065, the sixth patch 1066, the seventh patch 1067, and/or the eighth patch 1068 may be different from each other. As another example, the sizes and/or shapes of the fifth patch 1065, the sixth patch 1066, the seventh patch 1067, and/or the eighth patch 1068 may be substantially equal to each other.

In an embodiment, depending on the operating states of the fifth switch 1085, the sixth switch 1086, the seventh switch 1087, and the eighth switch 1088, the electrical connection states of the conductive patch 1010, the fifth patch 1065, the sixth patch 1066, the seventh patch 1067, and the eighth patch 1068 may be different from each other. Depending on the electrical connection states of the conductive patch 1010, the fifth patch 1065, the sixth patch 1066, the seventh patch 1067, and the eighth patch 1068, the length of the electrical path corresponding the second diagonal line DL2 of the conductive patch 1010 may vary.

In an embodiment, the ninth patch 1069, the tenth patch 1070, the eleventh patch 1071, the twelfth patch 1072, or the conductive patch 1010 may be spaced apart from each other. In an embodiment, the ninth patch 1069, the tenth patch

1070, the eleventh patch 1071, and/or the twelfth patch 1072 may be spaced apart from the conductive patch 1010, and may be disposed in the third area 1023. In an embodiment, the ninth switch 1089, the tenth switch 1090, the eleventh switch 1091, and/or the twelfth switch 1092 may be spaced apart from the conductive patch 1010, and may be disposed in the third area 1023. The ninth switch 1089 may be disposed in an electrical path between the conductive patch 1010 and the ninth patch 1069. The ninth patch 1069 may be disposed between the ninth switch 1089 and the tenth switch 1090. The tenth switch 1090 may be disposed in an electrical path between the ninth patch 1069 and the tenth patch 1070. In an embodiment, the ninth switch 1089, the ninth patch 1069, the tenth switch 1090, and the tenth patch 1070 may be located on a line along which the first diagonal line DL1 extends. For example, in an embodiment, the ninth switch 1089, the ninth patch 1069, the tenth switch 1090, and the tenth patch 1070 may be aligned along the first diagonal line DL1. The ninth switch 1089, the ninth patch 1069, the tenth switch 1090, and the tenth patch 1070 may be disposed in order in a direction away from the conductive patch 1010.

In an embodiment, the eleventh patch 1071 may be spaced apart from the tenth patch 1070, and the eleventh switch 1091 may be disposed in an electrical path between the eleventh patch 1071 and the tenth patch 1070. The eleventh patch 1071 may be disposed in the third area 1023 in a direction from the tenth patch 1070 toward the first corner 1011. The eleventh patch 1071, the eleventh switch 1091, and the sixth switch 1066 may be disposed along the width direction W1 of the conductive patch 1010.

In an embodiment, the twelfth patch 1072 may be spaced apart from the tenth patch 1070, and the twelfth switch 1092 may be disposed in an electrical path between the tenth patch 1070 and the twelfth patch 1072. The twelfth patch 1072 may be disposed in the third area 1023 in a direction from the tenth patch 1070 toward the second corner 1012. The tenth patch 1070, the twelfth switch 1092, and the twelfth patch 1072 may be disposed along the length direction L1 of the conductive patch 1010. In an embodiment, the sizes and/or shapes of the ninth patch 1069, the tenth patch 1070, the eleventh patch 1071, and/or the twelfth patch 1072 may be various. For example, the ninth patch 1069 may have a larger area than the tenth, eleventh, and twelfth patches 1070, 1071, and 1072. As another example, the sizes and/or shapes of the ninth patch 1069, the tenth patch 1070, the eleventh patch 1071, and/or the twelfth patch 1072 may be different from each other. As another example, the sizes and/or shapes of the ninth patch 1069, the tenth patch 1070, the eleventh patch 1071, and/or the twelfth patch 1072 may be substantially equal to each other.

In an embodiment, depending on the operating states of the ninth switch 1089, the tenth switch 1090, the eleventh switch 1091, and the twelfth switch 1092, the electrical connection states of the conductive patch 1010, the ninth patch 1069, the tenth patch 1070, the eleventh patch 1071, and the twelfth patch 1072 may be different from each other. Depending on the electrical connection states of the conductive patch 1010, the ninth patch 1069, the tenth patch 1070, the eleventh patch 1071, and the twelfth patch 1072, the length of the electrical path corresponding the first diagonal line DL1 of the conductive patch 1010 may vary.

In an embodiment, the thirteenth patch 1073, the fourteenth patch 1074, the fifteenth patch 1075, the sixteenth patch 1076, or the conductive patch 1010 may be spaced apart from each other. In an embodiment, the thirteenth patch 1073, the fourteenth patch 1074, the fifteenth patch 1075, and/or the sixteenth patch 1076 may be spaced apart from the conductive patch 1010, and may be disposed in the fourth area 1024. In an embodiment, the thirteenth switch 1093, the fourteenth switch 1094, the fifteenth switch 1095, and/or the sixteenth switch 1096 may be spaced apart from the conductive patch 1010, and may be disposed in the fourth area 1024. The thirteenth switch 1093 may be disposed in an electrical path between the conductive patch 1010 and the thirteenth patch 1073. The thirteen patch 1073 may be disposed between the thirteenth switch 1093 and the fourteenth switch 1094. The fourteenth switch 1094 may be disposed in an electrical path between the thirteenth patch 1073 and the fourteenth patch 1074. In an embodiment, the thirteenth switch 1093, the thirteenth patch 1073, the fourteenth switch 1094, and the fourteenth patch 1074 may be located on a line along which the first diagonal line DL1 extends. For example, in an embodiment, the thirteenth switch 1093, the thirteenth patch 1073, the fourteenth switch 1094, and the fourteenth patch 1074 may be aligned along the first diagonal line DL1. The thirteenth switch 1093, the thirteenth patch 1073, the fourteenth switch 1094, and the fourteenth patch 1074 may be disposed in order in a direction away from the conductive patch 1010.

In an embodiment, the fifth patch 1075 may be spaced apart from the fourteenth patch 1074, and the fifth switch 1095 may be disposed in an electrical path between the fifteenth patch 1075 and the fourteenth patch 1074. The fifteenth patch 1075 may be disposed in the fourth area 1024 in a direction from the fourteenth patch 1074 toward the second corner 1012. The fifth patch 1075, the fifteenth switch 1095, and the sixth switch 1066 may be disposed along the width direction W1 of the conductive patch 1010.

In an embodiment, the sixteenth patch 1076 may be spaced apart from the fourteenth patch 1074, and the sixteenth switch 1096 may be disposed in an electrical path between the fourteenth patch 1074 and the sixteenth patch 1076. The sixteenth patch 1076 may be disposed in the fourth area 1024 in a direction from the fourteenth patch 1074 toward the first corner 1011. The fourteenth patch 1074, the sixteenth switch 1096, and the sixteenth patch 1076 may be disposed along the length direction L1 of the conductive patch 1010. In an embodiment, the sizes and/or shapes of the thirteenth patch 1073, the fourteenth patch 1074, the fifteenth patch 1075, and/or the sixteenth patch 1076 may be various. For example, the thirteenth patch 1073 may have a larger area than the fourteenth, fifteenth, and sixteenth patches 1074, 1075, and 1076. As another example, the sizes and/or shapes of the thirteenth patch 1073, the fourteenth patch 1074, the fifteenth patch 1075, and/or the sixteenth patch 1076 may be different from each other. As another example, the sizes and/or shapes of the thirteenth patch 1073, the fourteenth patch 1074, the fifteenth patch 1075, and/or the sixteenth patch 1076 may be substantially equal to each other.

In an embodiment, depending on the operating states of the thirteenth switch 1093, the fourteenth switch 1094, the fifteenth switch 1095, and the sixteenth switch 1096, the electrical connection states of the conductive patch 1010, the thirteenth patch 1073, the fourteenth patch 1074, the fifteenth patch 1075, and the sixteenth patch 1076 may be different from each other. Depending on the electrical connection states of the conductive patch 1010, the thirteenth patch 1073, the fourteenth patch 1074, the fifteenth patch 1075, and the sixteenth patch 1076, the length of the electrical path corresponding the first diagonal line DL1 of the conductive patch 1010 may vary.

In an embodiment, the switches 1081 to 1096, and 984 may include various components that may change the electrical connection states among the patches 1061 to 1076 of the antenna 1054. For example, switches 1081 to 1096 may each include a PIN diode.

In an embodiment, a UWB IC (e.g., the UWB IC 292 in FIG. 2) may control the switches 1081 to 1096. For example, by applying a DC voltage to at least one of the switches 1081 to 1096, the UWB IC may change the electrical connection states between the conductive patch 1010 and the patches 1061 to 1076.

In an embodiment, the antenna 1054 may form a first resonance frequency corresponding to the first diagonal line DL1 and a second resonance frequency corresponding to the second diagonal line DL2. In an embodiment, the UWB IC (e.g., the UWB IC 292 in FIG. 2) may transmit or receive an RF signal corresponding to the first resonance frequency and/or the second resonance frequency.

In an embodiment, depending on the operating states of the switches 1081 to 1096 (or the electrical connection states between the conductive patch 1010 and the patches 1061 to 1076), the resonance frequency formed by the antenna 1054 may vary. Resonance frequencies formed by the antenna 1054 according to the electrical connection states are shown in Table 3 below.

TABLE 3

| | Connection state | $1^{st}$ resonance frequency | $2^{nd}$ resonance frequency |
|---|---|---|---|
| $1^{st}$ state | — | Ch. 9 | Ch. 9 |
| $2^{nd}$ state | Vx | Ch. 8 | Ch. 9 |
| $3^{rd}$ state | Vx, Vy | Ch. 6 | Ch. 9 |
| $4^{th}$ state | Vx, Vy, Vz | Ch. 5 | Ch. 9 |
| $5^{th}$ state | Hx | Ch. 9 | Ch. 8 |
| $6^{th}$ state | Vx, Hx | Ch. 8 | Ch. 8 |
| $7^{th}$ state | Vx, Vy, Hx | Ch. 6 | Ch. 8 |
| $8^{th}$ state | Vx, Vy, Vz, Hx | Ch. 5 | Ch. 8 |
| $9^{th}$ state | Hx, Hy | Ch. 9 | Ch. 6 |
| $10^{th}$ state | Vx, Hx, Hy | Ch. 8 | Ch. 6 |
| $11^{th}$ state | Vx, Vy, Hx, Hy | Ch. 6 | Ch. 6 |
| $12^{th}$ state | Vx, Vy, Vz, Hx, Hy | Ch. 5 | Ch. 6 |
| $13^{th}$ state | Hx, Hy, Hz | Ch. 9 | Ch. 5 |
| $14^{th}$ state | Vx, Hx, Hy, Hz | Ch. 8 | Ch. 5 |
| $15^{th}$ state | Vx, Vy, Hx, Hy, Hz | Ch. 6 | Ch. 5 |
| $16^{th}$ state | Vx, Vy, Vz, Hx, Hy, Hz | Ch. 5 | Ch. 5 |

The channels (Chs.) of Table 3 are based on the IEEE 802.15.4a UWB communication protocol, but are not limited thereto.

In Table 3, Hx may indicate that the first patch 1061 is electrically connected to the conductive patch 1010 via the first switch 1081, and the fifth patch 1065 is electrically connected to the conductive patch 1010 via the fifth switch 1085.

In Table 3, Hy may indicate that the second patch 1062 is electrically connected to the first patch 1061 via the second switch 1082, and the sixth patch 1066 is electrically connected to the fifth patch 1065 via the sixth switch 1086.

In Table 3, Hz may indicate that the third patch 1063 and the fourth patch 1064 are electrically connected to the second patch 1062 via the third switch 1083 and the fourth switch 1084, and the seventh patch 1067 and the eighth patch 1068 are electrically connected to the sixth patch 1066 via the seventh switch 1087 and the eighth switch 1088.

In Table 3, Vx may indicate that the ninth patch 1069 is electrically connected to the conductive patch 1010 via the ninth switch 1089, and the thirteenth patch 1073 is electrically connected to the conductive patch 1010 via the thirteenth switch 1093.

In Table 3, Vy may indicate that the tenth patch 1070 is electrically connected to the ninth patch 1069 via the tenth switch 1090, and the fourteenth patch 1074 is electrically connected to the thirteenth patch 1073 via the fourteenth switch 1094.

In Table 3, Vz may indicate that the eleventh patch 1071 and the twelfth patch 1072 are electrically connected to the tenth patch 1070 via the eleventh switch 1091 and the twelfth switch 1092, and the fifteenth patch 1075 and the sixteenth patch 1076 are electrically connected to the fourteenth patch 1074 via the fifteenth switch 1095 and the sixteenth switch 1096.

In Table 3, the first state may be the state in which the switches 1081 to 1096 of the antenna 1054 are all turned off. For example, the first state may be the state in which all of the patches 1061 to 1076 of the antenna 1054 are not electrically connected to the conductive patch 1010. In the first state, a first resonance frequency and a second resonance frequency formed by the antenna 1054 may be substantially equal to each other. For example, the antenna 1054 may form a first resonance frequency and a second resonance frequency corresponding to Ch. 9. For example, referring to FIG. 10B, in the first state, the antenna 1054 may form a first resonance frequency and a second resonance frequency of about 8 GHz.

In an embodiment, in the first state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In an embodiment, referring to FIG. 10F, as polarizations orthogonal to each other are combined in substantially the same frequency band, the RF signal transmitted and received by the antenna 1054 in the first state may have a circular polarization characteristic. The antenna 1054 in the first state having the circular polarization characteristic may have an increased bandwidth and radiation efficiency compared to those in the second state, the third state, and the fourth state.

In Table 3, the second state may be the state in which, among the switches 1081 to 1086 of the antenna 1054, only the ninth switch 1089 and the thirteenth switch 1093 are turned on, and the remaining switches are turned off. For example, the second state may be the state in which, among the patches 1061 to 1076 of the antenna 1054, the ninth patch 1069 and the thirteenth patch 1073 are electrically connected to the conductive patch 1010, and the remaining patches are not electrically connected to the conductive patch 1010. In the second state, the antenna 1054 may form a first resonance frequency corresponding to Ch. 8 and a second resonance frequency corresponding to Ch. 9. For example, referring to FIG. 10B, in the second state, the antenna 1054 may form a first resonance frequency of about 7.5 GHz and a second resonance frequency of about 8 GHz. In an embodiment, in the second state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the third state may be the state in which, among the switches 1081 to 1096 of the antenna 1054, the ninth switch 1089, the tenth switch 1090, the thirteenth switch 1093, and the fourteenth switch 1094 are turned on, and the remaining switches are turned off. For example, the third state may be the state in which, among the patches 1061 to 1076 of the antenna 1054, the ninth patch 1069, the tenth patch 1070, the thirteenth patch 1073, and the fourteenth patch 1074 are electrically connected to the conductive patch 1010, and the remaining patches are not electrically connected to the conductive patch 1010. In the third state, the antenna 1054 may form a first resonance frequency corresponding to Ch. 6 and a second resonance frequency corresponding to Ch. 9. For example, referring to FIG. 10B, in the third state, the antenna 1054 may form a first resonance frequency of about 7 GHz and a second resonance frequency of about 8 GHz. In an embodiment, in the third state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the fourth state may be the state in which, among the switches 1081 to 1096 of the antenna 1054, the ninth switch 1089, the tenth switch 1090, the eleventh switch 1091, the twelfth switch 1092, the thirteenth switch 1093, the fourteenth switch 1094, the fifteenth switch 1095, and the sixteenth switch 1096 are turned on, and the remaining switches are turned off. For example, the fourth state may be the state in which, among the patches 1061 to 1076 of the antenna 1054, the ninth patch 1069, the tenth patch 1070, the eleventh patch 1071, the twelfth patch 1072, the thirteenth patch 1073, the fourteenth patch 1074, the fifteenth patch 1075, and the sixteenth patch 1076 are electrically connected to the conductive patch 1010, and the remaining patches are not electrically connected to the conductive patch 1010. In the fourth state, the antenna 1054 may form a first resonance frequency corresponding to Ch. 5 and a second resonance frequency corresponding to Ch. 9. For example, referring to FIG. 10B, in the fourth state, the antenna 1054 may form a first resonance frequency of about 6.5 GHz and a second resonance frequency of about 8 GHz. In an embodiment, in the fourth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the fifth state may be the state in which, among the switches 1081 to 1096 of the antenna 1054, the first switch 1081 and the fifth switch 1085 are turned on, and the remaining switches are turned off. For example, the fifth state may be the state in which, among the patches 1061 to 1076 of the antenna 1054, the first patch 1061 and the fifth patch 1065 are electrically connected to the conductive patch 1010, and the remaining patches are not electrically connected to the conductive patch 1010. In the fifth state, the antenna 1054 may form a first resonance frequency corresponding to Ch. 9 and a second resonance frequency corresponding to Ch. 8. For example, referring to FIG. 10C, in the fifth state, the antenna 1054 may form a first resonance frequency of about 8 GHz and a second resonance frequency of about 7.5 GHz. In an embodiment, in the fifth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the sixth state may be the state in which, among the switches 1081 to 1096 of the antenna 1054, the first switch 1081, the fifth switch 1085, the ninth switch 1089, and the thirteenth switch 1093 are turned on, and the remaining switches are turned off. The sixth state may be the state in which, among the patches 1061 to 1076 of the antenna 1054, the first patch 1061, the fifth patch 1065, the ninth patch 1069, and the thirteenth patch 1073 are electrically connected to the conductive patch 1010, and the remaining patches are not electrically connected to the conductive patch 1010. In the sixth state, a first resonance frequency and a second resonance frequency formed by the antenna 1054 may be substantially equal to each other. For example, the antenna 1054 may form a first resonance frequency and a second resonance frequency corresponding to Ch. 8. For example, referring to FIG. 10C, in the sixth state, the antenna 1054 may form a first resonance frequency and a second resonance frequency of about 7.5 GHz.

In an embodiment, in the sixth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In an embodiment, referring to FIG. 10F, as polarizations orthogonal to each other are combined in substantially the same frequency band, the RF signal transmitted and received by the antenna 1054 in the sixth state may have a circular polarization characteristic. Referring to FIG. 10C, the antenna 1054 in the sixth state having the circular polarization characteristic may have an increased bandwidth and radiation efficiency compared to those in the fifth state, the seventh state, and the eighth state.

In Table 3, the seventh state may be the state in which, among the switches 1081 to 1096 of the antenna 1054, the first switch 1081, the fifth switch 1085, the ninth switch 1089, the tenth switch 1090, the thirteenth switch 1093, and the fourteenth switch 1094 are turned on, and the remaining switches are turned off. For example, the third state may be the state in which, among the patches 1061 to 1076 of the antenna 1054, the first patch 1061, the fifth patch 1062, the ninth patch 1069, the tenth patch 1070, the thirteenth patch 1073, and the fourteenth patch 1074 are electrically connected to the conductive patch 1010, and the remaining patches are not electrically connected to the conductive patch 1010. In the seventh state, the antenna 1054 may form a first resonance frequency corresponding to Ch. 6 and a second resonance frequency corresponding to Ch. 8. For example, referring to FIG. 10C, in the seventh state, the antenna 1054 may form a first resonance frequency of about 7 GHz and a second resonance frequency of about 7.5 GHz. In an embodiment, in the seventh state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the eighth state may be the state in which, among the switches 1081 to 1096 of the antenna 1054, the first switch 1081, the fifth switch 1085, the ninth switch 1089, the tenth switch 1090, the eleventh switch 1091, the twelfth switch 1092, the thirteenth switch 1093, the fourteenth switch 1094, the fifteenth switch 1095, and the sixteenth switch 1096 are turned on, and the remaining switches are turned off. For example, the eighth state may be the state in which, among the patches 1061 to 1076 of the antenna 1054, the first patch 1061, the fifth patch 1065, the ninth patch 1069, the tenth patch 1070, the eleventh patch 1071, the twelfth patch 1072, the thirteenth patch 1073, the fourteenth patch 1074, the fifteenth patch 1075, and the sixteenth patch 1076 are electrically connected to the conductive patch 1010, and the remaining patches are not electrically connected to the conductive patch 1010. In the eighth state, the antenna 1054 may form a first resonance frequency corresponding to Ch. 5 and a second resonance frequency corresponding to Ch. 8. For example, referring to FIG. 10C, in the eighth state, the antenna 1054 may form a first resonance frequency of about 6.5 GHz and a second resonance frequency of about 7.5 GHz. In an embodiment, in the eighth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the ninth state may be the state in which, among the switches 1081 to 1096 of the antenna 1054, the first switch 1081, the second switch 1082, the fifth switch 1085, and the sixth switch 1086 are turned on, and the remaining switches are turned off. For example, the ninth state may be the state in which, among the patches 1061 to 1076 of the antenna 1054, the first patch 1061, the second patch 1062, the fifth patch 1065, and the sixth patch 1066 are electrically connected to the conductive patch 1010, and the remaining patches are not electrically connected to the conductive patch 1010. In the ninth state, the antenna 1054 may form a first resonance frequency corresponding to Ch. 9 and a second resonance frequency corresponding to Ch. 6. For example, referring to FIG. 10D, in the ninth state, the antenna 1054 may form a first resonance frequency of about 8 GHz and a second resonance frequency of about 7 GHz. In an embodiment, in the ninth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the tenth state may be the state in which, among the switches 1081 to 1096 of the antenna 1054, the first switch 1081, the second switch 1082, the fifth switch 1085, the sixth switch 1086, the ninth switch 1089, and the thirteenth switch 1093 are turned on, and the remaining switches are turned off. For example, the tenth state may be the state in which, among the patches 1061 to 1076 of the antenna 1054, the first patch 1061, the second patch 1062, the fifth patch 1065, the sixth patch 1066, the ninth patch 1069, and the thirteenth patch 1073 are electrically connected to the conductive patch 1010, and the remaining patches are not electrically connected to the conductive patch 1010. In the tenth state, the antenna 1054 may form a first resonance frequency corresponding to Ch. 8 and a second resonance frequency corresponding to Ch. 6. For example, referring to FIG. 10D, in the tenth state, the antenna 1054 may form a first resonance frequency of about 7.5 GHz and a second resonance frequency of about 7 GHz. In an embodiment, in the tenth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the eleventh state may be the state in which, among the switches 1081 to 1096 of the antenna 1054, the first switch 1081, the second switch 1082, the fifth switch 1085, the sixth switch 1086, the ninth switch 1089, the tenth switch 1090, the thirteenth switch 1093, and the fourteenth switch 1094 are turned on, and the remaining switches are turned off. For example, the eleventh state may be the state in which, among the patches 1061 to 1076 of the antenna 1054, the first patch 1061, the second patch 1062, the fifth patch 1065, the sixth patch 1066, the ninth patch 1069, the tenth patch 1070, the thirteenth patch 1073, and the fourteenth patch 1074 are electrically connected to the conductive patch 1010, and the remaining patches are not electrically connected to the conductive patch 1010. In the eleventh state, a first resonance frequency and a second resonance frequency formed by the antenna 1054 may be substantially equal to each other. For example, the antenna 1054 may form a first resonance frequency and a second resonance frequency corresponding to Ch. 6. For example, referring to FIG. 10D, in the eleventh state, the antenna 1054 may form a first resonance frequency and a second resonance frequency of about 7 GHz.

In an embodiment, in the eleventh state, the RF signal corresponding to the first resonance frequency of the antenna 1054 may have the first polarization characteristic, and the RF signal corresponding to the second resonance frequency may have the second polarization characteristic substantially orthogonal to the first polarization characteristic. In an embodiment, referring to FIG. 10F, as polarizations orthogonal to each other are combined in substantially the same frequency band, the RF signal transmitted and received by the antenna 1054 in the eleventh state may have a circular polarization characteristic. Referring to FIG. 10D, the antenna 1054 in the eleventh state having the circular polarization characteristic may have an increased bandwidth and radiation efficiency compared to those in the ninth state, the tenth state, and the twelfth state.

In Table 3, the twelfth state may be the state in which, among the switches 1081 to 1096 of the antenna 1054, the first switch 1081, the second switch 1082, the fifth switch 1085, the sixth switch 1086, the ninth switch 1089, the tenth switch 1090, the eleventh switch 1091, the twelfth switch 1092, the thirteenth switch 1093, the fourteenth switch 1094, the fifteenth switch 1095, and the sixteenth switch 1096 are turned on, and the remaining switches are turned off. For example, the twelfth state may be the state in which, among the patches 1061 to 1076 of the antenna 1054, the first patch 1061, the second patch 1062, the fifth patch 1065, the sixth path 1066, the ninth patch 1069, the tenth patch 1070, the eleventh patch 1071, the twelfth patch 1072, the thirteenth patch 1073, the fourteenth patch 1074, the fifteenth patch 1075, and the sixteenth patch 1076 are electrically connected to the conductive patch 1010, and the remaining patches are not electrically connected to the conductive patch 1010. In the twelfth state, the antenna 1054 may form a first resonance frequency corresponding to Ch. 5 and a second resonance frequency corresponding to Ch. 6. For example, referring to FIG. 10D, in the twelfth state, the antenna 1054 may form a first resonance frequency of about 6.5 GHz and a second resonance frequency of about 7 GHz. In an embodiment, in the twelfth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the thirteenth state may be the state in which, among the switches 1081 to 1096 of the antenna 1054, the first to eighth switches 1081 to 1088 are turned on, and the remaining switches (the ninth to sixteenth switches 1089 to 1096) are turned off. For example, the thirteenth state may be the state in which, among the patches 1061 to 1076 of the antenna 1054, the first to eighth patches 1061 to 1068 are electrically connected to the conductive patch 1010, and the remaining patches (the ninth to sixteenth patches 1069 to 1076 are not electrically connected to the conductive patch 1010. In the thirteenth state, the antenna 1054 may form a first resonance frequency corresponding to Ch. 9 and a second resonance frequency corresponding to Ch. 5. For example, referring to FIG. 10E, in the thirteenth state, the antenna 1054 may form a first resonance frequency of about 8 GHz and a second resonance frequency of about 6.5 GHz. In an embodiment, in the thirteenth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the fourteenth state may be the state in which, among the switches 1081 to 1096 of the antenna 1054, the first to ninth switches 1081 to 1089 and the thirteenth switch 1093 are turned on, and the remaining switches are turned off. For example, the fourteenth state may be the state in which, among the patches 1061 to 1076 of the antenna 1054, the first to ninth patches 1061 to 1069 and the thirteenth patch 1073 are electrically connected to the conductive patch 1010, and the remaining patches are not electrically connected to the conductive patch 1010. In the fourteenth state, the antenna 1054 may form a first resonance frequency corresponding to Ch. 8 and a second resonance frequency corresponding to Ch. 5. For example, referring to FIG. 10E, in the fourteenth state, the antenna 1054 may form a first resonance frequency of about 7.5 GHz and a second resonance frequency of about 6.5 GHz. In an embodiment, in the fourteenth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the fifteenth state may be the state in which, among the switches 1081 to 1096 of the antenna 1054, the first to tenth switches 1081 to 1090, the thirteenth switch 1093, and the fourteenth switch 1094 are turned on, and the remaining switches are turned off For example, the fifteenth state may be the state in which, among the patches 1061 to 1076 of the antenna 1054, the first to tenth patches 1061 to 1070, the thirteenth patch 1073, and the fourteenth patch 1074 are electrically connected to the conductive patch 1010, and the remaining patches are not electrically connected to the conductive patch 1010. In the fifteenth state, the antenna 1054 may form a first resonance frequency corresponding to Ch. 6 and a second resonance frequency corresponding to Ch. 5. For example, referring to FIG. 10E, in the fifteenth state, the antenna 1054 may form a first resonance frequency of about 7 GHz and a second resonance frequency of about 6.5 GHz. In an embodiment, in the fifteenth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic.

In Table 3, the sixteenth state may be the state in which the switches 1081 to 1096 of the antenna 1054 are all turned on. For example, the sixteenth state may be the state in which the patches 1061 to 1076 of the antenna 1054 are all electrically connected to the conductive patch 1010. In the sixteenth state, a first resonance frequency and a second resonance frequency formed by the antenna 1054 may be substantially equal to each other. For example, the antenna 1054 in the sixteenth state may form a first resonance frequency and a second resonance frequency corresponding to Ch. 5. For example, referring to FIG. 10E, in the sixteenth state, the antenna 1054 may form a first resonance frequency and a second resonance frequency of about 6.5 GHz.

In an embodiment, in the sixteenth state, the RF signal corresponding to the first resonance frequency of the antenna 1054 may have the first polarization characteristic, and the RF signal corresponding to the second resonance frequency may have the second polarization characteristic substantially orthogonal to the first polarization characteristic. In an embodiment, referring to FIG. 10F, as polarizations orthogonal to each other are combined in substantially the same frequency band, the RF signal transmitted and received by the antenna 1054 in the sixteenth state may have a circular polarization characteristic. Referring to FIG. 10E, the antenna 1054 in the sixteenth state having the circular polarization characteristic may have an increased bandwidth and radiation efficiency compared to those in the thirteenth state, the fourteenth state, and the fifteenth state.

In an embodiment, the fact that the RF signals corresponding to the first and second resonance frequencies of the antenna 1054 have different polarization characteristics may be understood through the description provided above with reference to FIGS. 6C and 7E.

In an embodiment, by controlling the switches 1081 to 1096, the UWB IC may variably control the channels and/or polarization characteristics of the RF signals transmitted and received from the antenna 1054 according to various communication environments.

A plurality of antennas 1054 according to an embodiment may be included in an antenna structure (e.g., the antenna structure 754 in FIG. 7A). In this case, the plurality of antennas 1054 may be arranged substantially the same as those illustrated in FIG. 7A.

Figure 11:
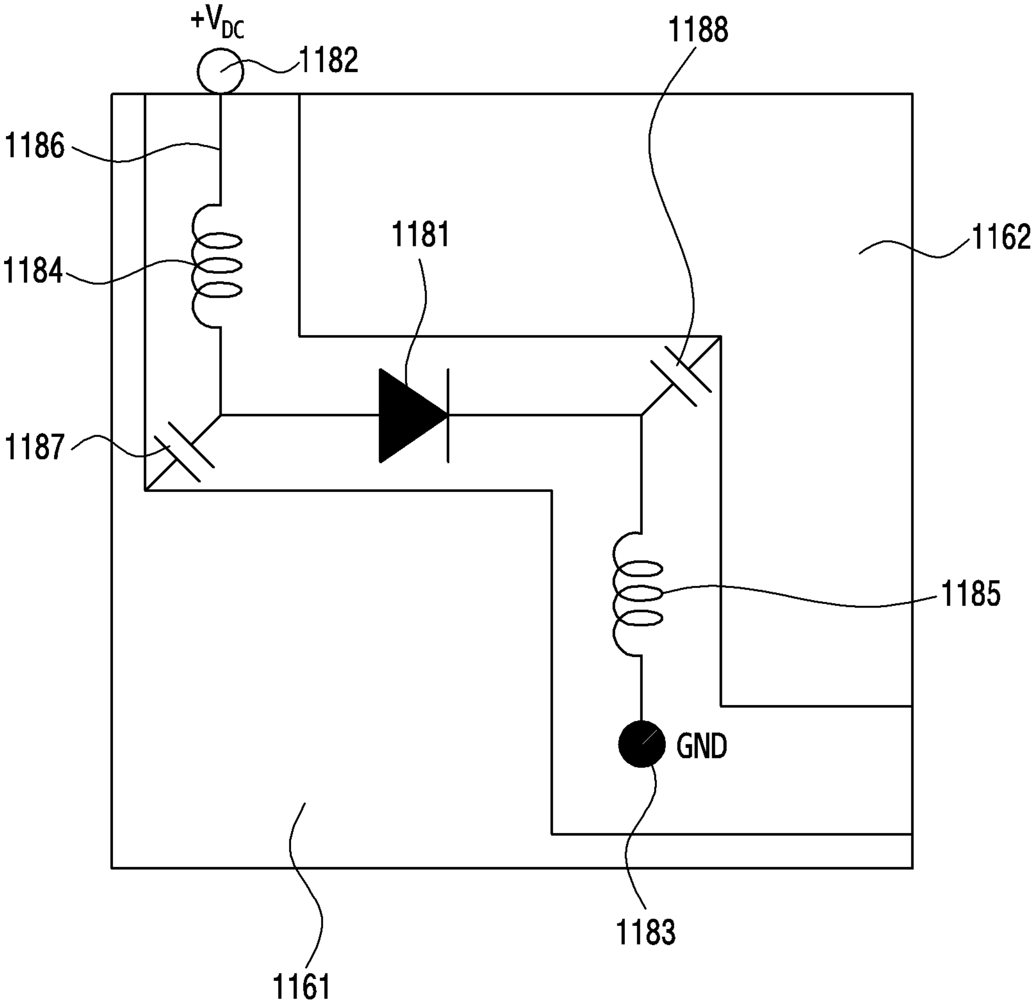
FIG. 11 illustrates a switch circuit including a PIN diode according to an embodiment.

FIG. 11 illustrates a switch circuit including a PIN diode according to an embodiment.

The description made for each of the switches with reference to FIGS. 8A, 9A, and 10A may be correspondingly applied to a description to be provided with reference to FIG. 11. For example, the PIN diode 1181, the first patch 1161, and the second patch 1162 of FIG. 11 may correspond to the first switch 881, the conductive patch 610, and the first patch 861 of FIG. 8A, respectively. As another example, the PIN diode 1181, the first patch 1161, and the second patch 1162 of FIG. 11 may correspond to the second switch 982, the conductive patch 910, and the second patch 962 of FIG. 9A, respectively. As another example, the PIN diode 1181, the first patch 1161, and the second patch 1162 of FIG. 11 may correspond to the third switch 1083, the second patch 1062, and the third patch 1063 of FIG. 10A, respectively.

Referring to FIG. 11, a transmission line 1186 may be connected to a power input terminal 1182 and a ground terminal 1183. The PIN diode 1181 may be disposed between the power input terminal 1182 and the ground terminal 1183. A first inductor 1184 may be disposed between the power input terminal 1182 and the PIN diode 1181. A second inductor 1185 may be disposed between the PIN diode 1181 and the ground terminal 1183. The first inductor 1184 and the second inductor 1185 may operate as an RF choke for blocking a frequency component such as an RF signal. The transmission line 1186 may be branched between the first inductor 1184 and the PIN diode 1181 and electrically connected to the first patch 1161. A first capacitor 1187 may be disposed between the branching point of the transmission line 1186 and the first patch 1161. The transmission line 1186 may be branched between the PIN diode 1181 and the second inductor 1185 and electrically connected to the second patch 1162. A second capacitor 1188 may be disposed between the branching point of the transmission line 1186 and the second patch 1162. The first capacitor 1187 and/or the second capacitor 1188 may block a DC voltage. The ground terminal 1183 may be connected to a ground (e.g., the ground 650 in FIG. 6A or another ground separated from the ground 650) via, for example, a conductive via that at least partially penetrates a dielectric body (e.g., the dielectric body 630 in FIG. 6A) of an antenna (e.g., the antenna 654 in FIG. 6A).

In an embodiment, a UWB IC (e.g., the UWB IC 292 in FIG. 2) may apply a DC voltage to the PIN diode 1181 via the transmission line 1186. When the DC voltage is applied, the current fed to the antenna (e.g., the second antenna 254 in FIG. 2) may flow between the first patch 1161 and the second patch 1162 via the PIN diode 1181. When the DC voltage is not applied to the PIN diode 1181, the current fed to the antenna may not pass through the PIN diode 1181.

In an embodiment, the state in which a DC voltage is applied to the PIN diode 1181 may be referred to as the state in which the switches of FIGS. 8A to 10A are turned on.

Figure 12:
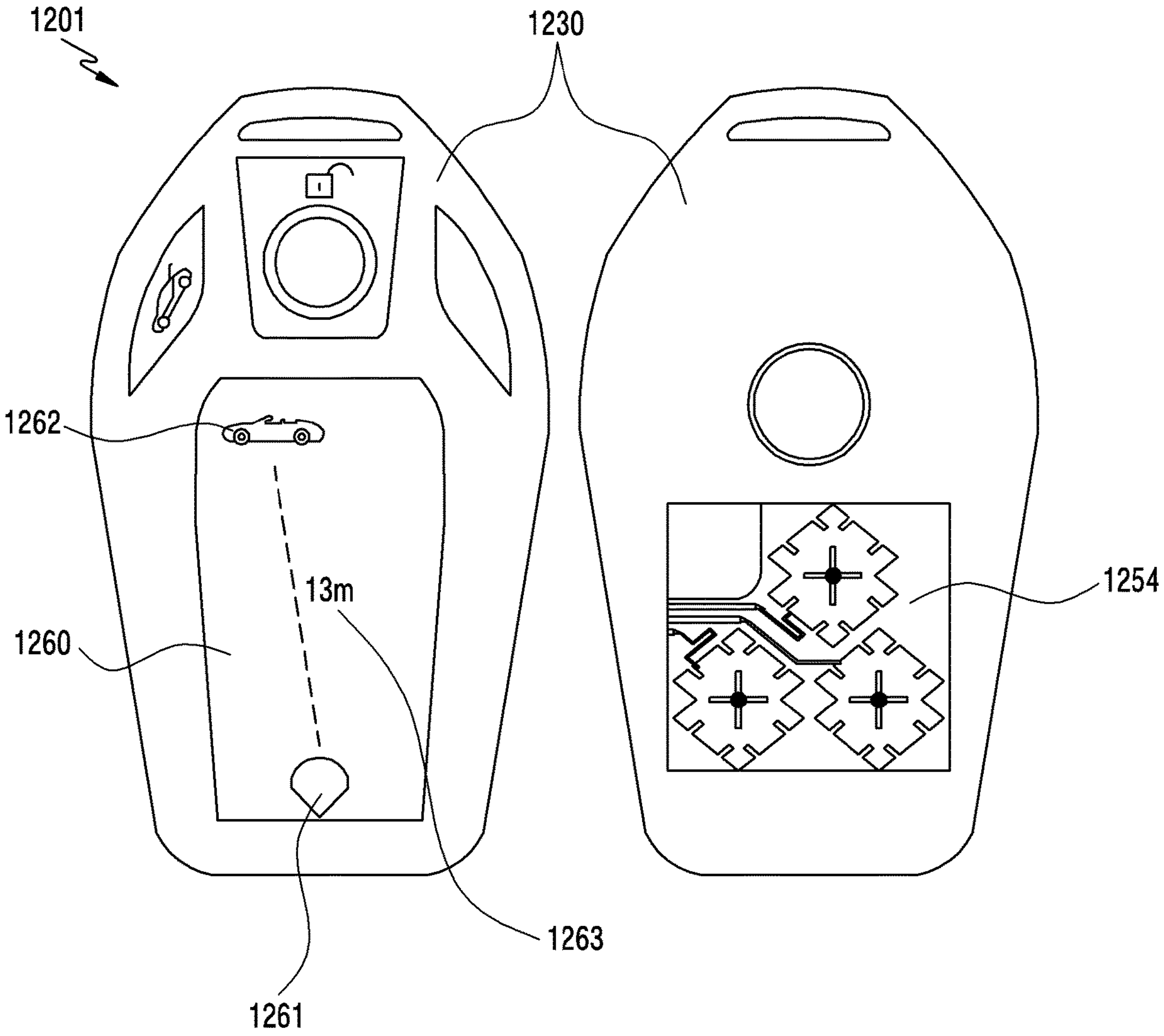
FIG. 12 illustrates the electronic device according to an embodiment.

In an embodiment, the state in which no DC voltage is applied to the PIN diode 1181 may be referred to as the state in which the switches of FIGS. 8A to 10A are turned off FIG. 12 illustrates an electronic device according to an embodiment.

Referring to FIG. 12, an electronic device 1201 according to an embodiment may include a housing 1230, a display 1260, and/or an antenna 1254. According to an embodiment, the electronic device 1201 of FIG. 12 may include at least some of the components illustrated in FIGS. 1 and 2 in addition to the illustrated components. The electronic device 1201 may be a vehicle smartkey for controlling a function such as a locked state of the vehicle, opening/closing of a door, or starting.

In an embodiment, the housing 1230 may define at least a portion of the exterior of the electronic device 1201. The housing 1230 may define an inner space of the electronic device 1201 in which various components are mounted.

In an embodiment, the display 1260 may be mounted within the housing 1230. The display 1260 may provide various items of visual information to the user. For example, the display 1260 may display a first object 1261 for indicating the current position of a user who possesses the electronic device 1201, a second object 1262 for indicating the position of an external device from the current position of the user who possesses the electronic device 1201, and/or a third object 1263 for indicating a distance between the electronic device 1201 and the external device.

In an embodiment, the antenna 1254 may be disposed in the space defined by the housing 1230. The antenna 1254 may include the second antenna 254 of FIG. 2, the antenna 654 of FIG. 6A, the antenna structure 754 of FIG. 7A, the antenna 854 of FIG. 8A, the antenna 954 of FIG. 9A, or the antenna 1054 of FIG. 10A.

Figure 13:
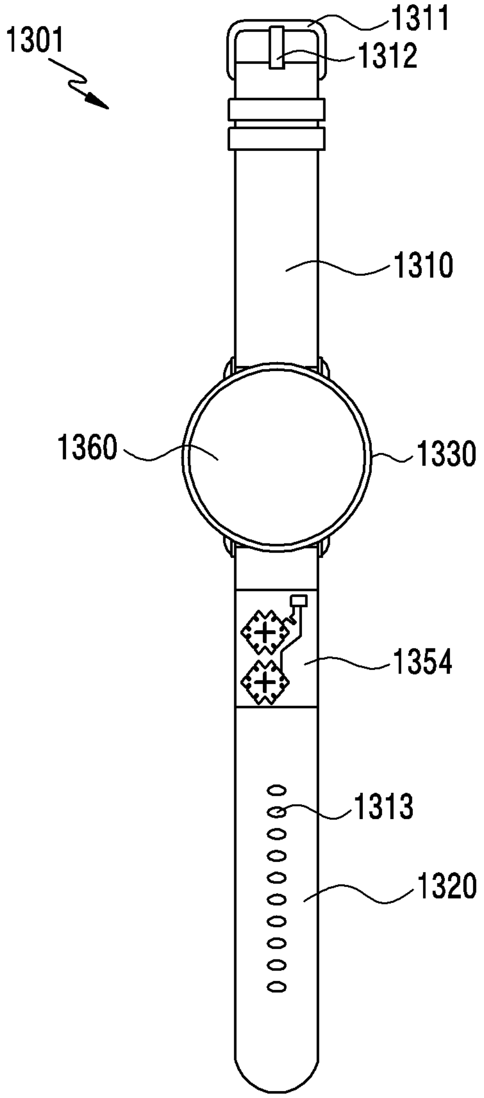
FIG. 13 illustrates an electronic device according to an embodiment.

FIG. 13 illustrates an electronic device according to an embodiment.

Figure 14:
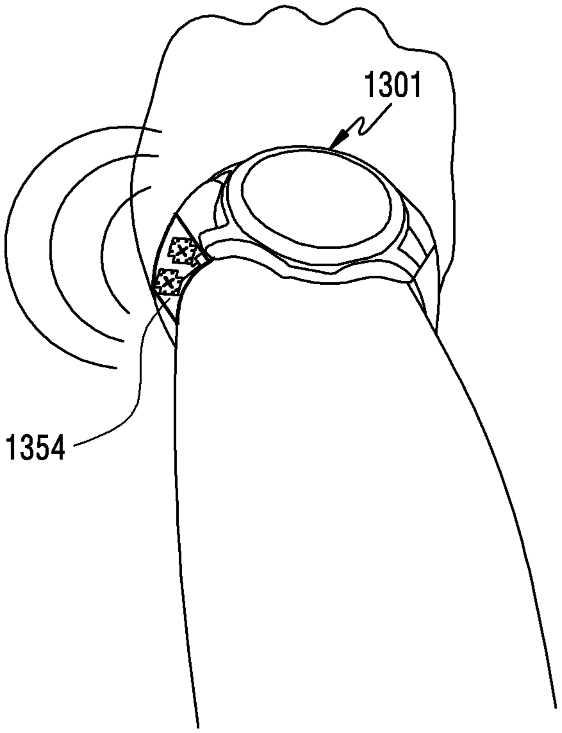
FIG. 14 illustrates the electronic device according to an embodiment.

FIG. 14 illustrates the electronic device according to an embodiment.

Referring to FIGS. 13 and 14, an electronic device 1301 according to an embodiment may include a housing 1330, a display 1360, a first binding member 1310, a second binding member 1320, and/or an antenna 1354. However, the electronic device 1301 according to an embodiment may include a component in addition to the components illustrated in FIGS. 13 and 14. For example, the electronic device 1301 according to an embodiment may include at least one of the components illustrated in FIGS. 1 and 2. For example, the electronic device 1301 of FIGS. 13 and 14 may be a wearable electronic device that is wearable on a user's body (e.g., a wrist).

In an embodiment, the first binding member 1310 and the second binding member 1320 may be connected to the housing 1330.

In an embodiment, the display 1360 may be disposed in the space defined by the housing 1330. In an embodiment, a portion of the housing 1330 overlapping the display 1360 may be formed of a substantially transparent material so that the display 1360 is visible to the user.

In an embodiment, the first binding member 1310 and the second binding member 1320 may be coupled to a portion of the housing 1330. As illustrated in FIG. 14, the first binding member 1310 and the second binding member 1320 may be configured to be detachably worn a portion of a user's body, such as a wrist. For example, the first binding member 1310 may include a guide member 1311 and a fixing member 1312, and the second binding member 1320 may include fixing holes 1313. The electronic device 1301 may be worn on a user's body by inserting the second binding member 1320 into the guide member 1311 and the fixing member 1312 into one of the fixing holes 1313. However, embodiments of the disclosure are not limited by the above-described example.

In an embodiment, the antenna 1354 may be disposed on the second binding member 1320. In another embodiment, the antenna 1354 may be disposed on the first binding member 1310 or in the space defined the housing 1330. In an embodiment, the antenna 1354 may include the second antenna 254 of FIG. 2, the antenna 654 of FIG. 6A, the antenna structure 754 of FIG. 7A, the antenna 854 of FIG. 8A, the antenna 954 of FIG. 9A, or the antenna 1054 of FIG. 10A.

Figure 15:
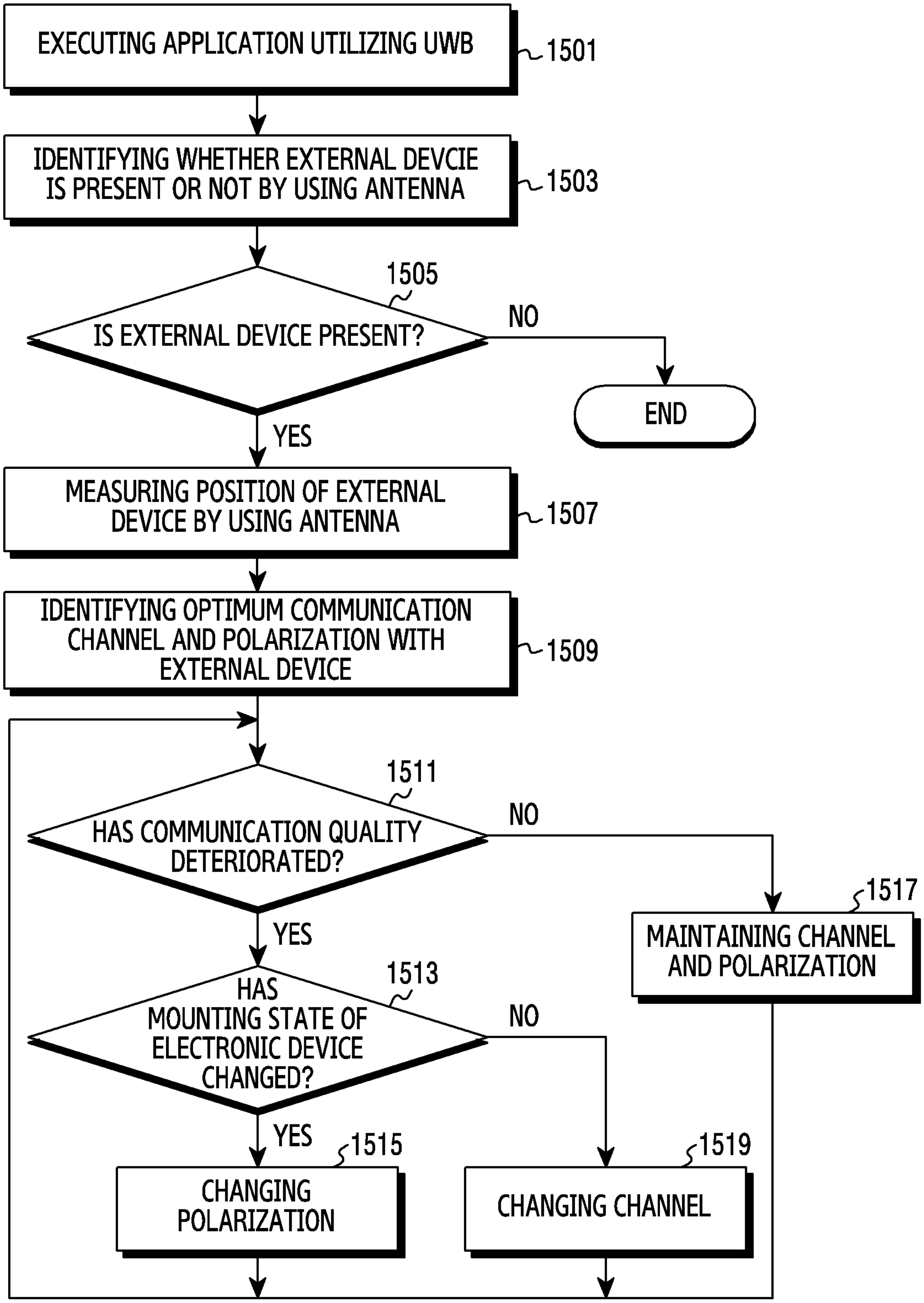
FIG. 15 is a flowchart illustrating operations of controlling, by an electronic device according to an embodiment, a channel and/or a polarization of an antenna.

FIG. 15 is a flowchart illustrating operations of controlling, by an electronic device according to an embodiment, a channel and/or a polarization of an antenna.

The operations of FIG. 15 may be performed by the electronic device 101 of FIG. 2, the electronic device 1201 of FIG. 12, or the electronic device 1301 of FIG. 13. For example, the operations of FIG. 15 may be performed by the processor 120 and/or the UWB IC 292 of the electronic device. Hereinafter, a description will be made with reference to the electronic device 101 and the processor 120 of the electronic device 101.

In operation 1501, the electronic device 101 may execute an application utilizing UWB. For example, the processor 120 of the electronic device 101 may execute an application utilizing UWB. The application utilizing UWB may include, for example, an application for detecting the position of an external device utilizing UWB communication.

In operation 1503, the electronic device 101 may identify whether an external device 104 is present or not by using the antenna 250 (e.g., UWB antenna). For example, when receiving an RF signal from an external device 104 by using the antenna 250 (e.g., UWB antenna), the processor 120 may determine that an external device 104 is present. When an RF signal is not received from an external device 104 by using the antenna 250 (e.g., UWB antenna), the processor 120 may determine that no external device 104 is present. The RF signal provided from the external device 104 may be provided in response to a signal transmitted by the electronic device 101 to the external device 104 by using the antenna 250 (e.g., UWB antenna), but is not limited thereto. For example, even if the external device 104 does not receive the signal from the electronic device 101, the external device 104 may transmit an RF signal to a free space at a predetermined interval and/or for a predetermined period of time.

In operation 1505, when the external device 104 is determined to be present, the electronic device 101 may perform operation 1507, and when not, the operation may be terminated. In another embodiment, when the external device 104 is determined not to be present, the electronic device 101 may perform operation 1503 again.

In another embodiment, operations 1503 and 1505 may be omitted. When operations 1503 and 1505 are omitted, the electronic device 101 may perform operation 1507 after performing operation 1501.

In operation 1507, the electronic device 101 may measure the position of an external device 104 by using the antenna 250 (e.g., UWB antenna). For example, the processor 120 of the electronic device 101 may determine the position of the external device 104 by using the antenna 250 (e.g., UWB antenna). As for the method of determining the position of the external device 104, the description provided with reference to FIG. 2 may be applied.

In operation 1509, the electronic device 101 may identify a communication channel and a polarization that satisfy a predetermined communication performance with the external device 104. For example, the processor 120 of the electronic device 101 may sweep a communication channel and a polarization by using the antenna 250 (e.g., UWB antenna) and acquire a parameter value related to communication performance (e.g., reception sensitivity). Based on the acquired parameter value, the processor 120 may determine a communication channel and/or a polarization that satisfy the predetermined communication performance (e.g., a communication channel and/or a polarization having the highest reception sensitivity value) based on the acquired parameter value. The processor 120 may perform wireless communication with the external device 104 by using the determined communication channel and polarization.

In another embodiment, operation 1509 may be performed before performing operation 1507. In another embodiment, operation 1509 may be performed substantially simultaneously with operation 1507.

In operation 1511, the electronic device 101 may determine whether communication quality has deteriorated. For example, the processor 120 of the electronic device 101 may detect a parameter value related to communication performance with the external device 104 (e.g., reception sensitivity) at a predetermined time interval. The parameter value may correspond to a communication channel and/or a polarization used by the electronic device 101 for wireless communication with the external device 104. In an embodiment, the processor 120 may identify whether the parameter value detected at the predetermined time interval has decreased. When detected parameter value is identified to have decreased, the processor 120 may perform operation 1513, and when not, the processor 120 may perform operation 1517.

In operation 1513, the electronic device 101 may identify whether the mounting state of the electronic device 101 is changed. For example, the processor 120 of the electronic device 101 may determine whether the mounting state of the electronic device 101 has changed based on information (or data) on the posture of the electronic device 101 provided from the sensor unit 276. The information (or data) provided from the sensor unit 276 to the processor 120 may include information related to the acceleration and/or rotated angle of the electronic device 101 about the three axes (e.g., the x axis, y axis, and z axis). In operation 1513, when the mounting state of the electronic device 101 is identified to have changed, the processor 120 may perform operation 1515, and when not, the processor 120 may perform operation 1519.

In operation 1515, the electronic device 101 may change the polarization. For example, when communication quality is identified to have deteriorated in operation 1511 and the mounting state of the electronic device 101 is identified to have changed in operation 1513, the processor 120 of the electronic device 101 may change the polarization of an RF signal transmitted and/or received via the antenna 250 (e.g., UWB antenna).

For example, referring to FIG. 9A and Table 2, the processor 120 may change the state of the antenna 954 from the second state to the third state. In the second state, an RF signal corresponding to Ch. 5 of the antenna 954 may have the first polarization characteristic, and an RF signal corresponding to Ch. 9 may have the second polarization characteristic orthogonal to the first polarization characteristic. In the third state, an RF signal corresponding to Ch. 5 of the antenna 954 may have the second polarization characteristic, and an RF signal corresponding to Ch. 9 may have the first polarization characteristic.

As another example, referring to FIG. 10A and Table 3, the processor 120 may change the state of the antenna 1054 from the second state to the fifth state. In the second state, an RF signal corresponding to Ch. 8 of the antenna 1054 may have the first polarization characteristic, and an RF signal corresponding to Ch. 9 may have the second polarization characteristic orthogonal to the first polarization characteristic. In the fifth state, an RF signal corresponding to Ch. 8 of the antenna 1054 may have the second polarization characteristic, and an RF signal corresponding to Ch. 9 may have the first polarization characteristic.

As another example, referring to FIG. 10A and Table 3, the processor 120 of the electronic device 101 may change the state of the antenna 1054 from the second state to the second state. In the second state, an RF signal corresponding to Ch. 9 of the antenna 1054 may have the second polarization characteristic as a linear polarization. In the first state, an RF signal corresponding to Ch. 9 of the antenna 1054 may have a circular polarization characteristic. In operation 1515, an example in which the electronic device 101 changes the polarization is not limited to the above-described example. After performing operation 1515, the electronic device 101 may perform operation 1511.

In operation 1519, the electronic device 101 may change the channel. For example, communication quality is identified to have deteriorated in operation 1511 and the mounting state of the electronic device 101 is identified not to have changed in operation 1513, the processor 120 of the electronic device 101 may change the communication channel of the antenna 250 (e.g., UWB antenna).

As another example, referring to FIG. 8A and Table 1, the processor 120 may change the state of the antenna 854 from the second state to the fifth state. In the first state, an RF signal corresponding to the first resonance frequency of the antenna 854 may correspond to Ch. 5, and an RF signal corresponding to the second resonance frequency may correspond to Ch. 6. In the second state, an RF signal corresponding to the first resonance frequency of the antenna 854 may correspond to Ch. 5, and an RF signal corresponding to the second resonance frequency may correspond to Ch. 8.

As another example, referring to FIG. 9A and Table 2, the processor 120 may change the state of the antenna 954 from the first state to the fourth state. In the first state, the RF signal transmitted and/or received by the antenna 954 may correspond to Ch. 9. In the fourth state, the RF signal transmitted and/or received by the antenna 954 may correspond to Ch. 5.

As another example, referring to FIG. 10A and Table 3, the processor 120 may change the state of the antenna 1054 from the second state to the twelfth state. In the second state, the RF signal transmitted and/or received by the antenna 1054 may correspond to Ch. 8 and Ch. 9. In the twelfth state, the RF signal transmitted and/or received by the antenna 1054 may correspond to Ch. 5 and Ch. 6.

In operation 1519, an example in which the electronic device 101 changes the channel is not limited to the above-described example. After performing operation 1519, the electronic device 101 may perform operation 1511.

In operation 1517, the electronic device 101 may maintain the channel and the polarization. For example, when communication quality is identified not to have deteriorated in operation 1511, the processor 120 may maintain the channel and polarization communication by using the antenna 250 (e.g., UWB antenna). After performing operation 1517, the electronic device 101 may perform operation 1511.

An electronic device (e.g., the electronic device 101 of FIG. 5) according to an embodiment may include: a first antenna (e.g., the second antenna 254 of FIG. 5); and at least one processor (e.g., the processor 120 of FIG. 1 and/or the UWB IC 292 of FIG. 2) operatively coupled to the first antenna. The first antenna may include: a first conductive patch disposed on a first layer (e.g., the conductive patch 610 of FIG. 6A or the first conductive patch 710-1 of FIG. 7A) disposed on a first layer; a first transmission line (e.g., the transmission line 640 of FIG. 6F or the first transmission line 740-1 of FIG. 7A) disposed on the first layer and electrically connected to a point of the first conductive patch; a ground (e.g., the ground 650 of FIG. 6A) disposed on a second layer; and a dielectric body (e.g., the dielectric 630 of FIG. 6A) disposed on a third layer between the first layer and the second layer. The first conductive patch may have a shape obtained by removing, from a rectangle having a first size, a first area (e.g., the first area 621 of FIG. 6A) including a first corner (e.g., the first corner 611 of FIG. 6A) and having a second size smaller than the first size and a second area (e.g., the second area 622 of FIG. 6A) including a second corner (e.g., the second corner 612 of FIG. 6A) disposed in a diagonal direction relative to the first corner and having the second size. The at least one processor may be configured to transmit and/or receive at least one of a first radio frequency (RF) signal of a first frequency band having a first polarization characteristic and a second RF signal of a second frequency band having a second polarization characteristic distinct from the first polarization characteristic by feeding power to the first conductive patch via the first transmission line.

In an embodiment, the first conductive patch may include: a first slot (e.g., the first slot 761 of FIG. 7B) provided in an area including the center of the first conductive patch; and a second slot (e.g., the second slot 762 and/or the third slot 763 of FIG. 7B) provided at a point on an edge of the first conductive patch and extending to the inner side of the first conductive patch in a direction perpendicular to the edge.

The electronic device according to an embodiment may further include: a second conductive patch (e.g., the second conductive patch 710-2 of FIG. 7A) disposed on the first layer; a second transmission line (e.g., the second transmission line 740-2 of FIG. 7A) disposed on the first layer and electrically connected to a point of the second conductive patch; a third conductive patch (e.g., the third conductive patch 710-3 of FIG. 7A) disposed on the first layer; and a third transmission line (e.g., the third transmission line 740-3 of FIG. 7A) disposed on the first layer and electrically connected to a point of the third conductive patch. The second conductive patch and the third conductive patch may have a shape equal to that of the first conductive patch, and the at least one processor may be configured to transmit and/or receive at least one of the first RF signal and the second RF signal by feeding power to the second conductive patch via the second transmission line and feeding power to the third conductive patch via the third transmission line.

In an embodiment, the first conductive patch, the second conductive patch, and the third conductive patch may be spaced apart from each other by a predetermined distance, and the first conductive patch, the second conductive patch, and the third conductive patch may be disposed such that a line segment (e.g., the line segment D1 of FIG. 7A) interconnecting the centers of the first conductive patch and the second conductive patch and a line segment (e.g., the line segment D2 of FIG. 7A) interconnecting the centers of the second conductive patch and the third conductive patch are not parallel to each other.

In an embodiment, the first conductive patch and the second conductive patch may be disposed to face each other in the areas from which the corners are removed.

In an embodiment, the first polarization characteristic and the second polarization characteristic may be substantially orthogonal to each other, and the first frequency band and the second frequency band may be different from each other.

In an embodiment, The first antenna may include: a first patch (e.g., the first patch 861 of FIG. 8A) disposed in the first area; a first switch (e.g., the first switch 881 of FIG. 8A) disposed in an electrical path between the first conductive patch and the first patch in the first area, and configured to selectively electrically interconnect the first conductive patch and the first patch; a second patch (e.g., the second patch 862 of FIG. 8A) disposed in the first area; a second switch (e.g., the second switch 882 of FIG. 8A) disposed in an electrical path between the first patch and the second patch in the first area, and configured to selectively electrically interconnect the first patch and the second patch; a third patch (e.g., the third patch 863 of FIG. 8A) disposed in the second area; a third switch (e.g., the third switch 883 of FIG. 8A) disposed in an electrical path between the first conductive patch and the third patch in the second area, and configured to selectively electrically interconnect the first conductive patch and the third patch; a fourth patch (e.g., the fourth patch 864 of FIG. 8A) disposed in the second area; and a fourth switch (e.g., the fourth switch 884 of FIG. 8A) disposed in an electrical path between the third patch and the fourth patch in the second area, and configured to selectively electrically interconnect the third patch and the fourth patch. The first switch, the first patch, the second switch, the second patch, the third switch, the third patch, the fourth switch, and the fourth patch may be located on a diagonal line (e.g., the first diagonal line DL1 of FIG. 8A) interconnecting the first corner and the second corner.

In an embodiment, the at least one processor may be configured to: transmit and/or receive the first RF signal of the first frequency band the first RF signal of the first frequency band having the first polarization characteristic and the second RF signal of the second frequency band having the second polarization characteristic substantially orthogonal to the polarization characteristic and being higher than the first frequency band, in a first state (e.g., the third state in Table 1) in which the first switch, the second switch, the third switch, and the fourth switch are all turned off; transmit and/or receive the first RF signal and a third RF signal of a third frequency band having the second polarization characteristic and being higher than the second frequency band, in a second state (e.g., the second state in Table 1) in which the first switch and the third switch are turned on and the second switch and the fourth switch are turned off; and transmit and/or receive the first RF signal and a fourth RF signal of a fourth frequency band having the second polarization characteristic and being higher than the third frequency band, in a third state (e.g., the first state in Table 1) in which the first switch, the second switch, and the third switch are turned off.

In an embodiment, at least one of the first switch, the second switch, the third switch, and the fourth switch may include a PIN diode.

In an embodiment, the first conductive patch may have a shape obtained by further removing, from the rectangle, a third area (e.g., the third area 923 in FIG. 9A) including a third corner (e.g., the third corner 913 in FIG. 9A) and having the second size, and a fourth area (e.g., the fourth area 924 in FIG. 9A) including a fourth corner (e.g., the fourth corner 914 in FIG. 9A) located in a diagonal direction relative to the third corner and having the second size. The first antenna may include: a first patch (e.g., the first patch 961 in FIG. 9A) disposed in the first area; a first switch (e.g., the first switch 981 in FIG. 9A) disposed in an electrical path between the first conductive patch and the first patch in the first area, and configured to selectively electrically interconnect the first conductive patch and the first patch; a second patch (e.g., the second patch 962 in FIG. 9A) disposed in the second area; a second switch (e.g., the second switch 982 in FIG. 9A) disposed in an electrical path between the first conductive patch and the second patch in the second area, and configured to selectively electrically interconnect the first conductive patch and the second patch; a third patch (e.g., the third patch 963 in FIG. 9A) disposed in the third area; a third switch (e.g., the third switch 983 in FIG. 9A) disposed in an electrical path between the first conductive patch and the third patch in the third area, and configured to selectively electrically interconnect the first conductive patch and the third patch; a fourth patch (e.g., the fourth patch 964 in FIG. 9A) disposed in the fourth area; and a fourth switch (e.g., the fourth switch 984 in FIG. 9A) disposed in an electrical path between the first conductive patch and the fourth patch in the fourth area, and configured to selectively electrically interconnect the first conductive patch and the fourth patch. The third switch, the third patch, the fourth switch, and the fourth patch may be located on a first diagonal line (e.g., the first diagonal line DL1 in FIG. 9A) interconnecting the third corner and the fourth corner, and the first switch, the first patch, the second switch, and the second patch may be located on a second diagonal line (e.g., the second diagonal line DL2 in FIG. 9A) interconnecting the first corner and the second corner.

In an embodiment, the at least one processor may be configured to transmit and/or receive a third RF signal of a third frequency band having a third polarization characteristic distinct from the first polarization characteristic and the second polarization characteristic, in a first state (e.g., the first state in Table 2) in which the first switch, the second switch, the third switch, and the fourth switch are turned off, and the third polarization characteristic of the third RF signal may have a circular polarization characteristic.

In an embodiment, the at least one processor may be configured to transmit and/or receive a fourth RF signal of a fourth frequency band having the third polarization characteristic, in a fourth state (e.g., the fourth state in Table 2) in which the first switch, the second switch, the third switch, and the fourth switch are turned on, and the fourth frequency band of the fourth RF signal may be lower than the third frequency band of the third RF signal.

In an embodiment, the at least one processor may be configured to transmit and/or receive the first RF signal and the second RF signal in a second state (e.g., the second state in Table 2) in which the first switch and the second switch are turned off and the third switch and the fourth switch are turned on, the second polarization characteristic of the second RF signal may be substantially orthogonal to the first polarization characteristic of the first RF signal, and the second frequency band of the second RF signal may be higher than the first frequency band of the first RF signal.

In an embodiment, the at least one processor may be configured to transmit and/or receive the first RF signal and the second RF signal in a third state (e.g., the third state in Table 2) in which the first switch and the second switch are turned on and the third switch and the fourth switch are turned off, the second polarization characteristic of the second RF signal may be substantially orthogonal to the first polarization characteristic of the first RF signal, and the second frequency band of the second RF signal may be lower than the first frequency band of the first RF signal.

In an embodiment, the first conductive patch may have a shape obtained by further removing, from the rectangle, a third area (e.g., the third area 1023 in FIG. 10A) including a third corner (e.g., the third corner 1013 in FIG. 10A) and having the second size, and a fourth area (e.g., the fourth area 1024 in FIG. 10A) including a fourth corner (e.g., the fourth corner 1014 in FIG. 10A) located in a diagonal direction relative to the third corner and having the second size. The first antenna may include: a first patch (e.g., the first patch 1061 in FIG. 10A) disposed in the first area; a first switch (e.g., the first switch 1081 in FIG. 10A) disposed in an electrical path between the first conductive patch and the first patch in the first area, and configured to selectively electrically interconnect the first conductive patch and the first patch; a second patch (e.g., the second patch 1062 of FIG. 10A) disposed in the first area; a second switch (e.g., the second switch 1082 of FIG. 10A) disposed in an electrical path between the first patch and the second patch in the first area, and configured to selectively electrically interconnect the first patch and the second patch; a third patch (e.g., the third patch 1063 in FIG. 10A) disposed in the first area in a direction from the second patch toward the third corner; a third switch (e.g., the third switch 1083 in FIG. 10A) disposed in an electrical path between the second patch and the third patch in the first area, and configured to selectively electrically interconnect the second patch and the third patch; a fourth patch (e.g., the fourth patch 1064 in FIG. 10A) disposed in the first area in a direction from the second patch toward the fourth corner; a fourth switch (e.g., the fourth switch 1084 in FIG. 10A) disposed in an electrical path between the second patch and the fourth patch in the first area, and configured to selectively electrically interconnect the second patch and the fourth patch; a fifth patch (e.g., the fifth patch 1065 of FIG. 10A) disposed in the second area; a fifth switch (e.g., the fifth switch 1085 in FIG. 10A) disposed in an electrical path between the first conductive patch and the fifth patch in the second area, and configured to selectively electrically interconnect the first conductive patch and the fifth patch; a sixth patch (e.g., the sixth patch 1066 in FIG. 10A) disposed in the second area; a sixth switch (e.g., the sixth switch 1086 in FIG. 10A) disposed in an electrical path between the fifth patch and the sixth patch in the second area, and configured to selectively electrically interconnect the fifth patch and the sixth patch; a seventh patch (e.g., the seventh patch 1067 in FIG. 10A) disposed in the second area in a direction from the sixth patch toward the fourth corner; a seventh switch (e.g., the seventh switch 1087 in FIG. 10A) disposed in an electrical path between the sixth patch and the seventh patch in the second area, and configured to selectively electrically interconnect the sixth patch and the seventh patch; an eighth patch (e.g., the eighth patch 1068 in FIG. 10A) disposed in the second area in a direction from the sixth patch toward the third corner; an eighth switch (e.g., the eighth switch 1088 in FIG. 10A) disposed in an electrical path between the sixth patch and the eighth patch in the second area, and configured to selectively electrically interconnect the sixth patch and the eighth patch; a ninth patch (e.g., the ninth patch 1069 in FIG. 10A) disposed in the third area; a ninth switch (e.g., the ninth switch 1089 in FIG. 10A) disposed in an electrical path between the first conductive patch and the ninth patch in the third area, and configured to selectively electrically interconnect the first conductive patch and the ninth patch; a tenth patch (e.g., the tenth patch 1070 in FIG. 10A) disposed in the third area; a tenth switch (e.g., the tenth switch 1090 in FIG. 10A) disposed in an electrical path between the ninth patch and the tenth patch in the third area, and configured to selectively electrically interconnect the ninth patch and the tenth patch; an eleventh patch (e.g., the eleventh patch 1071 in FIG. 10A) disposed in the third area in a direction from the tenth patch toward the first corner; an eleventh switch (e.g., the eleventh switch 1091 in FIG. 10A) disposed in an electrical path between the tenth patch and the eleventh patch in the third area, and configured to selectively electrically interconnect the tenth patch and the eleventh patch; a twelfth patch (e.g., the twelfth patch 1072 in FIG. 10A) disposed in the third area in a direction from the tenth patch toward the second corner; a twelfth switch (e.g., the twelfth switch 1092 in FIG. 10A) disposed in an electrical path between the tenth patch and the twelfth patch in the third area, and configured to selectively electrically interconnect the tenth patch and the twelfth patch; a thirteenth patch (e.g., the thirteenth patch 1073 in FIG. 10A) disposed in the fourth area; a thirteenth switch (e.g., the thirteenth switch 1093 in FIG. 10A) disposed in an electrical path between the first conductive patch and the thirteenth patch in the fourth area, and configured to selectively electrically interconnect the first conductive patch and the thirteenth patch; a fourteenth patch (e.g., the fourteenth patch 1074 in FIG. 10A) disposed in the fourth area; a fourteenth switch (e.g., the fourteenth switch 1094 in FIG. 10A) disposed in an electrical path between the thirteenth patch and the fourteenth patch in the fourth area, and configured to selectively electrically interconnect the thirteenth patch and the fourteenth patch; a fifteenth patch (e.g., the fifteenth patch 1075 in FIG. 10A) disposed in the fourth area in a direction from the fourteenth patch toward the second corner; a fifteenth switch (e.g., the fifteenth switch 1095 in FIG. 10A) disposed in an electrical path between the fourteenth patch and the fifteenth patch in the fourth area, and configured to selectively electrically interconnect the fourteenth patch and the fifteenth patch; a sixteenth patch (e.g., the sixteenth patch 1076 in FIG. 10A) disposed in the fourth area in a direction from the fourteenth patch toward the first corner; a sixteenth switch (e.g., the sixteenth switch 1096 in FIG. 10A) disposed in an electrical path between the fourteenth patch and the sixteenth patch in the fourth area, and configured to selectively electrically interconnect the fourteenth patch and the sixteenth patch. The ninth switch, the ninth patch, the tenth switch, the tenth patch, the thirteenth switch, the thirteenth patch, the fourteenth switch, and the fourteenth patch are located on a first diagonal line (e.g., the first diagonal line DL1 in FIG. 10A) interconnecting the third corner and the fourth corner, and the first switch, the first patch, the second switch, the second patch, the fifth switch, the fifth patch, the sixth switch, and the sixth patch may be located on a second diagonal line (e.g., the second diagonal line DL2 in FIG. 10A) interconnecting the first corner and the second corner.

In an embodiment, the at least one processor may be configured to: execute an application related to UWB communication (e.g., operation 1501 in FIG. 15); identify, based on at least one of the first RF signal and the second RF signal received from an external device by using the first antenna, a round trip time (RTT) and an angle of arrival (AOA) of the at least one signal; and determine, based on the identified RTT and AOA, the position of the external device (e.g., operation 1507 in FIG. 15).

In an embodiment, the at least one processor may be configured to: sweep channels and polarizations of UWB communication (e.g., operation 1509 in FIG. 15) by using the first antenna, and acquire parameter values related to communication performance and corresponding to the swept channels and polarizations, respectively; determine a channel and polarization of at least one of the first RF signal and the second RF signal received via the first antenna based on the acquired parameter values (e.g., operation 1509 in FIG. 15); identify whether communication performance with the external device has deteriorated based on the parameter values related to communication performance and corresponding to the determined channels and polarizations (e.g., operation 1511 in FIG. 15); change, when the communication performance with the external device is identified to have deteriorated, at least one of the channel and polarization of at least one of the first RF signal and the second RF signal (e.g., operation 1515 and/or operation 1519 in FIG. 15), and maintain, when the communication performance with the external device is identified not to have deteriorated, the determined channel and polarization of the at least one of the first RF signal and the second RF signal (e.g., operation 1517 of FIG. 15).

In an embodiment, the electronic device may include at least one sensor (e.g., the sensor unit 276 of FIG. 2) electrically connected to the at least one processor. The at least one processor may be configured to: identify, when the communication performance with the external device is identified to have deteriorated, whether the posture of the electronic device has changed by using the at least one sensor (e.g., operation 1513 of FIG. 15); change, when the posture of the electronic device is identified to have changed, the polarization of the at least one signal (e.g., operation 1515 of FIG. 15); and change, when the posture of the electronic device is identified not to have changed, the channel of the at least one signal (e.g., operation 1519 of FIG. 15).

In an embodiment, the electronic device may include a housing and a second antenna that define at least a portion of the side surface of the electronic device, the housing may include a conductive portion at least partly formed of a conductive material, and the second antenna may include the conductive portion as a radiation element of the second antenna.

In an embodiment, the first transmission line may include a quarter wavelength impedance converter (e.g., the quarter wavelength impedance transformer 742 of FIG. 7A) having a meandering shape bent in at least one portion.

According to one or more embodiments, by configuring the antenna of the electronic device by using two layers, it is possible to reduce the thickness of the antenna and to improve the degree of freedom in design for disposing the antenna inside the electronic device.

According to one or more embodiments, by configuring the antenna of the electronic device by using two layers, it is possible to simplify the processes of designing and manufacturing the antenna and to reduce manufacturing costs.

According to one or more embodiments, the electronic device is capable of adaptively performing communication with an external device for various communication environments by changing a UWB communication channel and/or polarization depending the posture and communication quality of the electronic device.

Advantageous effects obtainable from the disclosure may not be limited to the above mentioned effects, and other effects which are not mentioned may be clearly understood, through the following descriptions, by those skilled in the art to which the disclosure pertains.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof

What is claimed is:

1. An electronic device comprising:

a first conductive patch having a shape in which a first region and a second region are removed from a rectangle patch having a first size, wherein the first region includes a first corner of the rectangle patch and has a second size smaller than the first size, and the second region includes a second corner of the rectangle patch and has the second size, and wherein each of the first region and the second region has a shape of a rectangle;

a first transmission line comprising an impedance transform line for the first conductive patch, and electrically connected with a first point of the first conductive patch; and a printed circuit board (PCB) comprising:

a dielectric corresponding to a first layer of the PCB and including a first surface on which the first conductive patch and the impedance transform line are disposed, and a ground corresponding to a second layer of the PCB, wherein the first conductive patch comprises a slit extending to the first point of the first conductive patch, and a portion of the impedance transform line is disposed in the slit, wherein the first conductive patch is fed power via the first transmission line including the impedance transform line such that at least one of a first radio frequency (RF) signal of a first frequency band or a second RF signal of a second frequency band is transmitted and/or received by the first conductive patch, and wherein the first RF signal has a first polarization and the second RF signal has a second polarization different from the first polarization.

2. The electronic device of claim 1, wherein the first conductive patch comprises:

a first slot extending through a center of the first conductive patch; and a second slot extending from an edge of the first conductive patch to an inner portion of the first conductive patch in a direction perpendicular to the edge.

3. The electronic device of claim 2, further comprising:

a second conductive patch disposed on the first surface;

a second transmission line disposed on the first surface and electrically connected to the second conductive patch;

a third conductive patch disposed on the first surface; and a third transmission line disposed on the first surface and electrically connected to a point of the third conductive patch, wherein each of the second conductive patch and the third conductive patch has a shape that is the same as the shape of the first conductive patch, and wherein the second conductive patch is fed power via the second transmission line and the third conductive patch is fed power via the third transmission line such that at least one of the first RF signal or the second RF signal is transmitted and/or received by each of the second conductive patch and the third conductive patch.

4. The electronic device of claim 3, wherein the first conductive patch, the second conductive patch, and the third conductive patch are spaced apart from each other, and wherein the first conductive patch, the second conductive patch, and the third conductive patch are disposed such that a line interconnecting the center of the first conductive patch and a center of the second conductive patch and a line interconnecting the center of the second conductive patch and a center of the third conductive patch are not parallel to each other.

5. The electronic device of claim 4, wherein the second conductive patch has a shape in which a third region and a fourth region are removed from the rectangle patch, wherein the third region includes a third corner of the rectangle patch and the fourth region includes a fourth corner of the rectangle patch, and wherein the first conductive patch and the second conductive patch are disposed such that the second region faces the third region.

6. The electronic device of claim 1, wherein a direction of the first polarization and a direction of the second polarization are orthogonal to each other, and wherein the first frequency band and the second frequency band are different from each other.

7. The electronic device of claim 1, wherein the shape of the first conductive patch is the rectangle patch in which the first region, the second region, a third region including a third corner of the rectangle patch, and a fourth region including a fourth corner of the rectangle patch are removed, wherein the first region, the second region, the third region, and the fourth region have a same size, and the fourth region is located in a diagonal direction relative to the third region, wherein the electronic device further comprises:

a first patch disposed in the first region;

a first switch disposed in an electrical path between the first conductive patch and the first patch in the first region, and configured to selectively electrically connect the first conductive patch and the first patch;

a second patch disposed in the second region;

a second switch disposed in an electrical path between the first conductive patch and the second patch in the second region, and configured to selectively electrically connect the first conductive patch and the second patch;

a third patch disposed in the third region;

a third switch disposed in an electrical path between the first conductive patch and the third patch in the third region, and configured to selectively electrically connect the first conductive patch and the third patch;

a fourth patch disposed in the fourth region; and a fourth switch disposed in an electrical path between the first conductive patch and the fourth patch in the fourth region, and configured to selectively electrically connect the first conductive patch and the fourth patch, wherein the third switch, the third patch, the fourth switch, and the fourth patch are located on a first diagonal line interconnecting the third corner and the fourth corner, and wherein the first switch, the first patch, the second switch, and the second patch are located on a second diagonal line interconnecting the first corner and the second corner.

8. The electronic device of claim 7, further comprising at least one processor, wherein the at least one processor is configured to transmit and/or receive a third RF signal of a third frequency band, in a first state in which the first switch, the second switch, the third switch, and the fourth switch are turned off, wherein the third RF signal has a third polarization different from the first polarization and the second polarization, and wherein the third polarization of the third RF signal is a circular polarization.

9. The electronic device of claim 8, wherein the at least one processor is further configured to transmit and/or receive a fourth RF signal of a fourth frequency band, in a fourth state in which the first switch, the second switch, the third switch, and the fourth switch are turned on, and wherein the fourth frequency band is lower than the third frequency band.

10. The electronic device of claim 7, further comprising at least one processor, wherein the at least one processor is configured to transmit and/or receive the first RF signal and the second RF signal in a second state in which the first switch and the second switch are turned off and the third switch and the fourth switch are turned on, wherein a direction of the second polarization of the second RF signal is orthogonal to a direction of the first polarization of the first RF signal, and wherein the second frequency band of the second RF signal is higher than the first frequency band of the first RF signal.

11. The electronic device of claim 7, further comprising at least one processor, wherein the at least one processor is configured to transmit and/or receive the first RF signal and the second RF signal in a third state in which the first switch and the second switch are turned on and the third switch and the fourth switch are turned off, wherein a direction of the second polarization of the second RF signal is orthogonal to a direction of the first polarization of the first RF signal, and wherein the second frequency band of the second RF signal is lower than the first frequency band of the first RF signal.

12. An electronic device comprising:

a first conductive patch having a shape in which a first region and a second region are removed from a rectangle patch having a first size, wherein the first region includes a first corner of the rectangle patch and has a second size smaller than the first size, and the second region includes a second corner of the rectangle patch and has the second size;

a first transmission line comprising an impedance transform line for the first conductive patch, and electrically connected with a first point of the first conductive patch; and a printed circuit board (PCB) comprising:

a dielectric corresponding to a first layer of the PCB and including a first surface on which the first conductive patch and the impedance transform line are disposed, and a ground corresponding to a second layer of the PCB, wherein the first conductive patch is fed power via the first transmission line including the impedance transform line such that at least one of a first radio frequency (RF) signal of a first frequency band or a second RF signal of a second frequency band is transmitted and/or received by the first conductive patch, wherein the first RF signal has a first polarization and the second RF signal has a second polarization different from the first polarization, wherein the electronic device further comprises:

a first patch disposed in the first region;

a first switch disposed in an electrical path between the first conductive patch and the first patch in the first region, and configured to selectively electrically connect the first conductive patch and the first patch;

a second patch disposed in the first region;

a second switch disposed in an electrical path between the first patch and the second patch in the first region, and configured to selectively electrically connect the first patch and the second patch;

a third patch disposed in the second region;

a third switch disposed in an electrical path between the first conductive patch and the third patch in the second region, and configured to selectively electrically connect the first conductive patch and the third patch;

a fourth patch disposed in the second region; and a fourth switch disposed in an electrical path between the third patch and the fourth patch in the second region, and configured to selectively electrically connect the third patch and the fourth patch, and wherein the first switch, the first patch, the second switch, the second patch, the third switch, the third patch, the fourth switch, and the fourth patch are located on a diagonal line interconnecting the first corner and the second corner.

13. The electronic device of claim 12, further comprising at least one processor, wherein the at least one processor is further configured to:

transmit and/or receive the first RF signal having the first polarization and the second RF signal having the second polarization orthogonal to the first polarization, in a first state in which the first switch, the second switch, the third switch, and the fourth switch are all turned off, transmit and/or receive the first RF signal and a third RF signal of a third frequency band higher than the second frequency band, in a second state in which the first switch and the third switch are turned on and the second switch and the fourth switch are turned off, and transmit and/or receive the first RF signal and a fourth RF signal of a fourth frequency band higher than the third frequency band, in a third state in which the first switch, the second switch, and the third switch are turned off, and wherein the second frequency band is higher than the first frequency band.

14. The electronic device of claim 12, wherein at least one of the first switch, the second switch, the third switch, and the fourth switch comprises a PIN diode.

15. An electronic device comprising:

a first conductive patch having a shape in which a first region and a second region are removed from a rectangle patch having a first size, wherein the first region includes a first corner of the rectangle patch and has a second size smaller than the first size, and the second region includes a second corner of the rectangle patch and has the second size;

a first transmission line comprising an impedance transform line for the first conductive patch, and electrically connected with a first point of the first conductive patch; and a printed circuit board (PCB) comprising:

a dielectric corresponding to a first layer of the PCB and including a first surface on which the first conductive patch and the impedance transform line are disposed, and a ground corresponding to a second layer of the PCB, wherein the first conductive patch is fed power via the first transmission line including the impedance transform line such that at least one of a first radio frequency (RF) signal of a first frequency band or a second RF signal of a second frequency band is transmitted and/or received by the first conductive patch, wherein the first RF signal has a first polarization and the second RF signal has a second polarization different from the first polarization, wherein the shape of the first conductive patch is the rectangle patch in which the first region, the second region, a third region including a third corner of the rectangle patch, and a fourth region including a fourth corner of the rectangle patch are removed, wherein the first region, the second region, the third region, and the fourth region have a same size, and the fourth region is located in a diagonal direction relative to the third region, wherein the electronic device further comprises:

a first patch disposed in the first region;

a first switch disposed in an electrical path between the first conductive patch and the first patch in the first region, and configured to selectively electrically connect the first conductive patch and the first patch;

a second patch disposed in the first region;

a second switch disposed in an electrical path between the first patch and the second patch in the first region, and configured to selectively electrically connect the first patch and the second patch;

a third patch disposed in the first region in a direction from the second patch toward the third corner;

a third switch disposed in an electrical path between the second patch and the third patch in the first region, and configured to selectively electrically connect the second patch and the third patch;

a fourth patch disposed in the first region in a direction from the second patch toward the fourth corner;

a fourth switch disposed in an electrical path between the second patch and the fourth patch in the first region, and configured to selectively electrically connect the second patch and the fourth patch;

a fifth patch disposed in the second region;

a fifth switch disposed in an electrical path between the first conductive patch and the fifth patch in the second region, and configured to selectively electrically connect the first conductive patch and the fifth patch;

a sixth patch disposed in the second region;

a sixth switch disposed in an electrical path between the fifth patch and the sixth patch in the second region, and configured to selectively electrically connect the fifth patch and the sixth patch;

a seventh patch disposed in the second region in a direction from the sixth patch toward the fourth corner;

a seventh switch disposed in an electrical path between the sixth patch and the seventh patch in the second region, and configured to selectively electrically connect the sixth patch and the seventh patch;

an eighth patch disposed in the second region in a direction from the sixth patch toward the third corner;

an eighth switch disposed in an electrical path between the sixth patch and the eighth patch in the second region, and configured to selectively electrically connect the sixth patch and the eighth patch;

a ninth patch disposed in the third region;

a ninth switch disposed in an electrical path between the first conductive patch and the ninth patch in the third region, and configured to selectively electrically connect the first conductive patch and the ninth patch;

a tenth patch disposed in the third region;

a tenth switch disposed in an electrical path between the ninth patch and the tenth patch in the third region, and configured to selectively electrically connect the ninth patch and the tenth patch;

an eleventh patch disposed in the third region in a direction from the tenth patch toward the first corner;

an eleventh switch disposed in an electrical path between the tenth patch and the eleventh patch in the third region, and configured to selectively electrically connect the tenth patch and the eleventh patch;

a twelfth patch disposed in the third region in a direction from the tenth patch toward the second corner;

a twelfth switch disposed in an electrical path between the tenth patch and the twelfth patch in the third region, and configured to selectively electrically connect the tenth patch and the twelfth patch;

a thirteenth patch disposed in the fourth region;

a thirteenth switch disposed in an electrical path between the first conductive patch and the thirteenth patch in the fourth region, and configured to selectively electrically connect the first conductive patch and the thirteenth patch;

a fourteenth patch disposed in the fourth region;

a fourteenth switch disposed in an electrical path between the thirteenth patch and the fourteenth patch in the fourth region, and configured to selectively electrically connect the thirteenth patch and the fourteenth patch;

a fifteenth patch disposed in the fourth region in a direction from the fourteenth patch toward the second corner;

a fifteenth switch disposed in an electrical path between the fourteenth patch and the fifteenth patch in the fourth region, and configured to selectively electrically connect the fourteenth patch and the fifteenth patch;

a sixteenth patch disposed in the fourth region in a direction from the fourteenth patch toward the first corner; and a sixteenth switch disposed in an electrical path between the fourteenth patch and the sixteenth patch in the fourth region, and configured to selectively electrically connect the fourteenth patch and the sixteenth patch, wherein the ninth switch, the ninth patch, the tenth switch, the tenth patch, the thirteenth switch, the thirteenth patch, the fourteenth switch, and the fourteenth patch are located on a first diagonal line interconnecting the third corner and the fourth corner, and wherein the first switch, the first patch, the second switch, the second patch, the fifth switch, the fifth patch, the sixth switch, and the sixth patch are located on a second diagonal line interconnecting the first corner and the second corner.

* * * * *